US012657058B2

(12) United States Patent
Poothiyot et al.

(10) Patent No.: US 12,657,058 B2
(45) Date of Patent: Jun. 16, 2026

(54) DYNAMICALLY SELECTING ARTIFICIAL INTELLIGENCE MODELS AND HARDWARE ENVIRONMENTS TO EXECUTE TASKS

(71) Applicant: Dropbox, Inc., San Francisco, CA (US)

(72) Inventors: Ashok Pancily Poothiyot, San Francisco, CA (US); Ali Zafar, Fremont, CA (US); Anthony Penta, Bellevue, WA (US); Stephen Voorhees, Alamo, CA (US); Tim Gasser, Austin, TX (US); Tsung-Hsiang Chang, Bellevue, WA (US); Geoff Hulten, Lynnwood, WA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/732,320

(22) Filed: Jun. 3, 2024

(65) Prior Publication Data

US 2025/0238333 A1 Jul. 24, 2025

Related U.S. Application Data

(60) Provisional application No. 63/623,662, filed on Jan. 22, 2024.

(51) Int. Cl.
*G06F 9/46* (2006.01)
*G06F 9/48* (2006.01)
(Continued)

(52) U.S. Cl.
CPC .............. *G06F 9/5027* (2013.01); *G06F 9/48* (2013.01); *G06F 9/4806* (2013.01);
(Continued)

(58) Field of Classification Search
CPC .............. G06F 9/5005; G06F 11/1476; G06F 2209/501; G06F 2209/503; G06F 2209/509
See application file for complete search history.

(56) References Cited

U.S. PATENT DOCUMENTS 8,938,740 B2 1/2015 Nishihara et al.
9,959,146 B2 5/2018 Ahuja et al.
(Continued)

FOREIGN PATENT DOCUMENTS

CN 116074179 A 5/2023
CN 117217201 A 12/2023
(Continued)

OTHER PUBLICATIONS

Weiss et al., Fail-Safe Execution of Deep Learning based Systems through Uncertainty Monitoring, 2021, IEEE, 12 pages. (Year: 2021).*
(Continued)

*Primary Examiner* — Diem K Cao
(74) *Attorney, Agent, or Firm* — Keller Preece PLLC

(57) ABSTRACT

The present disclosure relates to systems, non-transitory computer-readable media, and methods for selecting machine-learning models and hardware environments for executing a task. In particular, in one or more embodiments, the disclosed systems select a designated machine-learning model for executing a task based on workload features of the task and task routing metrics for a plurality of machine-learning models. In addition, in one or more embodiments, the disclosed systems select a designated hardware environment for executing the task based on workload features for the task and task routing metrics for a plurality of hardware environments. In some embodiments, the disclosed systems select a fallback machine-learning model and a fallback hardware environment for executing the task if the designated machine-learning model or designated hardware environment are unavailable. Moreover, in one or more embodiments, the disclosed systems can pause and initiate tasks based on bandwidth availability.

20 Claims, 30 Drawing Sheets

(51) Int. Cl.

| | | |
|---|---|---|
| *G06F 9/50* | (2006.01) | |
| *G06F 11/14* | (2006.01) | |
| *G06F 11/20* | (2006.01) | |
| *H04L 41/16* | (2022.01) | |
| *H04L 43/0894* | (2022.01) | |

(52) U.S. Cl.
CPC ............ *G06F 9/4843* (2013.01); *G06F 9/485* (2013.01); *G06F 9/4881* (2013.01); *G06F 9/50* (2013.01); *G06F 9/5005* (2013.01); *G06F 9/5044* (2013.01); *G06F 9/5055* (2013.01); *G06F 11/1476* (2013.01); *G06F 11/2023* (2013.01); *G06F 11/2038* (2013.01); *H04L 41/16* (2013.01); *H04L 43/0894* (2013.01); *G06F 2209/501* (2013.01); *G06F 2209/503* (2013.01); *G06F 2209/509* (2013.01)

(56) References Cited

U.S. PATENT DOCUMENTS

| | | | |
|---|---|---|---|
| 10,949,252 | B1 | 3/2021 | Krishnamurthy et al. |
| 11,302,307 | B2 | 4/2022 | Raghavendra et al. |
| 11,341,420 | B2 | 5/2022 | Loh et al. |
| 11,397,529 | B2 | 7/2022 | Chen et al. |
| 11,527,786 | B1 | 12/2022 | Budan et al. |
| 11,544,604 | B2 | 1/2023 | Poothiyot et al. |
| 11,609,793 | B2 | 3/2023 | Suh |
| 11,645,111 | B2 | 5/2023 | Wang et al. |
| 11,775,867 | B1 | 10/2023 | Jamei |
| 11,790,242 | B2 | 10/2023 | Agrawal et al. |
| 11,983,574 | B1* | 5/2024 | Ravindran ........... G06F 9/5005 |
| 12,033,001 | B2* | 7/2024 | Acharya ............... G06F 9/5055 |
| 2008/0066070 | A1 | 3/2008 | Markov |
| 2012/0198466 | A1 | 8/2012 | Cherkasova et al. |
| 2013/0212277 | A1 | 8/2013 | Bodik et al. |
| 2017/0090990 | A1 | 3/2017 | Furman et al. |
| 2018/0027060 | A1 | 1/2018 | Metsch et al. |
| 2019/0102681 | A1 | 4/2019 | Roberts et al. |
| 2019/0102700 | A1 | 4/2019 | Babu et al. |
| 2019/0146848 | A1 | 5/2019 | Rastogi et al. |
| 2019/0188605 | A1 | 6/2019 | Zavesky et al. |
| 2019/0197011 | A1 | 6/2019 | Zavesky et al. |
| 2019/0266015 | A1* | 8/2019 | Chandra ................. G06F 9/505 |
| 2019/0303207 | A1 | 10/2019 | Vadapandeshwara et al. |
| 2020/0012962 | A1 | 1/2020 | Dent et al. |
| 2020/0372307 | A1 | 11/2020 | Arun et al. |
| 2021/0089961 | A1 | 3/2021 | Zeise et al. |
| 2021/0089969 | A1 | 3/2021 | Sengupta et al. |
| 2021/0149729 | A1 | 5/2021 | Wang et al. |
| 2021/0224585 | A1 | 7/2021 | Schmidt et al. |
| 2021/0256422 | A1 | 8/2021 | Unterthiner et al. |
| 2021/0279576 | A1 | 9/2021 | Shazeer et al. |
| 2021/0334700 | A1 | 10/2021 | Nagaraja |
| 2022/0035679 | A1 | 2/2022 | Sunwoo et al. |
| 2022/0058477 | A1 | 2/2022 | Hu et al. |
| 2022/0067752 | A1 | 3/2022 | Fang et al. |
| 2022/0083389 | A1 | 3/2022 | Poothia et al. |
| 2022/0114026 | A1 | 4/2022 | Cropper et al. |
| 2022/0207349 | A1 | 6/2022 | Fusco et al. |
| 2022/0215008 | A1 | 7/2022 | Adibowo |
| 2022/0237208 | A1 | 7/2022 | Srinivasan et al. |
| 2022/0318689 | A1 | 10/2022 | Li-Bland et al. |
| 2022/0374784 | A1 | 11/2022 | Sharma et al. |
| 2023/0139459 | A1 | 5/2023 | Latkar |
| 2023/0206134 | A1 | 6/2023 | Kennel et al. |
| 2023/0252340 | A1 | 8/2023 | Ramanathan et al. |
| 2023/0259747 | A1 | 8/2023 | Lee et al. |
| 2023/0333901 | A1 | 10/2023 | Kale et al. |
| 2023/0376725 | A1 | 11/2023 | Mesmakhosroshahi et al. |
| 2023/0385129 | A1 | 11/2023 | Johnson et al. |
| 2023/0409874 | A1 | 12/2023 | Silva Tavares et al. |
| 2024/0104407 | A1 | 3/2024 | McCarthy et al. |
| 2024/0107347 | A1* | 3/2024 | Pirmagomedov ..... H04L 1/0023 |
| 2024/0135247 | A1 | 4/2024 | Johnsson et al. |
| 2024/0144051 | A1* | 5/2024 | Kirshenboim .......... G06N 5/04 |
| 2024/0160491 | A1 | 5/2024 | Taneja et al. |
| 2024/0289645 | A1 | 8/2024 | Makhijani et al. |
| 2024/0406166 | A1 | 12/2024 | Bell et al. |
| 2024/0411603 | A1 | 12/2024 | Beam et al. |

FOREIGN PATENT DOCUMENTS

| | | |
|---|---|---|
| EP | 3822865 A1 | 5/2021 |
| JP | 7195365 B2 | 12/2022 |
| WO | 2019104063 A9 | 6/2020 |
| WO | 2023146883 A1 | 8/2023 |

OTHER PUBLICATIONS

Gai K., et al., "Optimal Resource Allocation Using Reinforcement Learning For IoT Content-Centric Services," Applied Soft Computing, 2018, vol. 70, pp. 12-21.

Non-Final Office Action from U.S. Appl. No. 18/732,297, mailed Aug. 26, 2024, 20 pages.

Non-Final Office Action from U.S. Appl. No. 18/732,305, mailed Sep. 24, 2024, 28 pages.

Sharifian S., et al., "A Predictive And Probabilistic Load-Balancing Algorithm For Cluster-Based Web Servers," Applied Soft Computing, 2011, vol. 11, pp. 970-981.

Final Office Actio from U.S. Appl. No. 18/732,305 mailed Jan. 3, 2025, 22 pages.

Invitation to Pay Additional Fees for International Application No. PCT/US2024/059866 mailed Mar. 31, 2025, 16 pages.

Notice of Allowance for U.S. Appl. No. 18/732,305 mailed on Jun. 3, 2025, 2 pages.

Notice of Allowance for U.S. Appl. No. 18/732,305 mailed on May 22, 2025, 11 pages.

International Search Report and Written Opinion for Application No. PCT/US2024/059866, mailed on May 22, 2025, 19 pages.

Non-Final Office Action from U.S. Appl. No. 18/732,297, mailed May 6, 2025, 37 pages.

Notice of Allowance for U.S. Appl. No. 18/732,305 mailed on Apr. 16, 2025, 12 pages.

Notice of Allowance for U.S. Appl. No. 18/732,297 mailed on Aug. 20, 2025, 9 pages.

\* cited by examiner

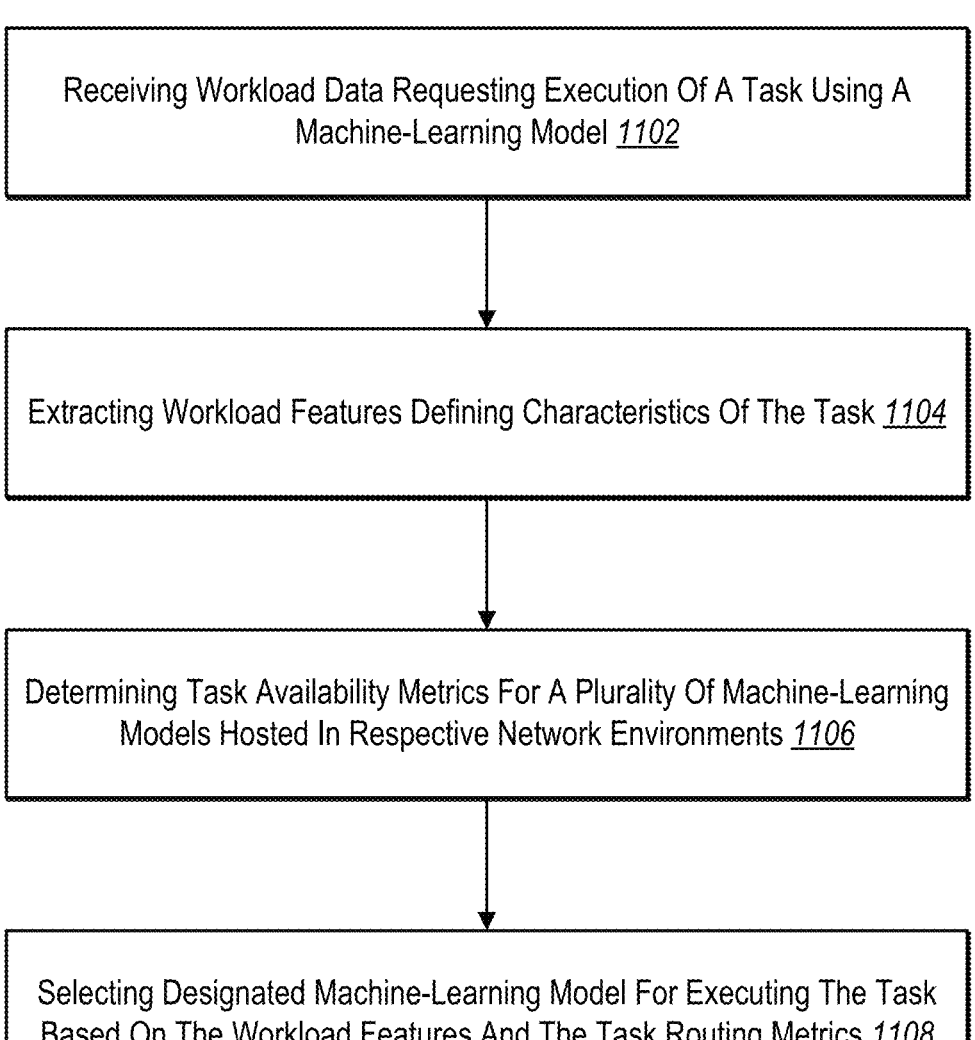

1100

Receiving Workload Data Requesting Execution Of A Task Using A Machine-Learning Model *1102*

Extracting Workload Features Defining Characteristics Of The Task *1104*

Determining Task Availability Metrics For A Plurality Of Machine-Learning Models Hosted In Respective Network Environments *1106*

Selecting Designated Machine-Learning Model For Executing The Task Based On The Workload Features And The Task Routing Metrics *1108*

*Fig. 11*

Intelligent Selection And Execution Platform *102*

Hardware Environment *1302*

Third-Party Server(s) *1304*

Third-Party Hardware Environment(s) *1306*

Task Routing Metrics *1308*

Financial Cost Metrics *1310*

Execution Time Metrics *1312*

Execution Cost Metrics *1314*

User Feedback Metrics *1316*

Hardware Environment States *1318*

Hardware Environment Capabilities *1320*

Hardware Environment Specialties *1322*

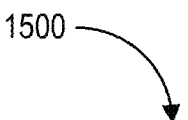

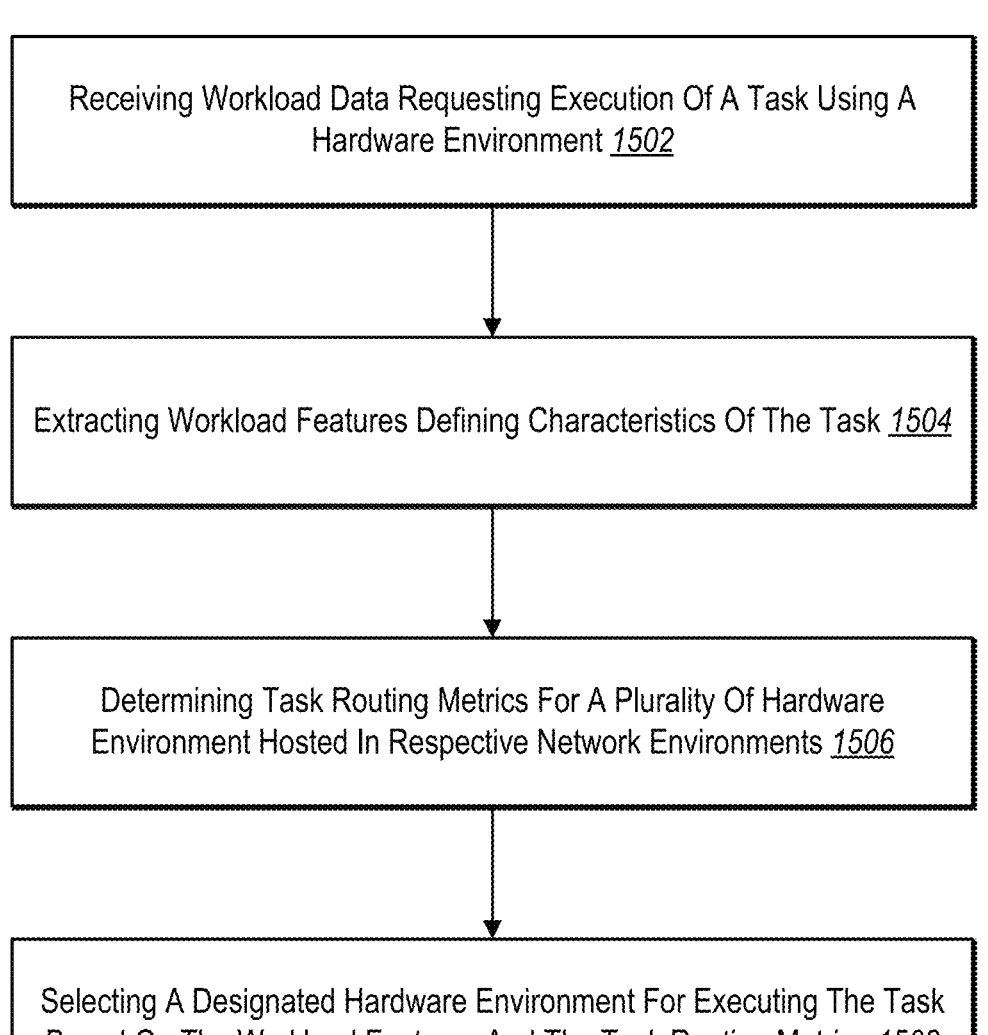

Receiving Workload Data Requesting Execution Of A Task Using A Hardware Environment *1502*

Extracting Workload Features Defining Characteristics Of The Task *1504*

Determining Task Routing Metrics For A Plurality Of Hardware Environment Hosted In Respective Network Environments *1506*

Selecting A Designated Hardware Environment For Executing The Task Based On The Workload Features And The Task Routing Metrics *1508*

*Fig. 15*

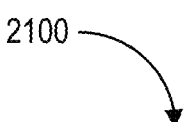

2100

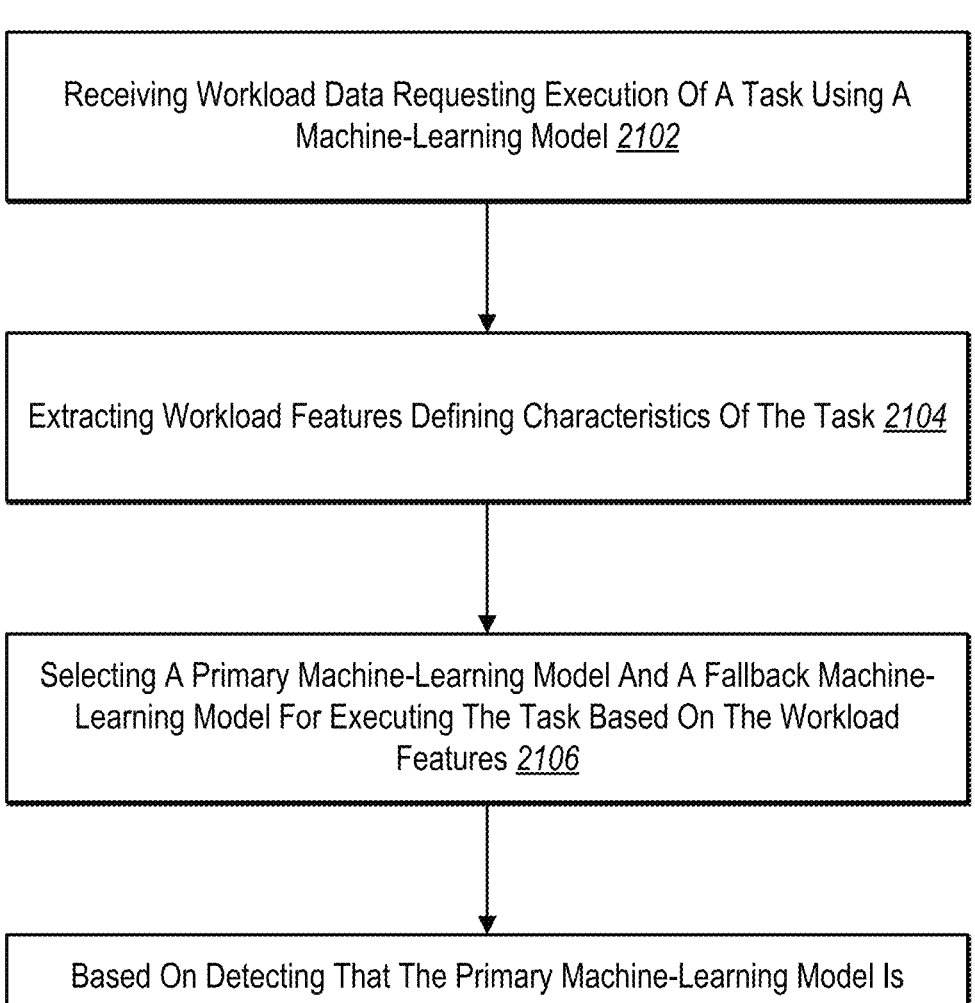

Receiving Workload Data Requesting Execution Of A Task Using A Machine-Learning Model *2102*

Extracting Workload Features Defining Characteristics Of The Task *2104*

Selecting A Primary Machine-Learning Model And A Fallback Machine-Learning Model For Executing The Task Based On The Workload Features *2106*

Based On Detecting That The Primary Machine-Learning Model Is Unavailable, Providing The Workload Data To A Computing Environment For The Fallback Machine-Learning Model For Executing The Task *2108*

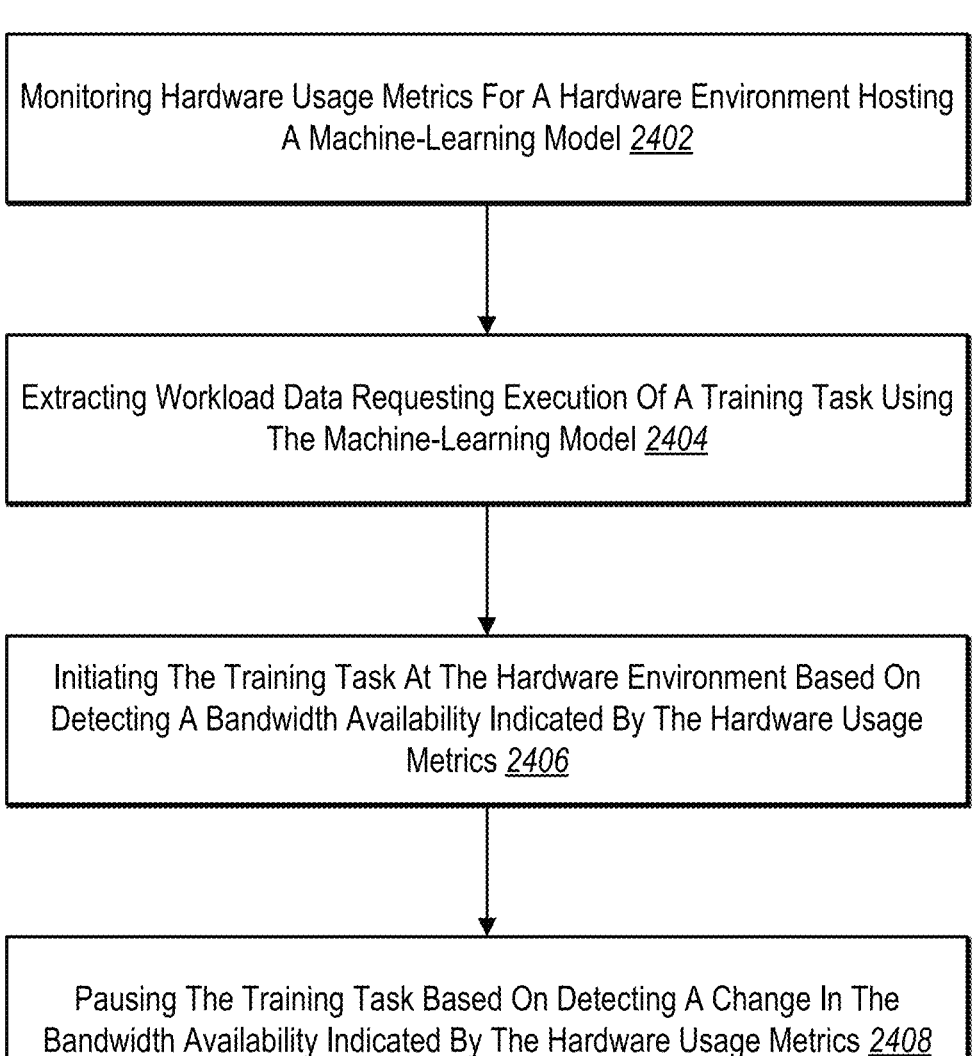

Monitoring Hardware Usage Metrics For A Hardware Environment Hosting A Machine-Learning Model _2402_

Extracting Workload Data Requesting Execution Of A Training Task Using The Machine-Learning Model _2404_

Initiating The Training Task At The Hardware Environment Based On Detecting A Bandwidth Availability Indicated By The Hardware Usage Metrics _2406_

Pausing The Training Task Based On Detecting A Change In The Bandwidth Availability Indicated By The Hardware Usage Metrics _2408_

DYNAMICALLY SELECTING ARTIFICIAL INTELLIGENCE MODELS AND HARDWARE ENVIRONMENTS TO EXECUTE TASKS

CROSS-REFERENCE TO RELATED APPLICATIONS

This application claims priority to and the benefit of U.S. Provisional Patent Application No. 63/623,662, filed on Jan. 22, 2024, which is incorporated herein by reference in its entirety.

BACKGROUND

Recent years have seen significant improvements in the capabilities and capacities of artificial intelligence models. For example, artificial intelligence systems can quickly generate generative output in response to an input. To illustrate, large language models are particularly adept at interpreting natural language prompts, adapting to context based on the prompt, and can generate a variety of different outputs, including, among other things, creating content based on existing content items, providing summaries of documents, generating code, and retrieving information. However, there are a number of technical deficiencies with regard to utilizing and optimizing among various artificial intelligence models that often require large amounts of computational resources, utilize different hardware components, and provide differing qualities of output.

For example, conventional systems are inflexible regarding artificial intelligence models. Often, conventional systems can only utilize one (or a small handful) of artificial intelligence models for executing tasks. Not only does this limit conventional systems to that model, but when developers create systems, applications, and/or integrations to interface with existing systems, these inflexibilities are amplified as developers are often limited to creating systems that utilize certain artificial intelligence models. In addition, as new and more powerful artificial intelligence models are generated, existing systems must be completely rebuilt or reworked in order to interface with each new artificial intelligence model.

Also, partly due to their inflexibility, conventional systems are computationally inefficient when selecting artificial intelligence models. For instance, as mentioned, conventional systems are often built to access a specific artificial intelligence model, and thus, conventional systems often simply execute tasks by sending tasks to that model. However, as artificial intelligence models have varying capabilities and performance characteristics, simply using a single artificial intelligence model, or even just a small handful of models, leads to computational inefficiencies. In some cases, providing an artificial intelligence model with a complex task or prompt will require excessive bandwidth usage to transmit data to and from the artificial intelligence model or make multiple API calls to break the task into smaller segments. In other cases, when conventional systems utilize more than one artificial intelligence model, conventional systems will simply provide tasks to available artificial intelligence models, resulting in large amounts of bandwidth usage and processing power to run tasks on poorly fitting artificial intelligence models. For example, conventional systems may run a basic or low-complexity task on a large artificial intelligence model, utilizing more processing power than needed to complete the low-complexity task.

In addition to their inefficiencies, conventional systems are also inflexible with the hardware environments used to execute tasks that utilize artificial intelligence models. For instance, conventional systems often simply utilize a local hardware environment to execute tasks on artificial intelligence machines and only utilize other hardware environments when the local environment exhausts resources or goes offline due to issues or outages. Moreover, when conventional systems utilize other hardware environments, they simply execute tasks in hardware environments with immediate availability, regardless of whether executing the task in that hardware environment results in a computational cost or if the quality of output for the task is compromised.

Moreover, conventional systems are inefficient in their allocation of hardware resources, particularly when allocating hardware for executing training tasks. For example, conventional systems often initiate a training task on a local hardware environment, and unexpected increases in bandwidth usage combined with high bandwidth usage for the training task result in little to no bandwidth usage for other tasks. Moreover, conventional systems often train without regard to where training data is stored, often resulting in additional computing resources and processing time to move the training data to the hardware environment in order to execute the training task. Additional features and advantages of one or more embodiments of the present disclosure are outlined in the description that follows and, in part, will be obvious from the description or may be learned by the practice of such example embodiments.

BRIEF SUMMARY

Embodiments of the present disclosure provide benefits and/or solve one or more of the foregoing or other problems in the art with systems, non-transitory computer-readable media, and methods for allocating workloads to specific artificial intelligence models and hardware infrastructure. For example, in one or more embodiments, the disclosed systems dynamically and intelligently select a machine-learning model for executing a task based on the workload features of the task and task routing metrics of a plurality of machine-learning models. In one or more embodiments, the disclosed systems select additional machine-learning models as fallback models for executing the task if the selected machine-learning model is unavailable. In addition to selecting one or more designated machine-learning models, in one or more embodiments, the disclosed systems select a hardware environment for executing the task based on the workload features of the task and task routing metrics for the hardware environment. In one or more embodiments, the disclosed systems also select a fallback hardware environment for executing the task if the selected hardware environment is unavailable.

In addition, in one or more embodiments, the disclosed systems intelligently schedule and initiate training tasks based on bandwidth availability. For example, in one or more embodiments, the disclosed systems can monitor hardware usage and intelligently schedule and/or initiate training tasks. Further, in one or more embodiments, the disclosed systems initiate a training task based on bandwidth availability and pauses the training task upon detecting a change in bandwidth availability. Additional features and advantages of one or more embodiments of the present disclosure are outlined in the description that follows and, in part, will be obvious from the description or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 11 illustrates an example series of acts for selecting a designated machine-learning model in accordance with one or more embodiments.

FIG. 15 illustrates an example series of acts for selecting a designated hardware environment in accordance with one or more embodiments.

FIG. 21 illustrates an example series of acts for selecting a primary machine-learning model and a fallback machine-learning model in accordance with one or more embodiments.

FIG. 24 illustrates an example series of acts for initiating and pausing training tasks in accordance with one or more embodiments.

DETAILED DESCRIPTION

Figure 1:
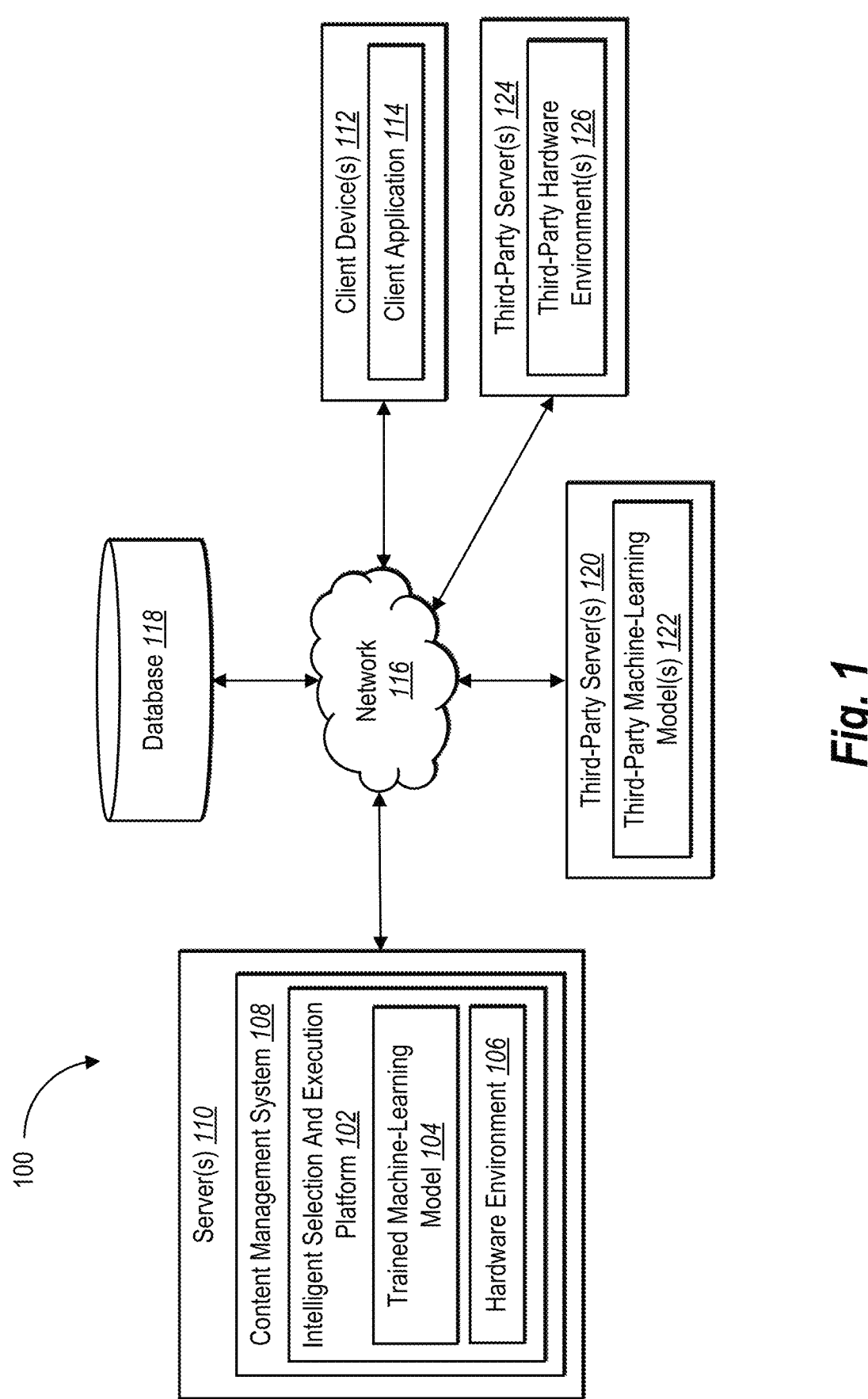
FIG. 1 illustrates a diagram of an environment in which an intelligent selection and execution platform can operate in accordance with one or more embodiments.

This disclosure describes one or more embodiments of an intelligent selection and execution platform that assigns or allocates workloads for execution by specific artificial intelligence models and hardware infrastructure. For example, in one or more embodiments, upon receiving a request to initiate a task and determining a hardware load, the intelligent selection and execution platform identifies and designates a machine-learning model for executing the task (or workload) and allocates hardware, such as available GPUs or CPUs, for executing the task (or workload). Moreover, in one or more embodiments, the intelligent selection and execution platform selects or designates one or more additional models and/or hardware environments as a fallback if the selected model (or hardware) is unavailable for executing the task.

As mentioned, in one or more embodiments, the intelligent selection and execution platform selects a designated model for executing a particular task or workload. In particular, the intelligent selection and execution platform selects a designated machine-learning model from among one or more trained machine-learning models of the intelligent selection and execution platform and various third-party machine-learning models (e.g., models exterior to the intelligent selection and execution platform). For example, upon receiving a request to execute a task, the intelligent selection and execution platform extracts workload features defining characteristics of the task and determines task routing metrics for the various machine-learning models in order to select a designated model as an optimal machine-learning model for executing the task. In some cases, the intelligent selection and execution platform utilizes a model selection machine-learning model to select a designated machine-learning model. In addition, in some instances, the intelligent selection and execution platform utilizes additional information or metrics to select a designated machine-learning model, such as historical quality metrics based on historical user feedback data or software domain analysis information.

As previously mentioned, in one or more embodiments, in addition to selecting a designated machine-learning model, the intelligent selection and execution platform also selects a hardware environment for executing a task. In particular, the intelligent selection and execution platform selects a hardware environment from one or more hardware environments, including hardware environments local to the intelligent selection and execution platform and third-party hardware environments (e.g., external to the intelligent selection and execution platform). For example, upon receiving a request to execute a task, the intelligent selection and execution platform extracts workload features defining characteristics of the task and determines task routing metrics for the various hardware environments in order to select a designated hardware environment for executing a task. In some cases, the intelligent selection and execution platform utilizes a hardware allocating machine-learning model to select a designated hardware environment for executing a task. Additionally, in some instances, the intelligent selection and execution platform utilizes additional information or metrics for selecting a hardware environment, such as information received from probabilistic load balancing. Moreover, in one or more embodiments, the intelligent selection and execution platform selects a designated hardware environment by selecting multiple hardware environments to execute a task, such as by allocating a first portion of a task to a first hardware environment and a second portion of a task to a second hardware environment.

In addition, as also mentioned, in one or more embodiments, in addition to selecting a model for executing a task, the intelligent selection and execution platform assigns one or more additional models as fallback (or failsafe) models. In particular, the intelligent selection and execution platform assigns additional models as fallback (or failsafe) models to tasks or workloads to prevent execution failures when the selected (or primary) model is unavailable. For example, the intelligent selection and execution platform can select a primary (or designated) machine-learning model and a fallback machine-learning model for executing the task and, thus, if the primary machine-learning model is unavailable (e.g., fails or is busy) for executing the task, the intelligent selection and execution platform can efficiently defer to the fallback machine-learning model. In one or more embodiments, in addition to (or in lieu of) selecting a primary machine-learning model and a fallback machine-learning model, the intelligent selection and execution platform also selects a primary hardware environment and a fallback hardware environment. Thus, if the primary hardware environment is unavailable (e.g., fails or is busy), the intelligent selection and execution platform can defer to the fallback hardware environment for executing the task.

As briefly mentioned, in one or more embodiments, the intelligent selection and execution platform selects designated machine-learning models and/or hardware environments based in part on the workload features of the task. Specifically, the intelligent selection and execution platform receives workload data requesting the execution of a task and extracts workload features defining characteristics of the task. For example, the intelligent selection and execution platform can extract workload features by determining an estimated processing requirement and an estimated storage requirement for executing the task on each machine-learning model (e.g., the trained machine-learning model and the third-party machine-learning models) running on various hardware environments (e.g., the hardware environment and the third-party hardware environments).

As also briefly mentioned, in one or more embodiments, the intelligent selection and execution platform selects a designated machine-learning model and/or hardware environment based in part on task routing metrics of various machine-learning models and/or hardware environments. In particular, the intelligent selection and execution platform determines task routing metrics by determining various metrics that indicate whether or not a machine-learning model and/or hardware environment are available to execute a task. For example, the intelligent selection and execution platform can determine task routing metrics by determining a model state, a hardware state, a financial cost metric, an execution time metric, a model fit metric, a capability, or a specialty. Moreover, in some cases, the intelligent selection and execution platform utilizes an optimization metric to select a designated machine-learning model as an optimal machine-learning model for executing a task.

In addition, in one or more embodiments, the intelligent selection and execution platform also executes training tasks based on bandwidth availability. In particular, the intelligent selection and execution platform executes training tasks for particular models for their respective tasks using particular models and/or hardware environments and based on the workload data and bandwidth availability. For example, the intelligent selection and execution platform monitors metrics for a hardware environment and/or model and, upon receiving workload data requesting execution of a training task, initiates the task based on bandwidth availability (e.g., at a time when there is expected to be more bandwidth). Upon detecting a change in bandwidth availability (e.g., there is more traffic and less bandwidth to train), the intelligent selection and execution platform can pause the training task. Moreover, in one or more embodiments, in addition to scheduling and pausing training jobs based on bandwidth availability, the intelligent selection and execution platform can also schedule and initiate batch tasks based on bandwidth availability.

The intelligent selection and execution platform provides a variety of technical advantages relative to conventional systems. For example, by dynamically selecting an optimal machine-learning model, the intelligent selection and execution platform improves flexibility relative to conventional systems. Unlike conventional systems that are limited to only one or a small handful of artificial intelligence models, the intelligent selection and execution platform can select an optimal machine-learning model from a plurality of machine-learning models. In particular, the intelligent selection and execution platform selects an optimal machine-learning model for executing a task based on workload features that define characteristics of a task and task routing metrics that indicate how a given machine-learning model would execute the task. Moreover, unlike conventional systems where developers must create systems that utilize only certain artificial intelligence models, a developer need only provide an API call to the intelligent selection and execution platform that requests the execution of a task using a machine-learning model, and the intelligent selection and execution platform can select an optimal machine-learning model for executing the task.

In addition, the intelligent selection and execution platform maintains flexibility over time relative to conventional systems. In particular, where conventional systems must be completely rebuilt or reworked in order to interface with new artificial intelligence models, the intelligent selection and execution platform can easily add additional (or new) machine-learning models. For example, the intelligent selection and execution platform adds an additional machine-learning model from which to select an optimal model by determining task routing metrics for executing a task on the additional machine-learning model and updating parameters of a smart pocket machine-learning model or a model selection machine-learning model based on the additional model. Moreover, the intelligent selection and execution platform continues to optimize for the new machine-learning model based on user feedback data of implicit and explicit signals regarding the execution of the task by the machine-learning model. Because the model selection machine-learning model receives continuous feedback and uses the feedback to continuously improve selections of the designated machine-learning models, the intelligent selection and execution platform need only provide the model-selection machine-learning model with data (e.g., quality metrics, access to task routing metrics) in order add an additional machine-learning model. Indeed, unlike conventional systems, the intelligent selection and execution platform 102 improves selections after adding the additional machine-learning model without requiring training that is time-intensive and computationally intensive.

In addition, the intelligent selection and execution platform increases efficiency relative to conventional systems by selecting an optimal machine-learning model for a task. Unlike conventional systems that simply move tasks to any available model and often either use a larger model than necessary or use additional bandwidth attempting to execute a large task on a smaller model, the intelligent selection and execution platform can identify an optimal machine-learning model for executing a certain task. By extracting workload features of the task and determining task routing metrics for executing the task on various machine-learning models, the intelligent selection and execution platform can determine from an API call the amount of processing and computational power needed to execute the task and select an optimal machine-learning model that can execute the task. Indeed, the intelligent selection and execution platform can select a machine-learning model that will efficiently execute the task without wasting processing and computing power executing smaller tasks on large models or attempting to execute a large task on a smaller model.

The intelligent selection and execution platform also increases flexibility in selecting hardware environments relative to conventional systems. The intelligent selection and execution platform is aware of the state of multiple hardware environments and uses workload features and task routing metrics to determine an optimal hardware environment for executing the task. Indeed, the intelligent selection and execution platform uses a multi-modal approach to selecting an optimal hardware environment for executing the task. For example, the intelligent selection and execution platform can select a hardware environment with specific capabilities or specialties (e.g., can run a certain model), which will result in a lower financial cost to execute the task.

Indeed, the intelligent selection and execution platform can determine between local hardware systems and third-party hardware systems to determine an optimal hardware system for executing the task.

In addition to increasing flexibility when allocating hardware resources, the intelligent selection and execution platform also increases efficiency relative to conventional systems. Specifically, unlike conventional systems that initiate training tasks that result in less bandwidth, the intelligent selection and execution platform can initiate training tasks based on intelligently determining that there is bandwidth availability and pausing the training task based on determining that there was a change in bandwidth availability. Moreover, the intelligent selection and execution platform can determine if a training task requires continuous execution (e.g., is a hot path task) and begins the training task based on determining that a hardware environment will have sufficient bandwidth availability for the duration of the task, allowing for efficient training scheduling that does not use all the computational and processing power. In addition, unlike conventional systems, the intelligent selection and execution platform can determine a hardware environment to execute a training task based on where a training set is stored, saving additional computational and processing time that conventional systems use to copy training data.

As illustrated by the foregoing discussion, the present disclosure utilizes a variety of terms to describe the features and advantages of the smart topic generation system. Additional details regarding the meaning of such terms are now provided. For example, as used herein, the term "workload data" refers to data, input, or payload that requests the execution of a task and the necessary information to execute the task. In particular, workload data refers to a request to execute a task along with data or other information that indicates the necessary data to execute the task. For example, workload data can refer to data or information that requests specific features or requirements of the task. To illustrate, workload data can refer to an API call received from a device connected to a content management system that requests the execution of a task using a machine-learning model.

Moreover, as used herein, the term "workload features" refers to data, metrics, or other information that indicate requirements for executing a task or generating an outcome. In particular, workload features indicate estimated computational requirements for executing a task. For example, workload features can comprise the necessary computational power from a CPU and/or GPU, time to execute the task, or other specifics necessary for executing a task. To illustrate, workload features can indicate specifics, such as that a task requires a specific machine-learning model or that a task is customer-facing.

In addition, as used herein, the term "machine-learning model" refers to a computer algorithm or a collection of computer algorithms that automatically improve for a particular task through iterative outputs or predictions based on the use of data. For example, a machine-learning model can utilize one or more learning techniques to improve accuracy and/or effectiveness. Example machine-learning models include various types of neural networks, decision trees, support vector machines, linear regression models, and Bayesian networks. In addition, as used herein, the term "trained machine-learning model" refers to a machine-learning model that is local to a content management system. For example, the trained machine-learning model is hosted, located, stored, or executed within a content management system. Moreover, as used herein, the term "third-party machine-learning model" refers to a machine-learning model that is external to a content management system. For example, a third-party machine-learning model is hosted, located, stored, or executed outside of a content management system. Relatedly, as used herein, the term "designated machine-learning model" refers to a machine-learning model selected by a model selection machine-learning model to execute a task.

Relatedly, the term "neural network" refers to a machine-learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., content items or smart topic outputs) based on a plurality of inputs provided to the neural network. In some cases, a neural network refers to an algorithm (or set of algorithms) that implements deep learning techniques to model high-level abstractions in data. A neural network can include various layers, such as an input layer, one or more hidden layers, and an output layer that each perform tasks for processing data. For example, a neural network can include a deep neural network, a convolutional neural network, a transformer neural network, a recurrent neural network (e.g., an LSTM), a graph neural network, or a generative adversarial neural network. Upon training, such a neural network may become a machine-learning model.

In addition, as used herein, the term "large language model" refers to a machine-learning model trained to perform computer tasks to generate or identify content items in response to trigger events (e.g., user interactions, such as text queries and button selections). In particular, a large language model can be a neural network (e.g., a deep neural network or a transformer neural network) with many parameters trained on large quantities of data (e.g., unlabeled text) using a particular learning technique (e.g., self-supervised learning). For example, a large language model can include parameters trained to generate outputs (e.g., smart topic outputs) based on prompts and/or to identify content items based on various contextual data, including graph information from a knowledge graph and/or historical user account behavior. In some cases, a large language model comprises various commercially available models such as, but not limited to, GPT (e.g., GPT 3.5, GPT 4), ChatGPT, Llama (e.g., Llama2-7B, Llama 3), BERT, Claude, Cohere.

As used herein, the term "smart pocket machine-learning model" or "smart pocket ML model" refers to one or more machine-learning models trained or tuned to select from various model options and hardware environment options for executing a task. For example, a smart pocket machine-learning model is trained to select a machine-learning model and/or a hardware environment for executing a task and/or scheduling tasks and training based on workload data, task routing metrics, and hardware usage metrics. In some cases, the smart pocket machine-learning model is a single machine-learning model or algorithm. In other cases, the smart pocket-machine-learning model is a series or ensemble of machine-learning models working together. In one or more embodiments, the smart pocket machine-learning model is a multi-armed bandit.

As used herein, the term "model selection machine-learning model" refers to a machine-learning model that is trained or tuned to select machine-learning models from a plurality of machine-learning models. In particular, a model selection machine-learning model" is trained, tuned, or optimized to select a machine-learning model for executing a task based on workload data and task routing metrics. For example, a model selection machine-learning model can select a machine-learning model from a trained machine-learning model local to a content management system or one or more third-party machine-learning models in their respective network environments. In some cases, the model selection machine-learning model is integrated with or works in series with a smart pocket machine-learning model or a hardware allocating machine-learning model. In other cases, the model selection machine-learning model selects a model separately from the smart pocket machine-learning model.

As used herein, the term "hardware allocating machine-learning model" refers to a machine-learning model that is trained or tuned to select hardware environments from a plurality of hardware environments. In particular, the term hardware allocating machine-learning model refers to a machine-learning model that is trained, tuned, or optimized to select a hardware environment to allocate computing resources to execute a task based on workload features and task routing metrics. For example, a hardware allocating machine-learning model that can select a model from local hardware environments in a content management system and third-party hardware environments.

In addition, as used herein, the term "hardware environment" refers to physical infrastructure and components that provide the computational and storage capacity necessary for executing tasks. In particular, the hardware environment can refer to graphical processing units (GPUs), computational processing units (CPUs), artificial intelligence systems, or other hardware components that can execute various applications, integrations, and computer-executable instructions in order to execute a task. For example, a hardware environment can provide the memory and computation power for running a machine-learning model to execute a task. In some cases, a hardware environment can refer to a hardware environment local to or integrated with a content management system. In other cases, a hardware environment can refer to a third-party hardware environment that is external to a content management system.

Further, as used herein, the term "task routing metrics" refers to various metrics, data, or information relating to whether a machine-learning model or hardware environment is available to execute a task. In particular, task routing metrics refer to specific metrics regarding whether or not a machine-learning model or hardware environment is capable of executing a task and metrics that relate to costs for executing a task on various machine-learning models and utilizing various hardware environments. For example, task routing metrics can refer to but are not limited to, a financial cost metric, an execution time metric, a model fit metric, a model capability, a model specialty, a hardware capability, or a hardware specialty.

Also, as used herein, the term "hardware usage metrics" refers to metrics that indicate the extent to which resources in a hardware environment are utilized. In particular, the term hardware usage metrics refers to metrics that encompass the measurement and analysis of data transmission rates across components in a hardware environment, such as processors, memory, storage devices, and network interfaces. For example, hardware usage metrics can indicate the bandwidth usage of a hardware environment.

In addition, as used herein, the term "use time period" refers to a defined interval or segment of time. In particular, the term use time period refers to an amount of time with defined start and end points and can describe various durations, including, but not limited to, a number of minutes, hours, days, or weeks. For example, a use time period may signify a phase or timeframe. Relatedly, as used herein, the term "high-use time period" refers to a use time period where various usage metrics indicate that there are a certain number of users or an amount of data flow within a particular system, model, or hardware environment and that the system is above a certain capacity. For example, a high-use time period can refer to a time when usage metrics indicate that the capacity of a system, model, or hardware environment is at a certain capacity, such as through satisfying a threshold or with a score or a metric. In addition, the term "minimum use time period" refers to a use time period where various usage metrics indicate that there are a certain number of users or an amount of data flow within a particular system, model, or hardware environment and that the system is below a certain capacity. For example, a high-use time period can refer to a time when usage metrics indicate that the capacity of a system, model, or hardware environment is below a certain capacity, such as through satisfying (or not satisfying) a threshold or with a score or a metric.

In addition, as used herein, the term "training task bandwidth usage threshold" refers to a level or threshold for initiating or pausing a training task. In particular, a training task bandwidth usage threshold indicates an amount of bandwidth usage of a system or hardware environment that indicates that there is or is not sufficient bandwidth for a training task. For example, if the bandwidth usage does not satisfy a training task bandwidth usage threshold, then the bandwidth usage indicates there is not sufficient bandwidth for a training task, and conversely, if the bandwidth usage satisfies a training task bandwidth usage threshold, then the bandwidth usage indicates there is sufficient bandwidth for a training task. In some embodiments, the training task bandwidth usage threshold could be when the bandwidth usage is above a certain number or percentage (e.g., above 0.65). In other embodiments, the training task initiation threshold could be when a decision tree answers with a "yes" to questions regarding whether there is a certain amount of bandwidth usage.

As used herein, the term "batch task" refers to a task or set of tasks processed as a single unit, typically without user intervention during execution. In particular, the term batch task refers to a set of tasks that are queued together and executed sequentially or in parallel. In some cases, batch task refers to a task that does not require real-time interaction or feedback within a certain time period. For example, a batch task could refer to a group of tasks that are not user-facing in that there is a likelihood they will not be accessed by a client device within a certain time period. To illustrate, a batch task can refer to data processing, report generation, backups, large-scale computations, or syncing tasks.

Further, as used herein, the term "batch task bandwidth usage threshold" refers to a level or threshold for initiating or pausing a batch task. In particular, a batch task bandwidth usage threshold indicates an amount of bandwidth usage of a system or hardware environment that indicates that there is or is not sufficient bandwidth for a batch task. For example, if the bandwidth usage does not satisfy a batch task bandwidth usage threshold, then the bandwidth usage indicates there is not sufficient bandwidth for a batch task, and conversely, if the bandwidth usage satisfies a batch task bandwidth usage threshold, then the bandwidth usage indicates there is sufficient bandwidth for a batch task. In some embodiments, the batch task bandwidth usage threshold could be when the bandwidth usage is above a certain number or percentage (e.g., above 0.65). In other embodiments, the batch task initiation threshold could be when a decision tree answers with a "yes" to questions regarding whether there is a certain amount of bandwidth usage.

In addition, as used herein, the term "hot path task" refers to a task that requires immediate, uninterrupted processing because they are essential for real-time operation or system stability. In particular, the term hot path task refers to a task wherein pausing or delaying the task could result in performance degradation or service disruption. For example, in some cases, a hot path task refers to a user-facing task where there is a likelihood that a client device will be waiting for a response. To illustrate, a hot path task can refer to, among others, messages, emails, Slack messages, and real-time streaming processing.

Moreover, as used herein, the term "content item" refers to a digital object or a digital file that includes information interpretable by a computing device (e.g., a client device) to present information to a user. A content item can include a file such as a digital text file, a digital image file, a digital audio file, a webpage, a website, a digital video file, a web file, a link, a digital document file, or some other type of file or digital object. A content item can have a particular file type or file format, which may differ for different types of digital content items (e.g., digital documents. digital images, digital videos, or digital audio files). In some cases, a content item can refer to a remotely stored (e.g., cloud-based) item or a link (e.g., a link to a cloud-based item or a web-based content item) and/or a content clip that indicates (or links) a discrete selection or segmented portion of content from a webpage or some other content item or source. A content item can be editable or otherwise modifiable and can also be sharable from one user account (or client device) to another. In some cases, a content item is modifiable by multiple user accounts (or client devices) simultaneously and/or at different times.

In addition, as used herein, the term "network environment" refers to an environment that houses and facilitates the functioning of software and/or hardware components. In particular, the term network environment refers to various components, software, communications, and storage devices for housing and executing a machine-learning model or hardware environment. For example, a network environment can include the collective infrastructure, architecture, and set of protocols that facilitate the functioning of a machine-learning model and/or hardware environment and communication with various other systems or components. To illustrate, a third-party machine-learning model will have a network environment to facilitate the functioning of the third-party machine-learning model and to communicate with the other systems. Similarly, as another illustration, a third-party hardware environment will have a corresponding network environment to facilitate functioning of the third-party hardware environment to facilitate functioning of the third-party hardware environment and to communicate with other systems.

Additional details regarding the intelligent selection and execution platform will now be provided with reference to the figures. For example, FIG. 1 illustrates a block diagram of a system environment for implementing an intelligent selection and execution platform 102 in accordance with one or more embodiments. An overview of the intelligent selection and execution platform 102 is described in relation to FIG. 1. Thereafter, a more detailed description of the components and processes of the intelligent selection and execution platform 102 is provided in relation to the subsequent figures.

As shown, the environment 100 includes server(s) 110, client device(s) 112, database 118, third-party server(s) 120, and third-party server(s) 124. Each of the components of the environment can communicate via network 116, and network 116 may be any suitable network over which computing devices can communicate. Example networks are discussed in more detail below in relation to FIGS. 26-27.

As mentioned above, the environment 100 includes client device(s) 112. The client device(s) 112 can be one of a variety of computing devices, including a smartphone, a tablet, a smart television, a desktop computer, a laptop computer, a virtual reality device, an augmented reality device, or another computing device as described in relation to FIGS. 26-27. The client device(s) 112 can communicate with the server(s) 110 via network 116. For example, the client device(s) 112 can receive user input from a user interacting with the client device(s) 112 (e.g., via the client application 114) to, for instance, select interface elements to interact with a content management system or to select options that initiate execution of a task. In addition, the intelligent selection and execution platform 102 or the server(s) 110 can receive information relating to various interactions with content items and/or user interface elements based on the input received by the client device(s) 112.

As shown, the client device(s) 112 can include a client application 114. In particular, the client application 114 may be a web application, a native application installed on the client device(s) 112 (e.g., a mobile application, a desktop application, etc.), or a cloud-based application where all or part of the functionality is performed by the server(s) 110. Based on instructions from the client application 114, the client device(s) 112 can present or display information, including a user interface for interacting with (or collaborating regarding) initiating tasks. Using the client application, the client device(s) 112 can perform (or request to perform) various operations, such as executing a task and/or inputting text comprising actions or prompts to generate a specific output.

As illustrated in FIG. 1, the environment 100 also includes the server(s) 110. The server(s) 110 may generate, track, store, process, receive, and transmit electronic data, such as results, actions, determinations, responses, computer code, interactions with interface elements, and/or interactions between user accounts or client devices. For example, the server(s) 110 may receive an indication from the client device(s) 112 of a user interaction selecting an option that initiates a task or inputting text comprising actions or prompts to generate a specific output. In addition, the server(s) 110 can transmit data to the client device(s) 112. Indeed, the server(s) 110 can communicate with the client device(s) 112 to send and/or receive data via network 116. In some implementations, the server(s) 110 comprise(s) a distributed server where the server(s) 110 include(s) a number of server devices distributed across the network 116 and located in different physical locations. The server(s) 110 can comprise one or more content servers, application servers, container orchestration servers, communication servers, web-hosting servers, machine-learning servers, and other types of servers.

As shown in FIG. 1, the server(s) 110 can also include the intelligent selection and execution platform 102 as part of the content management system 108. The content management system 108 can communicate with the client device(s) 112 to perform various functions associated with the client application 114, such as managing user accounts, initiating tasks, and/or identifying content items. Indeed, content management system 108 can include a network-based smart cloud storage system to manage, store, and maintain content items and related data across numerous user accounts. In some embodiments, the intelligent selection and execution platform 102 and/or the content management system 108 utilize the database 118 to store and access information such as content items, training data sets, or data and/or information related to executing a task.

As also illustrated in FIG. 1, the content management system 108 can host a trained machine-learning model 104 and a hardware environment 106. In particular, the content management system 108 can host a trained machine-learning model 104, and a hardware environment 106 local to (e.g., a part of or integrated within) the content management system 108. For example, the content management system 108 utilizes the trained machine-learning model 104 and hardware environment 106 to execute tasks locally within the content management system 108. Indeed, the content management system 108 trains, maintains, and manages the workload of the trained machine-learning model 104 and the hardware environment 106.

As further illustrated in FIG. 1, the environment 100 includes the third-party server(s) 120 that host the third-party machine-learning model(s) 122. In particular, the third-party machine-learning model(s) 122 communicates with the server(s) 110, the client device(s) 112, the database 118, and/or the third-party server(s) 124 (or the third-party hardware environment(s) hosted on the third-party server(s) 124) for the intelligent selection and execution platform 102 to select a model and/or a hardware environment for executing a task or to schedule model training. For example, the intelligent selection and execution platform 102 provides domain-specific language segments to the third-party machine-learning model(s) 122, where the domain-specific language segments indicate data for generating results for various subcomponents. Indeed, the third-party machine-learning model(s) 122 can include a machine-learning model powered by neural networks or other machine-learning architectures for generating responses to text queries. In some cases, the third-party machine-learning model(s) 122 can refer to various third-party machine-learning models (e.g., ChatGPT, Lambda, Llama, BERT, RoBERTa, Turing-NLG, T5, XLNet).

As also illustrated in FIG. 1, the environment 100 includes the third-party server(s) 124 that host the third-party hardware environment(s) 126. In particular, the third-party hardware environment(s) 126 communicate with the server(s) 110, the client device(s) 112, the database 118, and/or the third-party server(s) 120 to execute tasks, such as by providing resources to execute tasks with a machine-learning model or to train a machine-learning model (e.g., based on training scheduled by the intelligent selection and execution platform 102). For example, the third-party hardware environment(s) provide computational power and memory for a machine-learning model to execute a task. Indeed, the third-party hardware environment(s) 126 can include graphical processing units and central processing units for executing a task and/or training a machine-learning model. In some cases, the third-party hardware environment(s) 126 can refer to various hardware environment(s) that include infrastructure available for a fee.

In some implementations, though not illustrated in FIG. 1, the environment 100 may have a different arrangement of components and/or may have a different number or set of components altogether. For example, the client device(s) 112 may communicate directly with the intelligent selection and execution platform 102 and not through network 116. The environment may also include one or more third-party systems, each corresponding to a different data source. In addition, the environment can include the database 118 located external to the server(s) 110 (e.g., in communication via the network 116) or located on the server(s) 110 and/or on the client device(s) 112.

Figure 2:
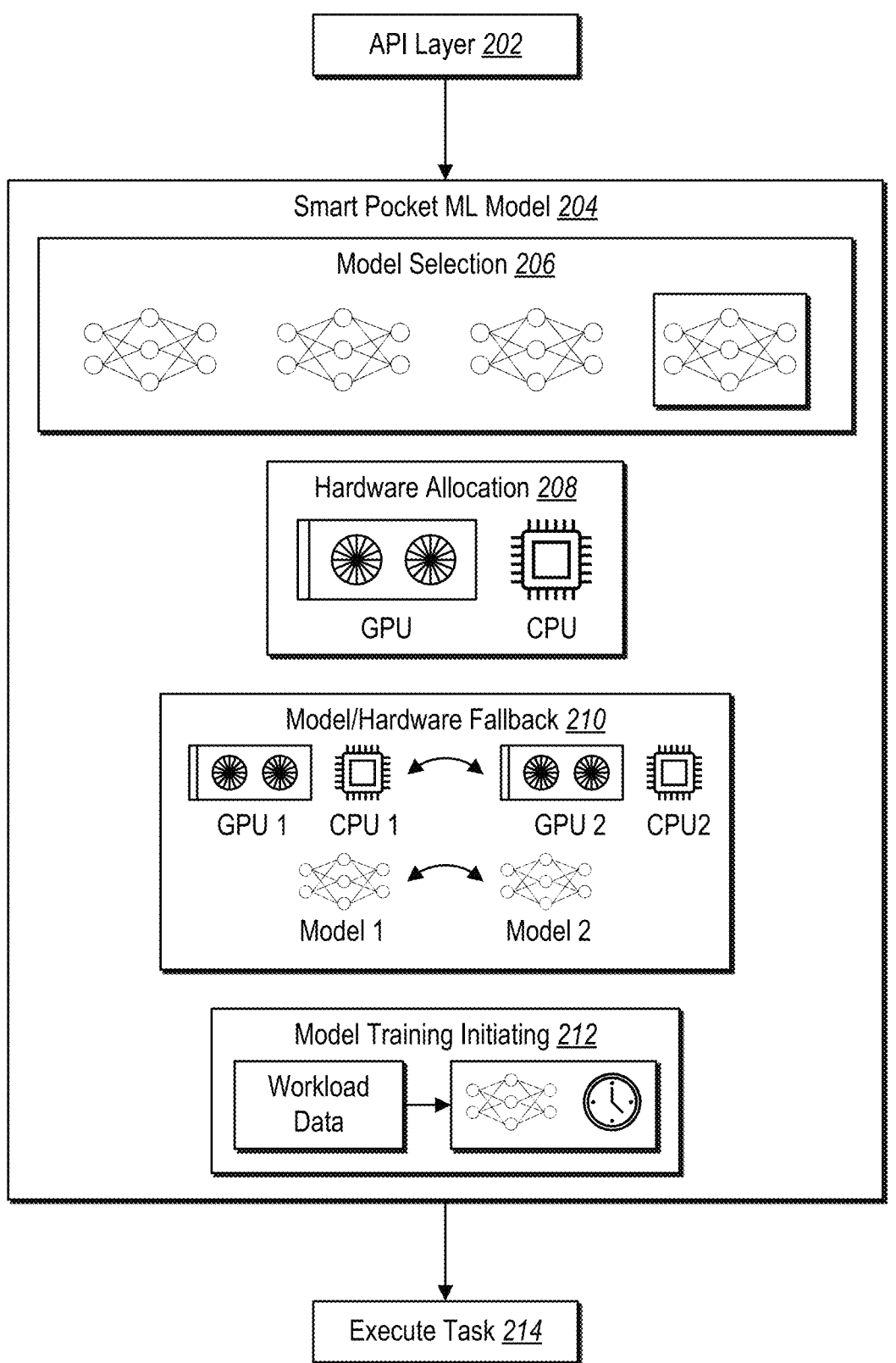
FIG. 2 illustrates an example diagram of an overview of an intelligent selection and execution platform utilizing a smart pocket ML model in accordance with one or more embodiments.

As mentioned, the intelligent selection and execution platform 102 can intelligently assign or allocate tasks for execution by specific artificial intelligence machine-learning models and hardware infrastructure. In particular, the intelligent selection and execution platform 102 can utilize a smart pocket ML model that can select an artificial intelligence model, allocate hardware, select fallback machine-learning models and/or hardware, and schedule model training. FIG. 2 illustrates an example diagram of an overview of an intelligent selection and execution platform 102 utilizing a smart pocket ML model in accordance with one or more embodiments.

As illustrated in FIG. 2, the intelligent selection and execution platform 102 includes an API layer 202 that receives prompts or workload data. In particular, the intelligent selection and execution platform 102 receives workload data that indicates (or requests) a desired outcome from a machine-learning model. For example, API layer 202 acts as a central repository for requests from third-party systems or applications to utilize a machine-learning model to execute a task. Moreover, in some instances, requests received by API layer 202 also comprise requests to access or utilize content items stored by the content management system 108 to execute a task. Indeed, API layer 202 receives prompts in a designated format that allows for various other systems to flexibly utilize machine-learning model capabilities by simply sending prompts to the API layer in the designated format. Additional detail regarding the API layer receiving prompts and/or workload data is provided in relation to FIG. 4 below.

As also illustrated in FIG. 2, the intelligent selection and execution platform 102 includes a smart pocket ML model 204. In particular, the smart pocket ML model 204 includes various layers for scheduling, routing, and intelligently selecting and designating hardware and software components for executing a particular task based on the availability of hardware and software components. For example, the smart pocket ML model 204 can include a trained model (or heuristic model), such as a neural network or a multi-armed bandit model, to determine how to allocate computing resources and hardware within the intelligent selection and execution platform 102, the content management system 108, third-party machine-learning models (e.g., third-party machine-learning model(s) 122) and/or third-party hardware (e.g., third-party hardware environment(s) 126).

In one or more embodiments, smart pocket ML model 204 or API layer 202 also include metrics of portions of the intelligent selection and execution platform 102 and/or the content management system 108. In particular, smart pocket ML model 204 or API layer 202 monitor the status of machine-learning models and/or hardware environments of the intelligent selection and execution platform 102 and/or the content management system 108. For example, smart pocket ML model 204 or API layer 202 may monitor or have access to metrics and/or data about graphical processing units (GPUs) of the intelligent selection and execution platform 102 and/or the content management system 108 that the intelligent selection and execution platform 102 can utilize in order to select models and/or hardware to execute a particular task.

As illustrated in FIG. 2, the smart pocket ML model 204 can include model selection 206. In particular, model selection 206 includes selecting a designated machine-learning model for executing a task. Specifically, the smart pocket ML model 204 selects a designated machine-learning model based on the workload features of the task and task routing metrics for a plurality of machine-learning models hosted in various network environments. For example, the plurality of machine-learning models includes a trained machine-learning model within the intelligent selection and execution platform 102 (or the content management system 108) and third-party machine-learning models hosted on third-party servers. Additional detail regarding the intelligent selection and execution platform 102 selecting and utilizing a machine-learning model to execute a task will be provided in relation to FIGS. 5-10 below.

In addition, as illustrated in FIG. 2, the smart pocket ML model 204 can include hardware allocation 208. In particular, the smart pocket ML model 204 can select one or more hardware environments to allocate resources for executing a task on a designated machine-learning model. For example, the smart pocket ML model 204 selects a designated hardware environment based on the workload features of the task and task routing metrics for a plurality of hardware environments hosted in various network environments. In some cases, the smart pocket ML model 204 selects a designated hardware environment from a hardware environment within the intelligent selection and execution platform 102 and third-party machine-learning models hosted on third-party servers. More detail regarding the intelligent selection and execution platform 102 selecting a hardware environment to execute a task will be provided in relation to FIGS. 12-15 below.

Moreover, as illustrated in FIG. 2, the smart pocket ML model 204 can include model/hardware fallback 210. In particular, the smart pocket ML model 204 can select a primary machine-learning model and a fallback machine-learning model for executing a task. In particular, the smart pocket ML model 204 can select a primary machine-learning model as a designated machine-learning model and, if the primary machine-learning model is unavailable, can reassign executing the task to the fallback machine-learning model. For example, the smart pocket ML model 204 extracts workload features defining characteristics of the task, determines task routing metrics for various hardware environments, and selects the primary machine-learning model and the fallback machine-learning model based on the workload features and task routing metrics. More details regarding the intelligent selection and execution platform 102 selecting a primary machine-learning model and a fallback machine-learning model are provided in relation to FIGS. 16-18 below.

In addition to selecting a primary machine-learning model and a fallback machine-learning model, the smart pocket ML model 204 can select a primary hardware environment and a fallback hardware environment. Specifically, if the primary hardware environment is unavailable, the smart pocket ML model 204 can allocate resources from the secondary hardware environment for executing the task. For example, the smart pocket ML model 204 extracts workload features defining characteristics of the task, determines task routing metrics for a plurality of hardware environments hosted in various network environments, and selects a primary hardware environment and a fallback hardware environment based on the workload features and the task routing metrics. Additional details regarding the intelligent selection and execution platform 102 selecting a primary hardware environment and a fallback hardware environment are provided with relation to FIG. 16 and FIGS. 19A-20B below.

Further, as illustrated in FIG. 2, the smart pocket ML model 204 can include model training initiating 212. In particular, the smart pocket ML model 204 initiates training tasks based on bandwidth availability and pauses training tasks based on bandwidth availability. For example, the smart pocket ML model 204 monitors hardware usage metrics for hardware environments in various network environments and based on the workload data of the training task and bandwidth availability indicated by the hardware usage metrics, the smart pocket ML model 204 can initiate the training task. Moreover, if the smart pocket ML model 204 detects a change in bandwidth availability, the smart pocket ML model 204 can pause the training task. Additional detail regarding the intelligent selection and execution platform 102 scheduling model training will be provided in relation to FIGS. 22-24 below.

As shown in FIG. 2, the intelligent selection and execution platform 102 can execute task 214. In particular, the intelligent selection and execution platform 102 can execute the task based on determinations or decisions from the smart pocket ML model 204. For example, the intelligent selection and execution platform 102 can execute the task using the designated machine-learning model and/or designated hardware environment or on the fallback machine-learning model and/or fallback hardware environment. As another example, the intelligent selection and execution platform 102 can execute the task by initiating and pausing training tasks based on bandwidth availability.

Figure 3:
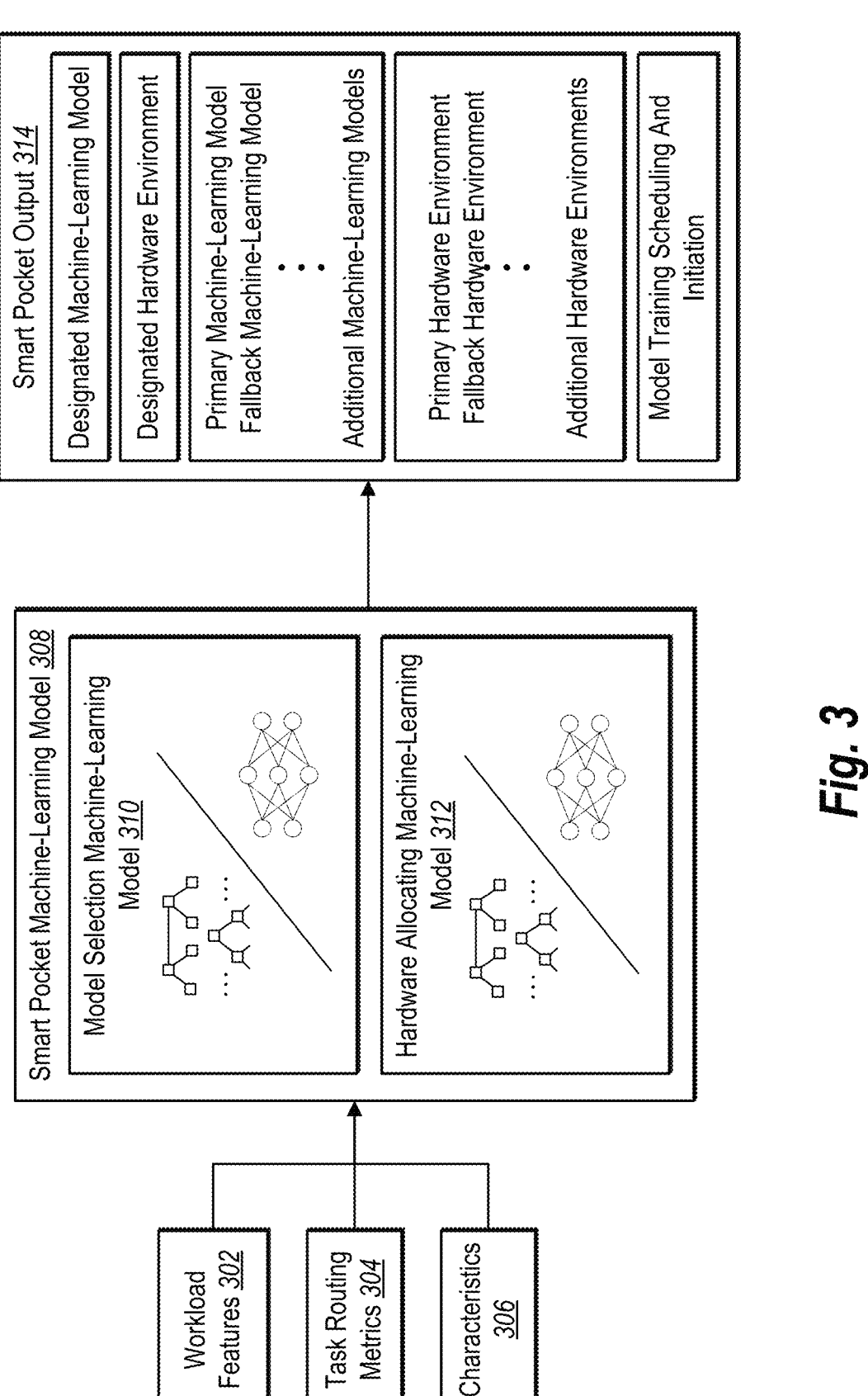
FIG. 3 illustrates an example diagram of an overview of an intelligent selection and execution platform utilizing a smart pocket machine-learning model in accordance with one or more embodiments.

As previously mentioned, the intelligent selection and execution platform 102 utilizes a smart pocket ML model to select machine-learning models, allocate hardware for tasks, and schedule model training. In particular, the intelligent selection and execution platform 102 utilizes a smart pocket machine-learning model to select models and/or hardware environments for executing a task and/or scheduling model training. FIG. 3 illustrates an example diagram of an overview of an intelligent selection and execution platform utilizing a smart pocket machine-learning model in accordance with one or more embodiments.

As shown in FIG. 3, the intelligent selection and execution platform 102 utilizes the smart pocket machine-learning model 308 to generate output 314. In particular, the smart pocket machine-learning model 308 generates output 314 based on characteristics of a task and various metrics that indicate costs for executing the task or whether a machine-learning model and/or hardware environment is available to execute a task. For example, the intelligent selection and execution platform 102 provides characteristics of the task to smart pocket machine-learning model 308 by extracting workload features 302 from workload data. In some cases, workload features 302 indicate estimated processing requirements or estimated storage requirements for executing a task. Moreover, task routing metrics 304 indicate whether a machine-learning model and/or hardware environment is available to execute a task and/or costs for executing the task on the machine-learning model and/or hardware environment. In addition, the intelligent selection and execution platform 102 can identify or determine characteristics 306 that indicate certain characteristics and/or specialties of a machine-learning model or hardware environment. Example task routing metrics for machine-learning models are discussed further in relation to FIG. 7 below. In addition, example task routing metrics for hardware environments are discussed further in relation to FIG. 12 below.

In one or more embodiments, smart pocket machine-learning model 308 is trained, tuned, or optimized to generate output 314. In some cases, smart pocket machine-learning model 308 is a multi-armed bandit model or optimization model that is optimized to generate output 314, such as a designated (and fallback) machine-learning model from a plurality of machine-learning models, a designated (and fallback) hardware environment from a plurality of hardware environments or initiating model training. In other cases, smart pocket machine-learning model 308 is a machine-learning model or neural network that is trained or tuned to select a designated (and fallback) machine-learning model from a plurality of machine-learning models, select a designated (and fallback) hardware environment from a plurality of hardware environments, or schedule model training.

As indicated in FIG. 3, in one or more embodiments, smart pocket machine-learning model 308 comprises multiple machine-learning models working in series to generate output 314. Specifically, smart pocket machine-learning model 308 can utilize a model selection machine-learning model 310 and a hardware allocating machine-learning model 312. For example, the intelligent selection and execution platform 102 utilizes the model selection machine-learning model 310 to select a designated machine-learning model and additional machine-learning models as fallback machine-learning models for executing a task. Moreover, the intelligent selection and execution platform 102 utilizes the hardware allocating machine-learning model 312 to select a designated hardware environment and additional hardware environments for executing the task. Additional detail regarding the intelligent selection and execution platform 102 utilizing a model selection machine-learning model is provided below in relation to FIG. 8 below. Additional details regarding the intelligent selection and execution platform 102 utilizing a hardware allocating machine-learning model are provided below, in relation to FIG. 14 below.

Figure 4:
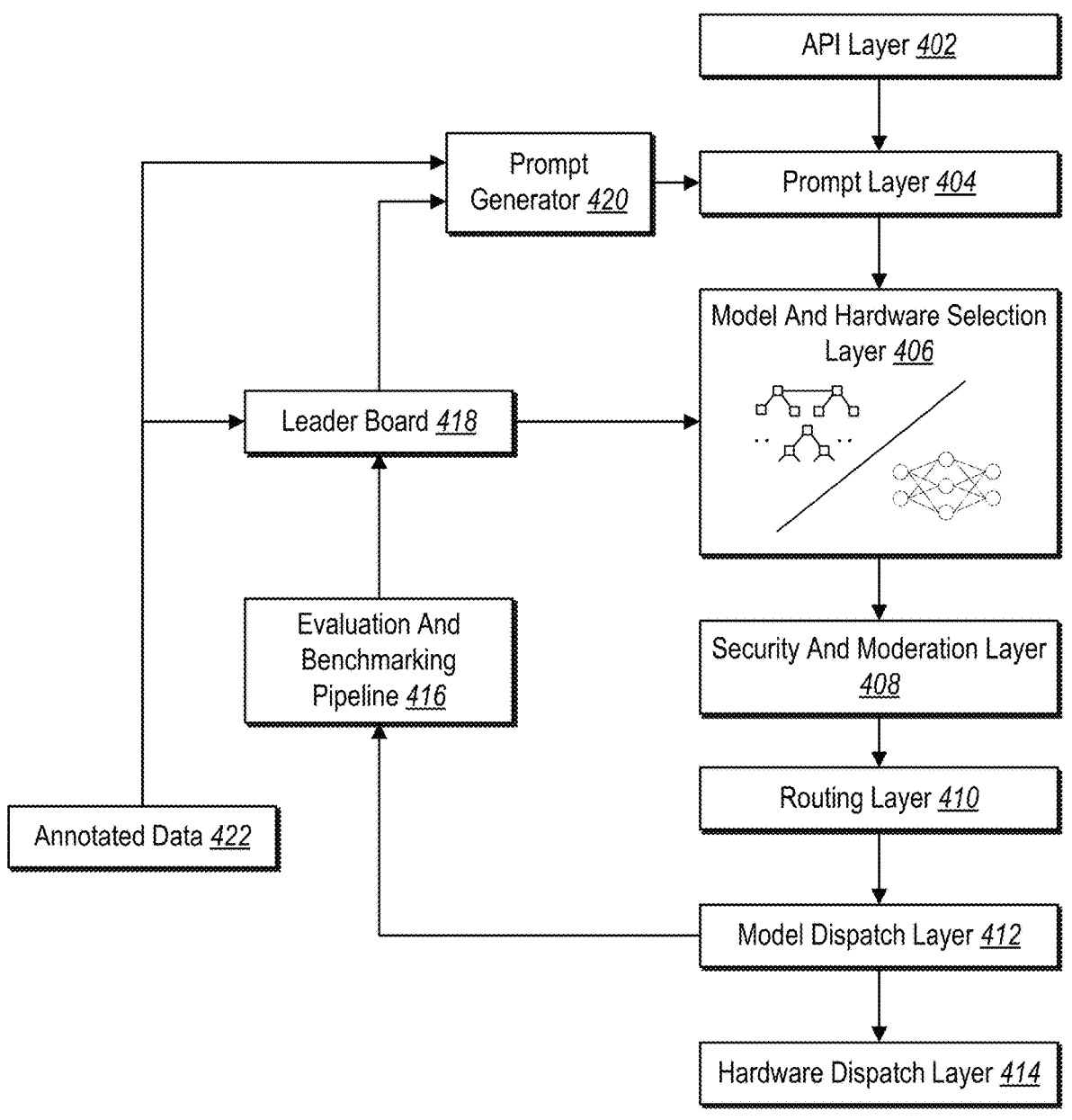
FIG. 4 illustrates an example diagram of an overview of layers of an intelligent selection and execution platform in accordance with one or more embodiments.

In one or more embodiments, the intelligent selection and execution platform 102 utilizes a computing stack to execute various processes or actions. In particular, the intelligent selection and execution platform 102 utilizes various layers of the computing stack to perform various actions, such as selecting machine-learning models and/or hardware environments, selecting primary and fallback machine-learning models, and scheduling and/or initiating training tasks. FIG. 4 illustrates an example diagram of an overview of layers of an intelligent selection and execution platform in accordance with one or more embodiments.

As illustrated in FIG. 4, the intelligent selection and execution platform 102 comprises an API layer 402 that receives workload data. In particular, API layer 402 is an application programming interface (API) layer that receives workload data that requests the execution of a task using a machine-learning model. For example, the workload data can comprise data or information that represents the level and nature of the task or estimated hardware or software requirements for executing the task. In some cases, workload data comprises parameters for executing the task, such as a request to use (or not use) a particular machine-learning model or hardware environment.

In one or more embodiments, API layer 402 receives workload data from a client device connected by a network to a content management system 108. Specifically, through API layer 402, other systems, applications, or devices can connect to resources of the content management system 108 or utilize resources of the content management system 108 when executing the task. For example, workload data may comprise a request to execute a task using a machine-learning model and content items within the content management system 108. Additional details regarding the intelligent selection and execution platform 102 receiving workload data from a client device are provided with relation to FIG. 6 below.

In one or more embodiments, workload data is in a designated format for the API layer 402. Specifically, the intelligent selection and execution platform 102 requires a designated format for third-party systems to access the intelligent selection and execution platform 102 (or the content management system 108) through API layer 402. For example, workload data provided to API layer 402 can comprise a request to execute a task using a machine-learning model. Moreover, workload data provided to API layer 402 does not need to specify a machine-learning model on which to execute the task. Indeed, so long as a request to API layer 402 is in the designated format, the intelligent selection and execution platform 102 can select a designated (optimal) machine-learning model and/or hardware environment for executing the task.

Moreover, in one or more embodiments, API layer 402 is part of the content management system 108 and is not limited to the intelligent selection and execution platform 102. Specifically, API layer 402 can be an API layer of the content management system 108, where API layer 402 is a central repository for third-party systems and applications that would like to access the content management system 108. Upon receiving an API call in API layer 402, the content management system 108 can utilize the intelligent selection and execution platform 102 to select a designated (and fallback) machine-learning model and/or designated hardware environment for executing a task. For example, when the content management system 108 receives an API call at API layer 402 and identifies that workload data included in the API call comprises a request to execute a task using a machine-learning model, the content management system 108 can utilize the intelligent selection and execution platform 102 to select a designated (and fallback) machine-learning model and/or designated (and fallback) hardware environment for executing the task.

In addition to receiving workload data, API layer 402 monitors hardware usage metrics. Specifically, the API layer 402 monitors hardware usage metrics for a plurality of hardware environments in respective network environments and acts as a central location with knowledge of availability for the hardware environments. For example, the API layer 402 may monitor hardware usage metrics for various GPU and/or CPU units of the plurality of hardware environments.

As further illustrated in FIG. 4, the intelligent selection and execution platform 102 comprises a prompt layer 404. In one or more embodiments, when the request to initiate a task indicates or requests the intelligent selection and execution platform 102 to execute a task using a large language model as the machine-learning model, prompt layer 404 provides prompts for a large language model to generate a certain output. In some cases, prompt layer 404 utilizes prompt templates that the intelligent selection and execution platform 102 can utilize to generate a certain output from a large language model. For example, each prompt template comprises a previously written and tested prompt that generates a consistent output from a large language model.

In other cases, prompt layer 404 receives prompts from prompt generator 420. In particular, prompt generator 420 is a paradigm that utilizes algorithms to generate prompts for large language models by optimizing large language model prompts and weights. For example, prompt generator 420 generates and optimizes prompts for large language models based on a training data set and corresponding metrics. In addition, the prompt generator 420 can fine-tune the large language model, resulting in a smaller model optimized for a specific task. Prompt layer 404 can also store prompts generated by prompt generator 420 for future use by the intelligent selection and execution platform 102.

In some embodiments, the intelligent selection and execution platform 102 may receive a prompt as part of workload data received in API layer 402. Specifically, the intelligent selection and execution platform 102 can receive a prompt from a third-party system or application as part of the workload data of an API call. In some cases, the intelligent selection and execution platform 102 can provide the prompt directly from the API layer to the prompt layer (e.g., without utilizing the prompt generator 420). In other cases, the intelligent selection and execution platform 102 will utilize the prompt generator 420 to optimize a prompt received from a third-party application or third-party system.

As also illustrated in FIG. 4, the intelligent selection and execution platform 102 includes a model and hardware selection layer 406. In particular, model and hardware selection layer 406 selects a designated (and fallback) machine-learning model for executing a task and a designated (and fallback) hardware environment for executing a task. In some cases, the model and hardware selection layer 406 comprises one or more machine-learning models, such as the smart pocket machine-learning model 308, the model selection machine-learning model 310, or the hardware allocating machine-learning model 312.

As illustrated in FIG. 4, the intelligent selection and execution platform 102 comprises a leaderboard 418. In one or more embodiments, leaderboard 418 is a database that holds performance metrics (or task routing metrics), including latency metrics and model quality metrics, for all machine-learning models, both a trained machine-learning model local to the content management system 108 and third-party machine-learning models. For example, leaderboard 418 comprises leaderboards grouped by task, with each task featuring a list of machine-learning models and their associated performance metrics. Moreover, leaderboard 418 can also comprise one or more leaderboards for specific tasks. For example, leaderboard 418 can comprise a summarization leaderboard that collects all machine-learning models that support summarization and the corresponding metrics for the machine-learning models.

Moreover, as illustrated in FIG. 4, model and hardware selection layer 406 can read data and other information from a leaderboard 418. model and hardware selection layer 406 can utilize data, metrics, and other information from leaderboard 418 to select designated (and fallback) machine-learning models and designated (and fallback) hardware environments. For example, leaderboard 418 comprises model quality metrics based on previous output generated by each machine-learning model. The intelligent selection and execution platform 102 generates model quality metrics based on user feedback data from evaluation and benchmarking pipeline 416 indicating user satisfaction with the performance of corresponding machine-learning models.

As further illustrated in FIG. 4, the intelligent selection and execution platform 102 comprises a security and moderation layer 408. In particular, security and moderation layer 408 provides security and moderation for prompts for machine-learning models to protect against breaches or other security concerns, particularly with open-source machine-learning models. For example, the intelligent selection and execution platform 102 can utilize third-party security systems that specialize in providing security protection for artificial intelligence models (e.g., Lakera Guard or Purple Llama).

In addition, as illustrated in FIG. 4, the intelligent selection and execution platform 102 comprises a routing layer 410. Specifically, the routing layer 410 routes data or other information between components of the intelligent selection and execution platform 102. For example, the routing layer 410 routes data between machine-learning models, hardware environments, and the content management system, among others, in order to determine task routing metrics, receive workload data comprising a request to execute a task, and receive prompts.

As further illustrated in FIG. 4, the intelligent selection and execution platform 102 comprises a model dispatch layer 412 that provides data and other information to selected machine-learning models. Specifically, model dispatch layer 412 provides prompts to designated machine-learning models to execute a task. Moreover, model dispatch layer 412 can also receive user feedback data indicating user satisfaction with the execution of the prompt and provide the user feedback data to the evaluation and benchmarking pipeline 416.

As also illustrated in FIG. 4, the intelligent selection and execution platform 102 comprises a hardware dispatch layer 414. In particular, the hardware dispatch layer 414 provides data to (and communicates with) hardware environments for executing tasks using selected models. For example, hardware dispatch later can be a hardware environment of the intelligent selection and execution platform 102 or a third-party hardware environment. In some cases, the hardware environment is Nvidia, AWS, Google cloud, or other suitable third-party hardware environment.

Moreover, as illustrated in FIG. 4, the intelligent selection and execution platform 102 can comprise annotated data 422. In particular, annotated data 422 comprises labeled output from various machine-learning models. In one or more embodiments, the intelligent selection and execution platform 102 accesses annotated data 422 to evaluate quality for machine-learning models based on performance metrics, financial cost metrics, or execution time metrics. In some cases, the intelligent selection and execution platform 102 will use annotated data 422 to calibrate model ranking in leaderboard 418 and to train and optimize prompts for prompt generator 420.

Figure 5:
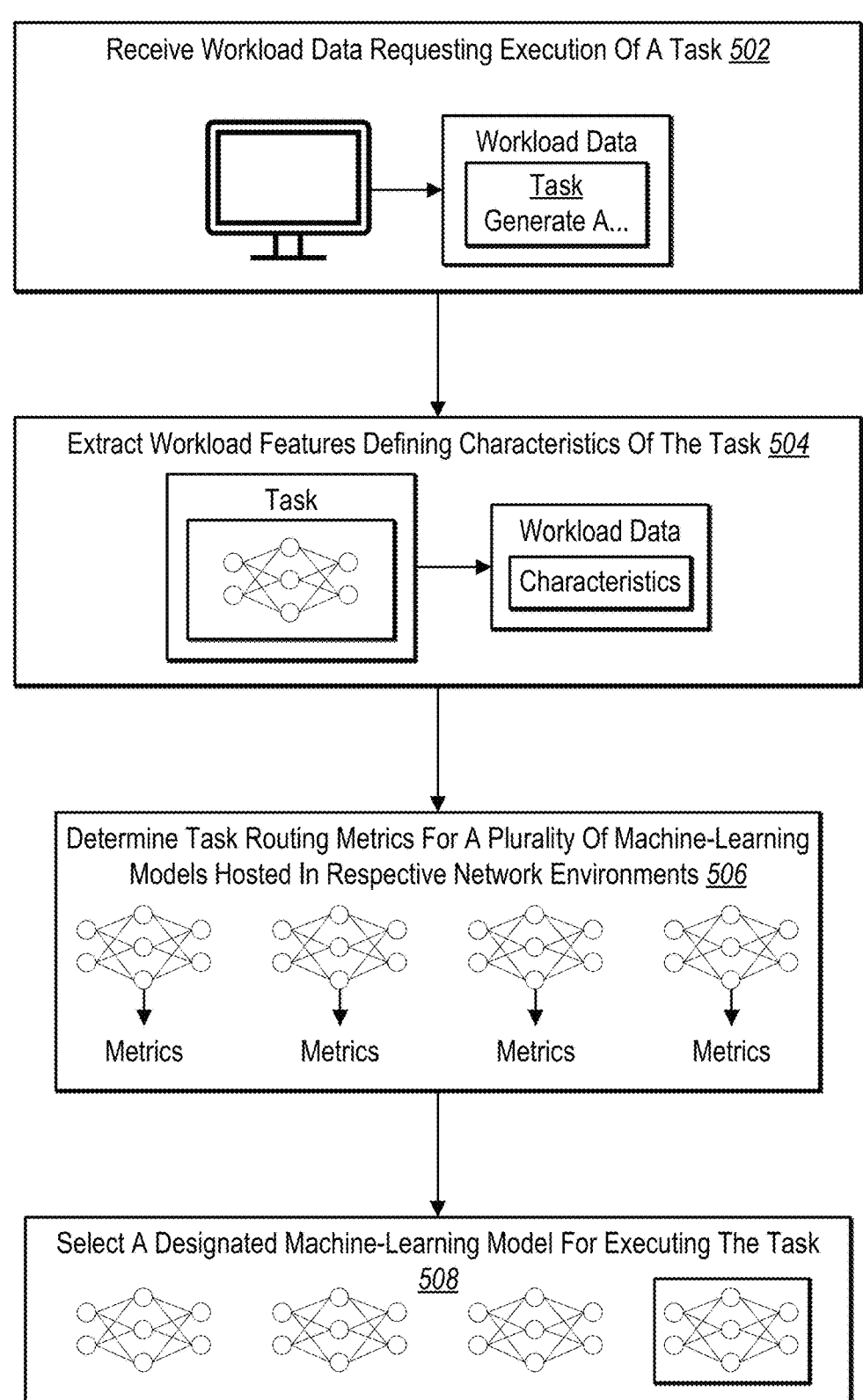
FIG. 5 illustrates a schematic diagram of an overview of an intelligent selection and execution platform selecting a designated machine-learning model for executing a task in accordance with one or more embodiments.

As previously mentioned, the intelligent selection and execution platform 102 selects a model for executing a task. In particular, the intelligent selection and execution platform 102 selects a model for the task based on workload features defining characteristics of the task and task routing metrics of machine-learning models. FIG. 5 illustrates a schematic diagram of an intelligent selection and execution platform selecting a designated model for executing a task in accordance with one or more embodiments.

As shown in FIG. 5, the intelligent selection and execution platform 102 performs an act 502 and receives workload data requesting the execution of a task. In particular, the intelligent selection and execution platform 102 receives workload data from a device connected to the content management system that requests the execution of a task. For example, workload data comprises the necessary data and/or information for executing the task, such as a request to execute the task using a machine-learning model. In one or more embodiments, the intelligent selection and execution platform 102 receives workload data through an API layer, as described in relation to FIG. 4 above.

In one or more embodiments, the intelligent selection and execution platform 102 workload data comprises parameters for executing a task. Specifically, the workload data comprises parameters comprising requests or specifications for executing a task. For example, workload data can comprise a parameter that instructs the intelligent selection and execution platform 102 to utilize a certain machine-learning model for executing a task or to execute the task using a certain hardware environment. As another example, workload data can comprise a constraint that instructs the intelligent selection and execution platform 102 not to utilize a certain machine-learning model or hardware environment to execute a task. Additional details regarding the intelligent selection and execution platform 102 receiving workload data and parameters or constraints for executing a task are provided with relation to FIG. 6 below.

As also shown in FIG. 5, the intelligent selection and execution platform 102 performs an act 504 and extracts, from the workload data, workload features defining characteristics of the task. In particular, the intelligent selection and execution platform 102 extracts workload features by determining an amount of processing and storage needed for executing the task. For example, the intelligent selection and execution platform 102 can compute the computational cost for executing a task using a specific machine-learning model. In some cases, the intelligent selection and execution platform 102 determines processing requirements and storage requirements for executing the task on trained machine-learning models within the content management system and third-party machine-learning models. Additional details regarding extracting workload features from workload data are discussed in FIG. 6 below.

As also shown, the intelligent selection and execution platform 102 performs an act 506 and determines task routing metrics for a plurality of models hosted in respective network environments. In particular, the intelligent selection and execution platform 102 determines task routing metrics that indicate the availability of machine-learning models, such as whether they are available to perform the task. For example, the intelligent selection and execution platform 102 determines a model state that indicates a current operation status, resource usage metrics, or operational metrics for each machine-learning model of the plurality of machine-learning models. As another example, the intelligent selection and execution platform 102 determines a model capability indicating that a machine-learning model is able to execute a certain task or perform a certain action, a model specialty indicating that a machine-learning model is adept at performing a certain action or task, or a model fit indicating alignment of the machine-learning model with a task.

In addition, in one or more embodiments, the intelligent selection and execution platform 102 determines task routing metrics for executing the task on various machine-learning models. In particular, the intelligent selection and execution platform 102 determines task routing metrics indicating costs or lengths of executing a task on each machine-learning model of the plurality of machine-learning models. For example, the intelligent selection and execution platform 102 determines financial cost metrics, execution time metrics, or execution cost metrics for executing the task on each machine-learning model in the plurality of machine-learning models. Additional details regarding the intelligent selection and execution platform 102 determining task routing metrics for a plurality of machine-learning models hosted in respective network environments are provided in relation to FIG. 7 below.

As illustrated in FIG. 5, the intelligent selection and execution platform 102 can also perform an act 508 and select a designated machine-learning model for executing the task. In particular, the intelligent selection and execution platform 102 uses workload features and task routing metrics to select a designated machine-learning model for executing the task. For example, the intelligent selection and execution platform 102 selects a machine-learning model by using a trained model (or heuristic model), such as a neural network or a multi-armed bandit model, to determine an optimal model for a task. In one or more embodiments, the intelligent selection and execution platform 102 utilizes a model selection machine-learning model to select a designated machine-learning model. In some cases, the model selection machine-learning model is trained, tuned, or optimized to select machine-learning models for executing tasks.

As mentioned, in one or more embodiments, the intelligent selection and execution platform 102 selects a designated machine-learning model for executing a task based on workload features and task routing metrics. Specifically, the intelligent selection and execution platform 102 utilizes the model selection machine-learning model to analyze the workload features and task routing metrics and select a designated machine-learning model for executing the task. For example, the model selection machine-learning model generates an optimization metric based on the workload features and the task routing metrics and selects the designated machine-learning model based on the optimization metric. Additional detail regarding the intelligent selection and execution platform 102 utilizing a model selection machine-learning model to select a designated machine-learning model for executing a task is discussed further in relation to FIG. 8 below.

In one or more embodiments, the intelligent selection and execution platform 102 can add additional machine-learning models to the plurality of machine-learning models. Specifically, the intelligent selection and execution platform 102 updates parameters of the smart pocket machine-learning model or the model selection machine-learning model based on task routing metrics of the additional machine-learning model. For example, upon updating the model selection machine-learning model, the intelligent selection and execution platform 102 can select the additional trained model from among the plurality of trained machine-learning models. Additional detail regarding the intelligent selection and execution platform 102 adding an additional machine-learning model to a plurality of machine-learning models is provided below in relation to FIG. 9 below.

Further, in one or more embodiments, after selecting the model, the intelligent selection and execution platform 102 trains the model (or heuristic model) used to select from the various models based on use feedback. In particular, the intelligent selection and execution platform 102 can update the parameters of the model-selection machine-learning model based on user feedback data upon execution of the task. For example, the intelligent selection and execution platform 102 receives user feedback data by receiving explicit feedback (e.g., selecting quality options) or implicit feedback (e.g., user reactions to the executed task). Additional details regarding receiving user feedback data and using user feedback data to update parameters of the model-selection machine-learning model are provided in relation to FIGS. 10A-10B below.

Figure 6:
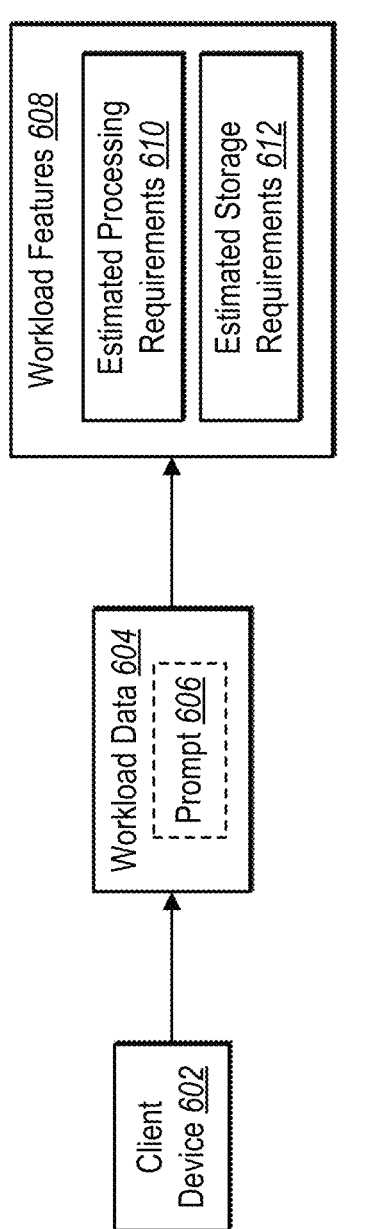
FIG. 6 illustrates a schematic diagram of an intelligent selection and execution platform extracting workload features from workload data requesting execution of a task in accordance with one or more embodiments.

As previously mentioned, the intelligent selection and execution platform 102 extracts workload features from workload data. In particular, the intelligent selection and execution platform 102 receives, from a client device, workload data requesting the execution of a task and extracts workload features defining characteristics of the task from the workload data. FIG. 6 illustrates a schematic diagram of an intelligent selection and execution platform 102 extracting workload features from workload data requesting execution of a task in accordance with one or more embodiments.

As illustrated in FIG. 6, the intelligent selection and execution platform 102 receives workload data 604 from a client device 602. Specifically, the intelligent selection and execution platform 102 receives workload data 604 from client device 602 that is connected to a content management system (e.g., content management system 108). In one or more embodiments, the intelligent selection and execution platform 102 receives workload data 604 from an application associated with the content management system 108. In some cases, the intelligent selection and execution platform 102 receives workload data 604 based on user input within an application (e.g., within a graphical user interface) of content management system 108 on client device 602. In other cases, the intelligent selection and execution platform 102 receives workload data 604 based on user input within a third-party application on client device 602 that is connected to the content management system 108.

As previously mentioned in relation to FIG. 4 above, in one or more embodiments, the intelligent selection and execution platform 102 receives workload data 604 through an application programming interface (API). Specifically, the intelligent selection and execution platform 102 communicates with third-party applications on the client device 602 through an API (e.g., API layer 402) to exchange data, request execution of tasks, or perform additional actions. For example, the intelligent selection and execution platform 102 receives workload data 604 as part of an API call in a designated format required by the intelligent selection and execution platform 102 (or the content management system 108) and where the API call initiated from user interactions with the third-party application on the client device.

As previously mentioned, in some embodiments, workload data 604 comprises a request for the execution of a task. In particular, the request for execution of a task comprises a request to execute the task using a machine-learning model. Indeed, workload data 604 needs simply request the execution of a task using a machine-learning model for the intelligent selection and execution platform 102 to select a designated (and fallback) machine-learning model and/or designated (and fallback) hardware environment for executing the task. For example, a third-party application or system may provide workload data requesting the execution of a task using a machine-learning model (e.g., a large language mode) as part of an API call, and as long as the API call is in the designated format, the intelligent selection and execution platform 102 can select designated machine-learning models and/or designated hardware environments for executing the task.

In addition, in one or more embodiments, workload data 604 comprises parameters for executing the task. Specifically, parameters indicate a condition for executing the task that indicates a desire or request for the intelligent selection and execution platform 102 to utilize when selecting a designated machine-learning model and/or designated hardware environment. In one or more embodiments, a parameter can indicate a request to execute a task using a preferred machine-learning model or a preferred hardware environment. Specifically, a parameter that indicates a preferred machine-learning model or a preferred hardware environment will also specify a model identification that indicates a preferred machine-learning model and/or preferred hardware environment. For example, a preferred machine-learning model can be a personalized machine-learning model that is trained or tuned to provide specific output.

Moreover, in one or more embodiments, parameters are not included in workload data 604 but are provided or indicated in another portion of the intelligent selection and execution platform 102. For example, in cases where a parameter is indicated by a service agreement with a third-party system or application, the intelligent selection and execution platform 102 may identify the parameters based on other data. For instance, the intelligent selection and execution platform 102 may train a model selection machine-learning model to identify that workload data 604 from certain third-party systems or applications comprise certain parameters (e.g., a certain machine-learning model or certain hardware environment).

In one or more embodiments, a parameter can indicate a constraint for executing a task. Specifically, a constraint indicates a desire or request for the intelligent selection and execution platform 102 to not select certain machine-learning models or hardware environments. For example, a parameter may comprise a constraint to not use any third-party machine-learning models or hardware environments and use only the trained machine-learning model and hardware environment of the intelligent selection and execution platform 102. As another example, a parameter can comprise a constraint to refrain from using any personalized machine-learning models and use only generic machine-learning models.

Further, in some embodiments, a parameter may indicate whether or not to use another machine-learning model or hardware environment if the preferred machine-learning model or the preferred hardware environment is unavailable. For example, in some cases, a parameter may indicate that another machine-learning model or hardware environment may be selected if the preferred machine-learning model or preferred hardware environment is unavailable. In other cases, a parameter may indicate selecting only the preferred machine-learning model or preferred hardware environment and performing another action (e.g., providing an error message) if the preferred machine-learning model or the preferred hardware environment is unavailable.

As shown in FIG. 6, workload data 604 can optionally comprise a prompt 606. Specifically, when workload data 604 indicates that the task should utilize a large language model to execute the task, workload data 604 can include prompt 606 that comprises instructions for a large language model to generate a specific output when (or as part of) executing the task. For example, a third-party application or system may provide the prompt as part of workload data 604. The intelligent selection and execution platform 102 may utilize prompt 606 as provided in relation to workload data 604 or may optimize the prompt (e.g., using prompt generator 420).

As previously mentioned, the intelligent selection and execution platform 102 extracts workload features from workload data. As illustrated in FIG. 6, the intelligent selection and execution platform 102 extracts workload features 608 from workload data 604. In one or more embodiments, the intelligent selection and execution platform 102 extracts workload features 608 from workload data 604 by determining estimated processing requirements 610 for executing the task requested in workload data 604. Specifically, the intelligent selection and execution platform 102 generates estimated processing requirements by determining an estimated processing power requirement, an estimated processing power requirement, an estimated memory requirement, or an estimated hardware environment requirement. For example, an estimated memory requirement indicates an amount of RAM required to execute the task, and an estimated hardware environment requirement indicates the estimated CPU or GPU requirements for executing the task.

As also illustrated in FIG. 6, in some embodiments, the intelligent selection and execution platform 102 extracts workload features 608 by determining estimated storage requirements 612. In particular, the intelligent selection and execution platform 102 determines estimated storage requirements by determining data storage device requirements for executing the task. For example, in one or more embodiments, the intelligent selection and execution platform 102 determines an amount of data storage requirements or a type of data storage requirements for executing the task.

Figure 7:
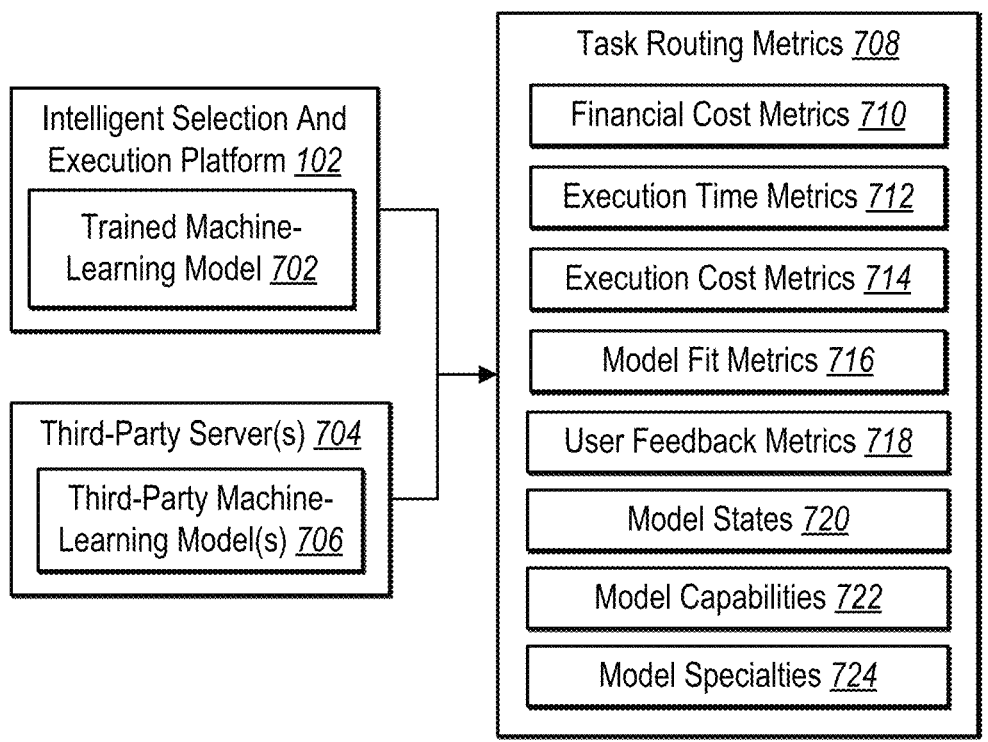
FIG. 7 illustrates a schematic diagram of an intelligent selection and execution platform determining task routing metrics for a plurality of machine-learning models hosted in respective network environments in accordance with one or more embodiments.

As previously mentioned, the intelligent selection and execution platform 102 determines task routing metrics for machine-learning models. In particular, the intelligent selection and execution platform 102 determines task routing metrics for a trained machine-learning model of the intelligent selection and execution platform 102 and one or more third-party trained models. FIG. 7 illustrates a schematic diagram of an intelligent selection and execution platform determining task routing metrics for a plurality of machine-learning models hosted in respective network environments in accordance with one or more embodiments.

As illustrated in FIG. 7, in some embodiments, the intelligent selection and execution platform 102 determines task routing metrics 708 for a plurality of machine-learning models. Specifically, the intelligent selection and execution platform 102 determines task routing metrics 708 that indicate costs, timeframes, capabilities, fit, or feedback for each model of a plurality of machine-learning models and which the intelligent selection and execution platform 102 can further provide as input for a model selection machine-learning model. As illustrated, the intelligent selection and execution platform 102 can determine task routing metrics 708 for machine-learning models in their respective environments, including a trained machine-learning model 702 that resides on (or is local to) the intelligent selection and execution platform 102 and third-party machine-learning model(s) 706 that reside on third-party server(s) 704. Indeed, the intelligent selection and execution platform 102 determines task routing metrics for the trained machine-learning model 702 or the third-party machine-learning model(s) 706 in order to determine an optimal machine-learning model (e.g., based on an optimization metric).

In one or more embodiments, as shown in FIG. 7, the intelligent selection and execution platform 102 can determine task routing metrics 708 by determining financial cost metrics 710. In particular, intelligent selection and execution platform 102 can determine financial cost metrics 710 by determining financial costs for executing the task on the trained machine-learning model 702 or the third-party machine-learning model(s) 706 (e.g., how much it will cost to execute the task using that model). For example, the intelligent selection and execution platform 102 can determine a currency amount for executing a task on the trained machine-learning model and the third-party machine-learning model(s). In one or more embodiments, the intelligent selection and execution platform 102 can also determine financial cost metrics 710 based on a use time period during which the intelligent selection and execution platform 102 executes the task. For example, financial cost metrics 710 may be higher when executing a task on a third-party machine-learning model at a high-use (or peak) time period than when executing the task during a minimum-use (or non-peak) time period.

As also shown in FIG. 7, in some embodiments, the intelligent selection and execution platform 102 can determine task routing metrics 708 by determining execution time metrics 712. Specifically, the intelligent selection and execution platform 102 determines execution time metrics 712 by determining an execution time for executing the task on the trained machine-learning model 702 or the third-party machine-learning model(s) 706. For example, the intelligent selection and execution platform 102 can determine that a first machine-learning model will execute a task in a first time frame and a second machine-learning model will execute the task in a second time frame based on execution time metrics 712 for each respective model. To illustrate, a third-party machine-learning model(s) 706 could execute the task in less time than a trained machine-learning model 702 (or vice versa).

In some embodiments, as shown in FIG. 7, the intelligent selection and execution platform 102 determines task routing metrics 708 by determining execution cost metrics 714. In particular, the intelligent selection and execution platform 102 determines execution cost metrics 714 by determining execution costs indicating computational costs for executing the task on the trained machine-learning model 702 or the third-party machine-learning model(s) 706. For example, the intelligent selection and execution platform 102 determines a compute metric indicating the amount of computational power required for executing the task on the trained machine-learning model 702 or the third-party machine-learning model(s) 706. As another example, the intelligent selection and execution platform 102 can determine an execution cost metric by determining an amount of CPU or GPU required by the trained machine-learning model 702 or the third-party machine-learning model(s) 706 to execute the task.

Further, as shown in FIG. 7, in one or more embodiments, the intelligent selection and execution platform 102 can determine task routing metrics 708 by determining model fit metrics 716. In particular, the intelligent selection and execution platform 102 determines model fit metrics 716 by determining model alignment for executing the task on the trained machine-learning model 702 and/or the third-party machine-learning model(s) 706. For example, the intelligent selection and execution platform 102 determines if the trained machine-learning model 702 or the third-party machine-learning model(s) 706 comprise an amount of computational power that is more than necessary for executing the task (e.g., using a larger machine-learning model for a small task) or if they can execute the task but comprises a smaller amount of computational power (e.g., using a smaller machine-learning model for a large task).

In addition, as illustrated in FIG. 7, in some embodiments, the intelligent selection and execution platform 102 can determine task routing metrics 708 by determining user feedback metrics 718. In particular, the intelligent selection and execution platform 102 determines user feedback metrics 718 by accessing user feedback data comprising stored quality indicators specific to each model of the plurality of machine-learning models. As previously mentioned, the intelligent selection and execution platform 102 can receive user feedback data indicating user satisfaction with the performance of a machine-learning model or execution of the task. The intelligent selection and execution platform 102 can access the user feedback data and determine user feedback metrics 718 that indicate an estimated user satisfaction of a task executed on the trained machine-learning model 702 or the third-party machine-learning model(s) 706 (e.g., indicating whether a user will be satisfied with a task).

As also illustrated in FIG. 7, in some embodiments, the intelligent selection and execution platform 102 determines task routing metrics 708 by determining model states 720. Specifically, the intelligent selection and execution platform 102 determines model states 720, which indicate whether the trained machine-learning model 702 or the third-party large-language model(s) 706 are available to execute a task. For example, model states 720 can comprise inferences or inference times of the trained machine-learning model 702 or the third-party large-language model(s) 706 indicating whether or not the trained machine-learning model 702 or the third-party large-language model(s) 706 are able to execute tasks. To illustrate, an inference time may indicate that the trained machine-learning model 702 or the third-party large-language model(s) 706 are executing tasks, and, as a result, response times from each respective model may not meet a response time threshold.

Moreover, as illustrated in FIG. 7, the intelligent selection and execution platform 102 can determine task routing metrics 708 by determining model capabilities 722. In particular, the intelligent selection and execution platform 102 determines model capabilities 722 by determining that the trained machine-learning model 702 or the third-party large-language model(s) 706 are able to perform certain actions. For example, model capabilities 722 indicates that, if provided a request to execute a certain task, the trained machine-learning model 702 or the third-party large-language model(s) 706 are capable of executing the task. To illustrate, model capabilities 722 can indicate that the trained machine-learning model 702 or the third-party large-language model(s) 706 are capable of receiving a certain kind of input, generating a certain kind of output, executing a certain task, or executing tasks of a certain size (e.g., large tasks). In some cases, the intelligent selection and execution platform 102 identifies that a task is a hot path task that requires continuous execution and will utilize a model capability metric to align the task with the hot path task.

Also, as shown in FIG. 7, in one or more embodiments, the intelligent selection and execution platform 102 determines task routing metrics 708 by determining model specialties 724. Specifically, the intelligent selection and execution platform 102 can determine model specialties 724 that indicate that the trained machine-learning model 702 or the third-party large-language model(s) 706 are adept at performing a certain task or generating a certain output. For example, model specialties 724 indicate that the trained machine-learning model 702 or the third-party large-language model(s) 706 perform a certain task or generate a certain output a measurable amount better than other machine-learning models. To illustrate, the intelligent selection and execution platform 102 identifies model specialties 724 based on known specialties (e.g., a machine-learning model was generated or trained to perform a certain task). As another illustration, the intelligent selection and execution platform 102 can generate quality metrics that indicate model specialties 724 for trained machine-learning model 702 or the third-party large-language model(s) 706 based on the quality metrics. Moreover, in one or more embodiments, the intelligent selection and execution platform 102 learns model specialties 724 based on a software domain analysis of the plurality of machine-learning models.

Figure 8:
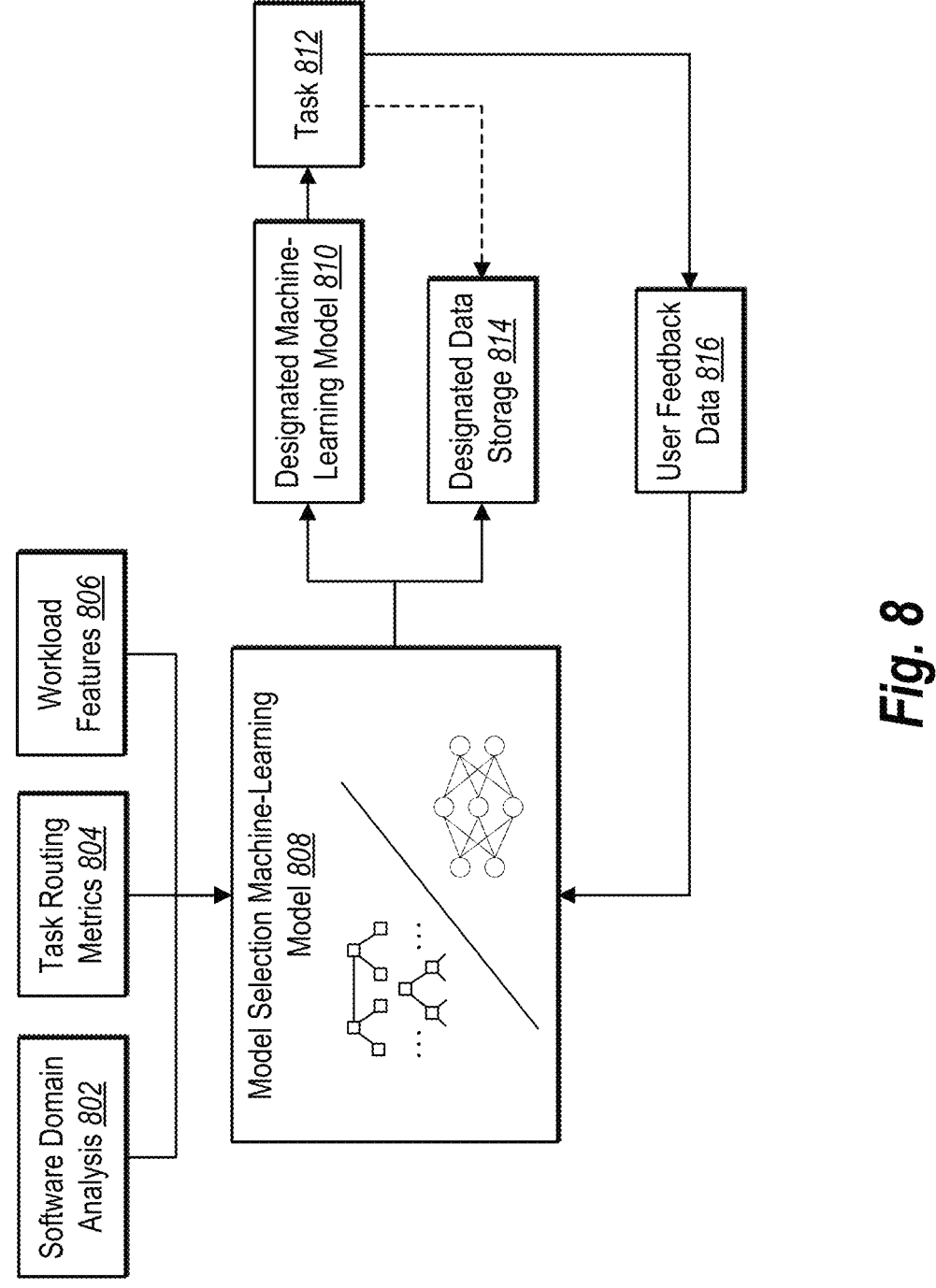
FIG. 8 illustrates a schematic diagram of an intelligent selection and execution platform utilizing a model selection machine-learning model to select a designated machine-learning model for executing a task in accordance with one or more embodiments.

As previously mentioned, in some embodiments, the intelligent selection and execution platform 102 utilizes a model selection machine-learning model. In particular, the intelligent selection and execution platform 102 utilizes the model selection machine-learning model to select, from a plurality of machine-learning models, a designated machine-learning model for executing a task. FIG. 8 illustrates a schematic diagram of an intelligent selection and execution platform utilizing a model selection machine-learning model to select a designated machine-learning model for executing a task in accordance with one or more embodiments.

As also previously mentioned, the intelligent selection and execution platform 102 selects a designated machine-learning model based on workload features defining characteristics of a task and task routing metrics for a plurality of machine-learning models. As shown in FIG. 8, model selection machine-learning model 808 utilizes task routing metrics 804 and workload features 806 to select designated machine-learning model 810. Additional details regarding the intelligent selection and execution platform 102 extracting workload features are provided in relation to FIG. 6 above. Additional details regarding the intelligent selection and execution platform 102 determining task routing metrics for a plurality of machine-learning models are provided in relation to FIG. 7 above.

As illustrated in FIG. 8, in one or more embodiments, model selection machine-learning model 808 receives or performs software domain analysis 802. In particular, the intelligent selection and execution platform 102 performs a software domain analysis by analyzing the plurality of machine-learning models to find commonalities and variables between the machine-learning models. For example, as part of a software domain analysis, the intelligent selection and execution platform 102 can identify that a machine-learning model has a specialty in a certain aspect of executing the task and utilize the software domain analysis when selecting a designated machine-learning model for the task. In some cases, intelligent selection and execution platform 102 performs a software domain analysis 802 and stores data from the software domain analysis 802 for recall at another time. In other cases, the intelligent selection and execution platform 102 trains the model selection machine-learning model 808 based on the results of the software domain analysis 802.

As previously mentioned, the intelligent selection and execution platform 102 selects a designated machine-learning model based on determining an optimal machine-learning model for executing a task. In particular, the model selection machine-learning model 808 is trained, tuned, or optimized to weigh workload features and task routing metrics to determine an optimal machine-learning model. In some cases, the model selection machine-learning model 808 is a multi-armed bandit model that is trained or optimized to select a designated machine-learning model from a plurality of machine-learning models. For example, the intelligent selection and execution platform 102 trains or optimizes a multi-armed bandit model to select a designated machine-learning model based on workload data and task routing metrics of the plurality of machine-learning models at the time of selection. In addition, as described further below in relation to FIGS. 10A-10B, a multi-armed bandit model continues to improve over time as it receives additional feedback (e.g., user feedback data).

As mentioned, the model selection machine-learning model 808 determines an optimal machine-learning model for executing a task. Specifically, the model selection machine-learning model 808 generates an optimization metric for each machine-learning model of a plurality of machine-learning models to determine an optimal machine-learning model. For example, the model selection machine-learning model 808 can analyze workload features 806, task routing metrics 804, and software domain analysis 802 to generate an optimization metric for each machine-learning model, and the intelligent selection and execution platform 102 determines an optimal machine-learning model based on the optimization metric.

In some cases, the intelligent selection and execution platform 102 selects an optimal model based on the optimization metric satisfying an optimal model threshold. Specifically, the intelligent selection and execution platform 102 determines that a machine-learning model will execute the task at a satisfactory level based on an optimization metric for the machine-learning model satisfying the optimal model threshold. For example, when an optimization metric satisfies the optimal model threshold, a machine-learning model is likely to execute the task in a threshold amount of time or satisfy a quality metric. As another example, an optimization metric may satisfy the optimal model threshold if the machine-learning model comprises a model capability or model specialty associated with the task (e.g., the capability or specialty aligns with the requested task).

In addition, in one or more embodiments, the intelligent selection and execution platform 102 selects a designated machine-learning model based on a historical quality metric. In particular, the intelligent selection and execution platform 102 utilizes user feedback to determine a historical quality metric that indicates an estimated quality of output from the machine-learning model. The intelligent selection and execution platform 102 then utilizes the historical quality metric to select the designated machine-learning model.

As also shown in FIG. 8, the model selection machine-learning model 808 selects a designated machine-learning model 810 for executing task 812. In particular, the model selection machine-learning model 808 selects the designated machine-learning model 810, and the intelligent selection and execution platform 102 provides a data to the designated machine-learning model 810 to execute the task 812. Example tasks include generating summaries, generating documents, extracting knowledge and/or relations in text, generating code, analyzing sentiments, or parsing documents. In some cases, the intelligent selection and execution platform 102 utilizes content items stored in the content management system 108 to execute tasks, such as generating summaries for content items or generating documents based on content items.

In one or more embodiments, the intelligent selection and execution platform 102 selects a large language model as designated machine-learning model 810. In particular, the intelligent selection and execution platform 102 identifies that a large language model is necessary to execute task 812 and provides a prompt to the large language model to execute task 812. In some cases, the intelligent selection and execution platform 102 can identify that workload data requests execution of a task using a large language model and selects a designated large language model from a plurality of large language models.

In one or more embodiments, the intelligent selection and execution platform 102 can also generate a machine-learning model. In particular, the intelligent selection and execution platform 102 can determine that generating a machine-learning model for executing the task requires less computational and/or hardware cost than selecting an existing model and generating a model that is specific to the task and generate a machine-learning model for executing the task.

As also illustrated in FIG. 8, the intelligent selection and execution platform 102 also selects a designated data storage 814. In particular, the intelligent selection and execution platform 102 utilizes the model selection machine-learning model 808 to determine designated data storage 814 to use in conjunction with executing task 812. In particular, the intelligent selection and execution platform 102 determines the financial cost of utilizing databases and other storage systems within the intelligent selection and execution platform 102 or sending the data to a third-party database or storage system. For example, the intelligent selection and execution platform 102 determines a currency amount required to store data at third-party databases and databases within the intelligent selection and execution platform 102. To illustrate, the intelligent selection and execution platform 102 can determine that sending data to a third-party database or storage system has a higher financial cost (e.g., higher currency) than storing the data within the intelligent selection and execution platform 102.

In addition, the intelligent selection and execution platform 102 can determine an execution cost when determining designated data storage 814. In particular, the intelligent selection and execution platform 102 determines an execution cost of utilizing databases and other storage systems within the intelligent selection and execution platform 102 or sending the data to a third-party database or storage system. For example, the intelligent selection and execution platform 102 can determine computational costs, such as processing or memory, the executional cost to store data at third-party databases, and the executional cost to store data at a database within the intelligent selection and execution platform 102. To illustrate, the intelligent selection and execution platform 102 can determine that an amount of time required to send data to a third-party database or storage system is higher than a threshold (e.g., it is slower than storing within the intelligent selection and execution platform 102 or the content management system).

As illustrated in FIG. 8, the intelligent selection and execution platform 102 receives user feedback data 816 based on the execution of task 812. In particular, the intelligent selection and execution platform 102 receives user feedback data that indicates a quality measure of execution of the task. Further, as indicated in FIG. 8, the intelligent selection and execution platform 102 can update parameters of the model selection machine-learning model 808 based on user feedback data 816. Additional details regarding the intelligent selection and execution platform 102 receiving user feedback data and training or updating the parameters of the model selection machine-learning model 808 are provided in relation to FIGS. 10A-10B below.

Figure 9:
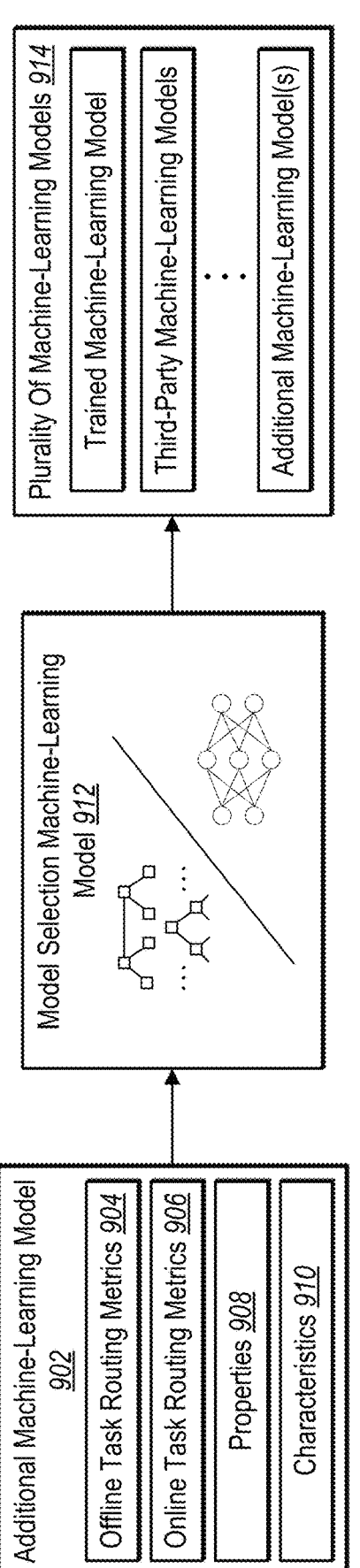
FIG. 9 illustrates a schematic diagram of an intelligent selection and execution platform adding an additional machine-learning model to a plurality of machine-learning models in accordance with one or more embodiments.

As previously mentioned, the intelligent selection and execution platform 102 flexibly adds machine-learning models to a plurality of machine-learning models. In particular, the intelligent selection and execution platform 102 updates a model selection machine-learning model to add additional machine-learning models to a plurality of machine-learning models. FIG. 9 illustrates a schematic diagram of an intelligent selection and execution platform 102, adding an additional machine-learning model to a plurality of machine-learning models in accordance with one or more embodiments.

In one or more embodiments, the intelligent selection and execution platform 102 adds additional machine-learning model 902 by providing or accessing task routing metrics for the additional machine-learning model 902. As illustrated in FIG. 9, model selection machine-learning model 912 receives offline task routing metrics 904 for additional machine-learning model 902. In particular, offline task routing metrics 904 comprise scores or other measured data that indicate the quality of additional machine-learning model 902 and that intelligent selection and execution platform 102 can utilize to evaluate additional machine-learning model 902. For example, offline task routing metrics 904 comprise task routing metrics that are measured, scored, or annotated with ground truth quality labels. In some cases, the ground truth quality labels are provided or confirmed by human observers to indicate measures of quality for the task routing metrics. The intelligent selection and execution platform 102 provides the offline task routing metrics 904 with the model selection machine-learning model 912 to determine that the additional machine-learning model 902 produces output above a threshold quality.

In addition, the intelligent selection and execution platform 102 receives online task routing metrics 906. In particular, online task routing metrics 906 comprise task routing metrics utilized during (or as a part of) model selection machine-learning model selecting a designated machine-learning model. For example, online quality metrics comprise user feedback data received upon execution of a task and as described in further detail in FIG. 10A-10B below. In one or more additional embodiments, online task routing metrics comprise stored quality indicators specific to the task. For example, model selection machine-learning model 912 accesses the online quality indicators when selecting a designated machine-learning model for a task.

As also illustrated, the intelligent selection and execution platform 102 can also utilize properties 908 for the additional machine-learning model. In particular, the intelligent selection and execution platform 102 accesses properties 908 that indicate sizes, data types, or additional information for additional machine-learning model 902. For example, properties 908 can indicate the size of additional machine-learning model 902. As another example, properties 908 can include the data type in which additional machine-learning model 902 was trained (e.g., Brain Float, 8-bit). Moreover, as an example, properties 908 can indicate the benchmarks and evaluations for additional machine-learning model 902. Further, properties 908 can indicate the layers inside the model and which generations of GPU can support those layers. Also, properties 908 can denote a context window size for additional machine-learning model 902.

As further illustrated, the intelligent selection and execution platform 102 can also utilize characteristics 910 for the additional machine-learning model 902. In particular, characteristics 910 indicate model capabilities or model specialties of additional machine-learning model 902. For example, characteristics 910 can indicate that additional machine-learning model 902 is capable of executing a certain type of task, a task of a certain size, or on a certain type of hardware. Moreover, characteristics 910 can indicate that additional machine-learning model 902 comprises a certain specialty, was designed to execute a certain task, or was designed to access a certain hardware environment.

As illustrated, the intelligent selection and execution platform 102 adds the additional language model to the plurality of machine-learning models 914. In particular, once the intelligent selection and execution platform 102 identifies that the additional machine-learning model performs within a threshold effectiveness and can access task routing metrics for the additional machine-learning model, the intelligent selection and execution platform 102 adds the additional machine-learning model to the plurality of machine-learning models 914 to establish an updated plurality of machine-learning models. Moreover, because the model selection machine-learning model 912 is continuously being updated (e.g., through user feedback data), the model selection machine-learning model 912 adds the machine-learning model without time-intensive and computationally expensive training. Indeed, the model selection machine-learning model 912 will continue to improve and adapt to the additional machine-learning model 902 over time and based on additional user feedback data.

In addition, though not illustrated in FIG. 9, the intelligent selection and execution platform 102 can also add additional hardware environments to a plurality of hardware environments using a hardware allocating machine-learning model. Similar to adding an additional machine-learning model 902, the intelligent selection and execution platform 102 receives offline task routing metrics, online task routing metrics, properties, and characteristics for an additional hardware environment. The intelligent selection and execution platform 102 can analyze additional hardware environments with the offline task routing metrics, online task routing metrics, properties, and characteristics and, upon determining that the additional hardware environment can execute the task within a threshold quality, add the additional hardware environment to the plurality of hardware environments. Similar to the model selection machine-learning model, the hardware allocating machine-learning model will continue to improve selections of the additional hardware environment based on receiving continuous feedback regarding executing the task using the hardware environment.

Figure 10A:
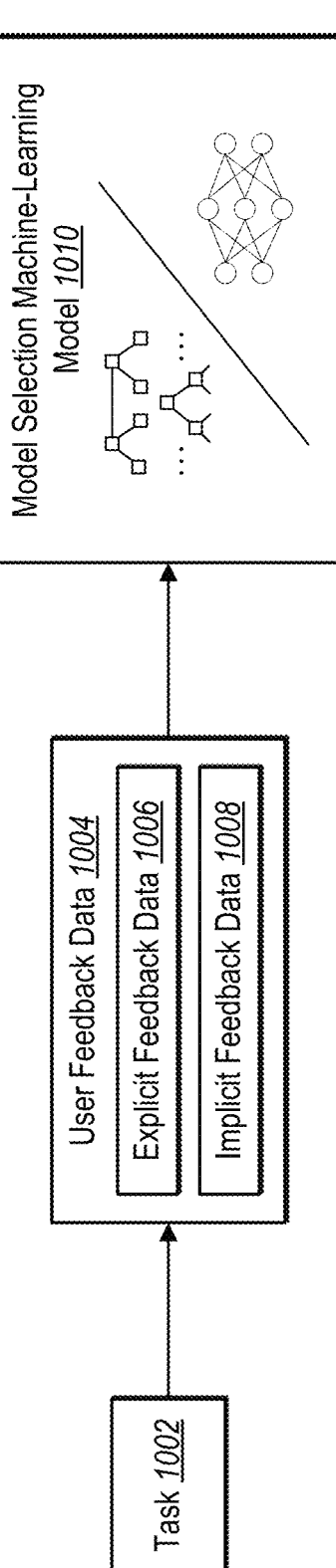
FIGS. 10A-10B illustrate an example diagram of an intelligent selection and execution platform receiving user feedback data and utilizing the user feedback data to update parameters of a model selection machine-learning model in accordance with one or more embodiments.
Figure 10B:
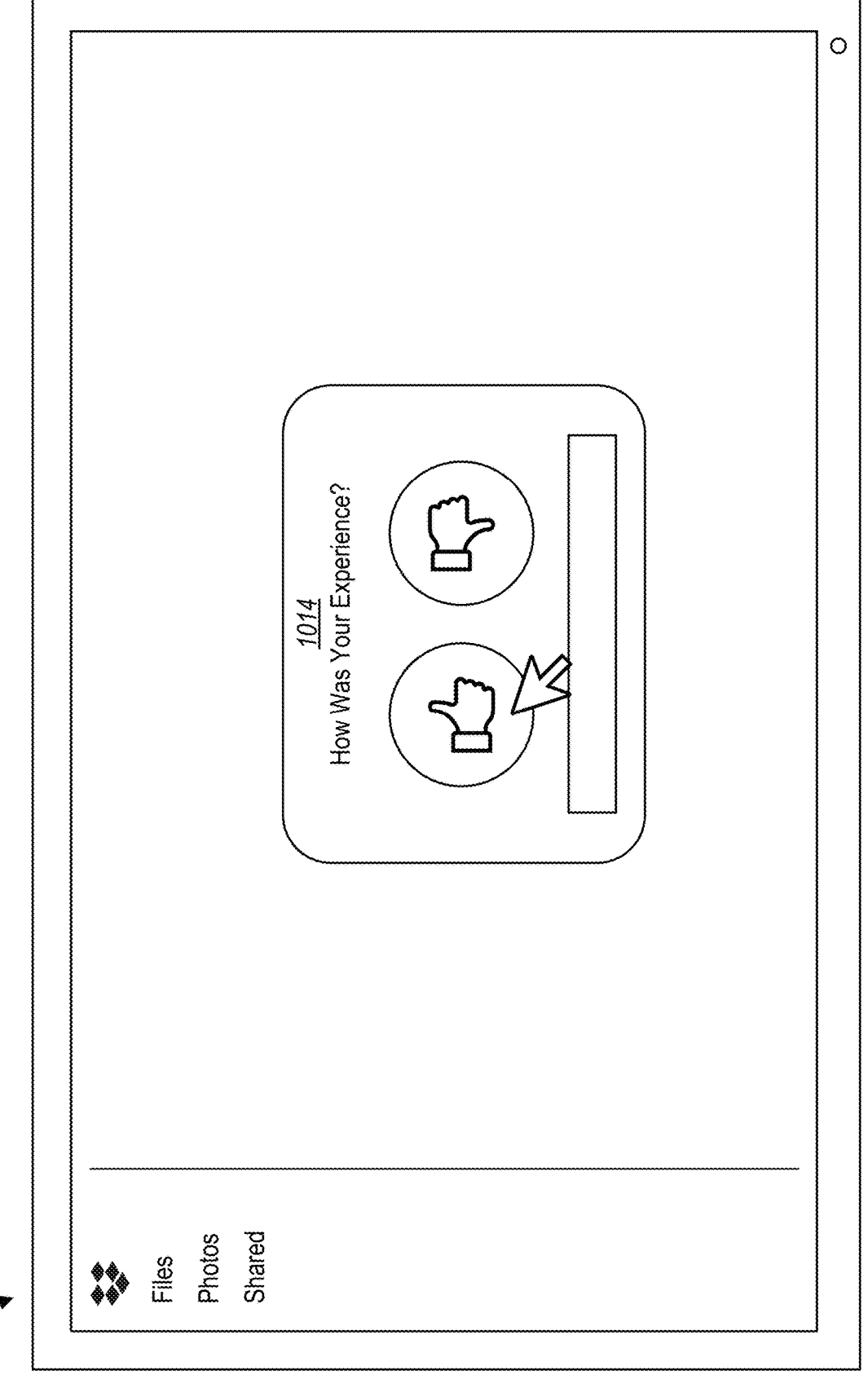

As previously mentioned, the intelligent selection and execution platform 102 receives user feedback data. In particular, the intelligent selection and execution platform 102 utilizes user feedback data to update parameters of a model-selection machine-learning model. FIGS. 10A-10B illustrate an example diagram of an intelligent selection and execution platform receiving user feedback data and utilizing the user feedback data to update parameters of a model selection machine-learning model in accordance with one or more embodiments.

As illustrated in FIG. 10A, after executing task 1002, the intelligent selection and execution platform 102 receives user feedback data 1004. Specifically, the intelligent selection and execution platform 102 receives user feedback data 1004 by receiving information, opinions, or responses that indicate user satisfaction with the task or how the machine-learning model executed the task. For example, user feedback data can be received continuously or in real-time as tasks are executed by a designated machine-learning model selected by the intelligent selection and execution platform 102 (or the model selection machine-learning model). In some cases, the intelligent selection and execution platform 102 can determine user feedback data 1004 is positive user feedback data indicating user satisfaction with the output of the machine-learning model. In other cases, the intelligent selection and execution platform 102 can determine that user feedback data 1004 is negative user feedback data indicating a user dissatisfaction with the output of the machine-learning model.

As illustrated, in one or more embodiments, user feedback data 1004 can comprise explicit feedback data 1006. Specifically, the intelligent selection and execution platform 102 receives explicit feedback by receiving user input indicating user satisfaction with the task or with how the machine-learning model executed task 1002. For example, after the designated (or fallback) machine-learning model executes task 1002, intelligent selection and execution platform 102 provides an option to provide user feedback data on the client device that provided the request to execute the task (e.g., through workload data). In some cases, the intelligent selection and execution platform 102 receives positive explicit feedback or negative explicit feedback. Additional details regarding the intelligent selection and execution platform 102 providing an option to provide user feedback data are provided in relation to FIG. 10B below.

As further illustrated, in some embodiments, user feedback data 1004 can comprise implicit feedback data 1008. In particular, implicit feedback refers to user feedback data that is suggested, implied, or understood without being explicitly provided by the client device. For example, implicit feedback measures or infers user satisfaction with a task by monitoring user interactions or client device behavior after receiving the output from the machine-learning model. Implicit feedback data 1008 can refer to an action performed by the client device indicating user satisfaction with the output. To illustrate, if a designated machine-learning model provides a list of results to the client device and suggests that the client device copy the list of result and the client device copies the list of results, the intelligent selection and execution platform 102 will identify positive implicit feedback indicating user satisfaction with the output of the designated machine-learning model.

Conversely, implicit feedback data 1008 can indicate a user dissatisfaction with the output based on identifying that the client device did not take an action suggested in the output of the machine-learning model. To illustrate, if a designated machine-learning model provides a list of results to the client device and suggests that the client device copy the list of results and the client device chooses not to copy the list of results, the intelligent selection and execution platform 102 will identify negative implicit feedback indicating a user dissatisfaction with the output of the designated machine-learning model. As another illustration, if a designated machine-learning model provides an output and the client device provides the same prompt to the intelligent selection and execution platform 102 again, then the intelligent selection and execution platform 102 will identify negative implicit feedback indicating a user dissatisfaction with the output of the designated machine-learning model.

As illustrated in FIG. 10A, the intelligent selection and execution platform 102 provides user feedback data 1004 to model selection machine-learning model 1010. In particular, the intelligent selection and execution platform 102 continuously (or in real-time) provides user feedback data 1004 to model selection machine-learning model 1010 in order to continuously update parameters of the model selection machine-learning model. For example, the model selection machine-learning model 1010 can identify that output from a machine-learning model elicits positive user feedback data or negative user feedback data from the output of the designated machine-learning model and updates parameters of the model selection machine-learning model 1010. To illustrate, if the model selection machine-learning model 1010 selected a machine-learning model with a lower financial cost metric and a smaller model fit metric (e.g., a smaller, less powerful machine-learning model compared to other machine-learning models) and received user negative user feedback data, the model selection machine-learning model may select a different machine-learning model when presented with a prompt to execute a similar task.

In one or more embodiments, the intelligent selection and execution platform 102 can generate quality metrics based in part on the user feedback data 1004. Specifically, the intelligent selection and execution platform 102 generates quality metrics that can be used to compare the quality of machine-learning models. For example, the intelligent selection and execution platform 102 can utilize the quality metrics as task routing metrics for selecting a designated machine-learning model or adding an additional machine-learning model to the plurality of machine-learning models. To illustrate, if user feedback data 1004 indicates user satisfaction with an output type from a machine-learning model, the model selection machine-learning model 1010 may add the output type as a model specialty of the machine-learning model and utilize the machine-learning model when receiving a task that requests the output type.

As previously mentioned, the intelligent selection and execution platform 102 can receive explicit user feedback data by receiving user feedback data after a designated machine-learning model executes a task. FIG. 10B illustrates an example graphical user interface 1012. Specifically, the graphical user interface 1012 is rendered on a client device by application of the content management system 108 or by a third-party application connected to the content management system 108. For example, graphical user interface 1012 renders or displays the output of the designated machine-learning model on the client device that provided workload data requesting execution of the task.

As illustrated, in some embodiments, the intelligent selection and execution platform 102 can provide a user feedback data request 1014 in the graphical user interface 1012. In particular, the intelligent selection and execution platform 102 can provide the user feedback data request after a designated machine-learning model executes the task. For example, the intelligent selection and execution platform 102 can detect whether or not the client device interacted with the output of the designated machine-learning model and provide the user feedback data request 1014.

As previously mentioned, the intelligent selection and execution platform 102 receives explicit feedback data 1006. In particular, the intelligent selection and execution platform 102 receives explicit user feedback data by receiving user input in the user feedback data request 1014. For example, as shown, a client device may provide user feedback data by selecting an option in the user feedback data request 1014 or by providing text input in the user feedback data request 1014.

FIGS. 1-10, the corresponding text, and the examples provide a number of different methods, systems, devices, and non-transitory computer-readable media of the intelligent selection and execution platform 102. In addition to the foregoing, one or more embodiments can also be described in terms of flowcharts comprising acts for accomplishing a particular result, as shown in FIG. 11. FIG. 11 may be performed with more or fewer acts. Further, the acts may be performed in differing orders. Additionally, the acts described herein may be repeated or performed in parallel with one another or parallel with different instances of the same or similar acts.

As mentioned, FIG. 11 illustrates a flowchart of a series of acts 1100 for selecting a designated machine-learning model in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown in FIG. 11, the series of acts 1100 includes an act 1102 of receiving workload data requesting execution of a task using a machine-learning model, an act 1104 of extracting workload features defining characteristics of the task, an act 1106 of determining task routing metrics for a plurality of machine-learning models hosted in respective network environments, and an act 1108 of selecting a designated machine-learning model for executing the task based on the workload features and the task routing metrics.

In particular, the act 1102 can include receiving, from a device connected by a network to a content management system, workload data requesting execution of a task using a machine-learning model, the act 1104 can include extracting, from the workload data, workload features defining characteristics of the task, the act 1106 can include determining task routing metrics for a plurality of machine-learning models hosted in respective network environments, and the act 1108 can include selecting, from the plurality of machine-learning models, a designated machine-learning model for executing the task based on the workload features and the task routing metrics.

For example, in one or more embodiments, the series of acts 1100 includes wherein determining task routing metrics for the plurality of machine-learning models further comprises determining a model state for each machine-learning model of the plurality of machine-learning models and wherein selecting the designated machine-learning model for executing the task is based in part on the model state of the designated machine-learning model. In addition, in one or more embodiments, the series of acts 1100 includes wherein determining task routing metrics for the plurality of machine-learning models further comprises determining a financial cost metric, an execution time metric, an execution cost metric, or a model fit metric for executing the task on each machine-learning models of the plurality of machine-learning models, and wherein selecting the designated machine-learning model is based on two or more of the financial cost metric, the execution time metric, the execution cost metric, and the model fit metric.

In addition, in one or more embodiments, the series of acts 1100 includes wherein selecting the designated machine-learning model further comprises analyzing the workload data and the task routing metrics for the plurality of machine-learning models to determine an optimal machine-learning model for executing the task from the plurality of machine-learning models, and selecting the designated machine-learning model for executing the task based on determining that the designated machine-learning model is the optimal machine-learning model for executing the task.

Moreover, in one or more embodiments, the series of acts 1100 includes wherein selecting the designated machine-learning model further comprises analyzing the workload data and the task routing metrics for the plurality of machine-learning models to determine an optimal machine-learning model for executing the task from the plurality of machine-learning models and selecting the designated machine-learning model for executing the task based on determining that the designated machine-learning model is the optimal machine-learning model for executing the task. In one or more embodiments, the series of acts 1100 includes wherein determining that the designated machine-learning model is the optimal machine-learning model further comprises generating, utilizing a model selection machine-learning model, an optimization metric and determining that the designated machine-learning model is the optimal machine-learning model for executing the task based on the optimization metric.

Also, in one or more embodiments, the series of acts 1100 includes wherein selecting the designated machine-learning model further comprises performing a software domain analysis of each machine-learning model of the plurality of machine-learning models for executing the task and selecting the designated machine-learning model based on the software domain analysis. Moreover, in one or more embodiments, the series of acts 1100 includes wherein extracting workload features defining characteristics of the task further comprises determining an estimated processing requirement and an estimated storage requirement for executing the task.

Further, in one or more embodiments, the series of acts 1100 includes adding an additional machine-learning model to the plurality of machine-learning models to establish an updated plurality of machine-learning models and selecting the designated machine-learning model from the updated plurality of machine-learning models. In addition, in one or more embodiments, the series of acts 1100 includes accessing user feedback metrics about executing tasks using one or more machine-learning models of the plurality of machine-learning models, generating a historical quality metric based on the user feedback metrics, and selecting the designated machine-learning model for the task based on the historical quality metric.

Also, in one or more embodiments, the series of acts 1100 includes wherein determining task routing metrics for the plurality of machine-learning models further comprises identifying a capability or a specialty associated with one or more machine-learning models of the plurality of machine-learning models and wherein selecting the designated machine-learning model for executing the task is based on alignment of the capability or the specialty of the designated machine-learning model with the task.

In addition, in one or more embodiments, the series of acts 1100 includes receiving, from a device connected by a network to a content management system, workload data requesting execution of a task using a machine-learning model, extracting, from the workload data, workload features defining characteristics of the task, determining task routing metrics for a plurality of machine-learning models comprising one or more trained machine-learning models and one or more third-party machine-learning models hosted in respective network environments, and selecting, from the plurality of machine-learning models, a designated machine-learning model for executing the task based on the workload features and the task routing metrics.

Moreover, in one or more embodiments, the series of acts 1100 includes identifying, based on a model state for the designated machine-learning model, that the designated machine-learning model is unavailable and selecting a fallback machine-learning model from the plurality of machine-learning models for executing the task. In addition, in one or more embodiments, the series of acts 1100 includes selecting the designated machine-learning model by determining, based on the task routing metrics, a financial cost metric for executing the task on each machine-learning model of the plurality of machine-learning models and selecting the designated machine-learning model based in part on the financial cost metric. In addition, the series of acts 1100 includes determining, based on the workload data and the task routing metrics, that a trained machine-learning model of the one or more trained machine-learning models is an optimal model for executing the task, identifying that the trained machine-learning model is unavailable, and selecting the designated machine-learning model from the one or more third-party machine-learning models based on identifying that the trained machine-learning model is unavailable.

Further, in one or more embodiments, the series of acts 1100 includes selecting the designated machine-learning model by identifying, based on the workload data, that executing the task requires a machine-learning model comprising a capability or a specialty, identifying that a third-party machine-learning model of the one or more third-party machine-learning models comprises the capability or the specialty, and selecting the third-party machine-learning model as the designated machine-learning model for executing the task based on alignment of the capability or the specialty of the third-party machine-learning model with the task.

In addition, in one or more embodiments, the series of acts 1100 includes receiving, from a device connected by a network to a content management system, workload data requesting execution of a task using a machine-learning model, extracting, from the workload data, workload features defining characteristics of the task, determining task routing metrics for a plurality of machine-learning models hosted in respective network environments, and selecting, utilizing a model selection machine-learning model, a designated machine-learning model from the plurality of machine-learning models for executing the task based on the workload features and the task routing metrics. Moreover, in one or more embodiments, the series of acts 1100 includes utilizing the model selection machine-learning model to compare one or more machine-learning models of the plurality of machine-learning models based on the workload features and the task routing metrics, where the plurality of machine-learning models comprises one or more trained machine-learning models and one or more third-party trained machine-learning models and selecting the designated machine-learning model from the plurality of machine-learning models based on an output of the model selection machine-learning model.

Also, in one or more embodiments, the series of acts 1100 includes receiving user feedback data indicating a user satisfaction with performance of the designated machine-learning model and updating parameters of the model selection machine-learning model based on the user feedback data. In addition, in one or more embodiments, the series of acts 1100 includes receiving additional task routing metrics for an additional machine-learning model and updating parameters of the model selection machine-learning model based on the additional task routing metrics of the additional machine-learning model. Moreover, in one or more embodiments, the series of acts 1100 includes generating, utilizing the model selection machine-learning model, an optimization metric for each machine-learning model of the plurality of machine-learning models and determining that the designated machine-learning model is an optimal machine-learning model for executing the task based on the optimization metric.

Figure 12:
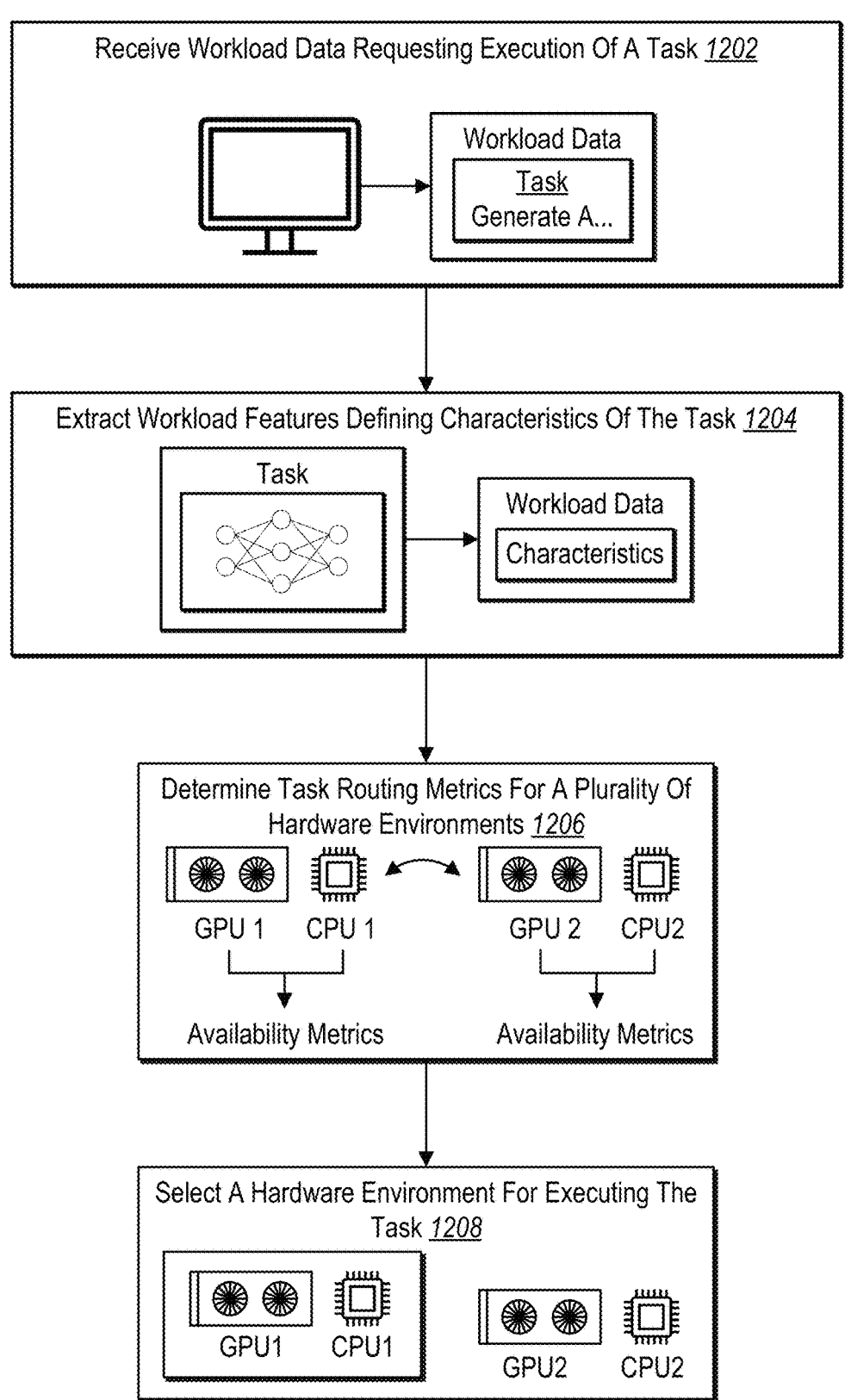
FIG. 12 illustrates an example diagram of an intelligent selection and execution platform selecting a hardware environment for executing a task in accordance with one or more embodiments.

As previously mentioned, the intelligent selection and execution platform 102 can select a hardware environment for executing a task. In particular, the intelligent selection and execution platform 102 can extract workload features of a task, determine task routing metrics for various hardware environments, and use the workload features and task routing metrics to select a hardware environment for executing the task. FIG. 12 illustrates a schematic diagram of an intelligent selection and execution platform selecting a hardware environment for executing a task in accordance with one or more embodiments.

As illustrated, the intelligent selection and execution platform 102 performs an act 1202 and receives workload data requesting the execution of a task. In particular, the intelligent selection and execution platform 102 receives workload data from a device connected to the content management system that requests the execution of a task. For example, workload data comprises the necessary data and/or information for executing the task, such as a request to execute the task using a machine-learning model. In one or more embodiments, the intelligent selection and execution platform 102 receives workload data through an API layer, as described in relation to FIG. 4 above.

In one or more embodiments, the intelligent selection and execution platform 102 workload data comprises parameters for executing a task. Specifically, the workload data comprises parameters comprising requests or specifications for executing a task. For example, workload data can comprise a parameter that instructs the intelligent selection and execution platform 102 to utilize a certain machine-learning model for executing a task or to execute the task using a certain hardware environment. As another example, workload data can comprise a parameter that instructs the intelligent selection and execution platform 102 to not utilize a certain machine-learning model or hardware environment to execute a task. Additional detail regarding the intelligent selection and execution platform 102 receiving workload data and parameters for executing a task is provided in relation to FIG. 6 above As also shown in FIG. 12, the intelligent selection and execution platform 102 performs an act 1204 and extracts, from the workload data, workload features defining characteristics of the task. In particular, the intelligent selection and execution platform 102 extracts workload features by determining an amount of processing and storage needed for executing the task. For example, the intelligent selection and execution platform 102 can compute the computational cost for executing a task using a specific hardware environment. In some cases, the intelligent selection and execution platform 102 determines processing and storage requirements for executing a task on a hardware environment of the content management system and third-party hardware environments. Additional details regarding the intelligent selection and execution platform 102 extracting workload features from workload data are provided in relation to FIG. 6 above.

As further shown in FIG. 12, the intelligent selection and execution platform 102 performs an act 1206 and determines task routing metrics for a plurality of hardware environments hosted in respective network environments. In particular, the intelligent selection and execution platform 102 determines task routing metrics for a hardware environment within the intelligent selection and execution platform 102 and third-party hardware environments located in their respective network environments. For example, the intelligent selection and execution platform 102 can identify task routing metrics that indicate financial costs, execution times, and execution time for executing the task using the hardware environment of the intelligent selection and execution platform 102 or third-party hardware environments. In addition, the intelligent selection and execution platform 102 determines task routing metrics by determining a hardware state indicating whether the hardware environment is available to execute the task. Further, intelligent selection and execution platform 102 determines or identifies hardware environment capabilities or specialties. Additional details regarding the intelligent selection and execution platform 102 determining task routing metrics for a plurality of hardware environments are provided in relation to FIG. 13 below.

As also shown in FIG. 12, the intelligent selection and execution platform 102 performs an act 1208 and selects a hardware environment for executing a task. In particular, the intelligent selection and execution platform 102 utilizes workload features and task routing metrics to select a designated hardware environment for executing the task. For example, the intelligent selection and execution platform 102 selects a hardware environment for executing the task by using a trained model, such as a neural network or a multi-armed bandit model, to determine the hardware environment for executing the task. In one or more embodiments, the intelligent selection and execution platform 102 utilizes a hardware allocating machine-learning model to select a designated hardware environment for executing the task. In some cases, the hardware allocating machine-learning model is trained, tuned, or optimized to select a designated hardware environment for executing a task.

As mentioned, in one or more embodiments, the intelligent selection and execution platform 102 selects a designated hardware environment for executing a task based on workload features and task routing metrics. Specifically, the intelligent selection and execution platform 102 utilizes a hardware allocating machine-learning model to analyze the workload features and task routing metrics and select a designated hardware environment for executing the task. For example, the hardware allocating machine-learning model generates an optimization metric based on the workload features and the task routing metrics and selects the designated hardware environment based on the optimization metric. Additional details regarding the intelligent selection and execution platform 102 utilizing a hardware allocating machine-learning model to select a designated hardware environment for executing a task are discussed further in FIG. 14 below.

Figure 13:
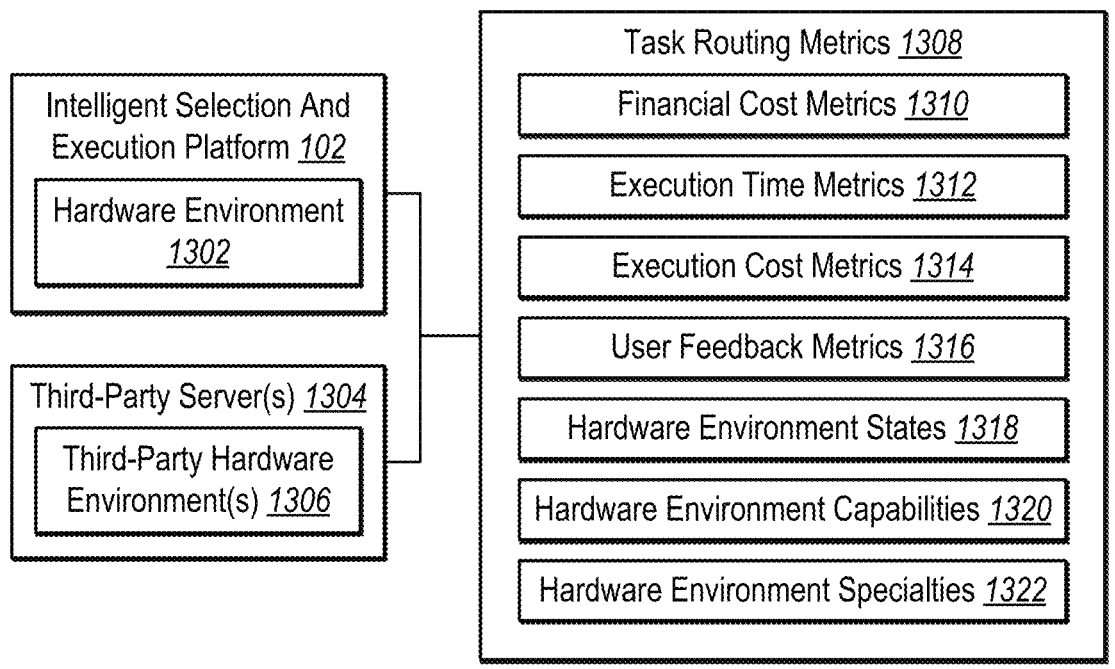
FIG. 13 illustrates a schematic diagram of an intelligent selection and execution platform determining task routing metrics for a plurality of hardware environments in accordance with one or more embodiments.

As previously mentioned, in one or more embodiments, the intelligent selection and execution platform 102 determines task routing metrics for a plurality of hardware environments. In particular, the intelligent selection and execution platform 102 determines task routing metrics for a hardware environment of the intelligent selection and execution platform 102 and one or more third-party hardware environments. FIG. 13 illustrates a schematic diagram of an intelligent selection and execution platform determining task routing metrics for a plurality of hardware environments in accordance with one or more embodiments.

As illustrated in FIG. 13, the intelligent selection and execution platform 102 determines task routing metrics 1308. Specifically, the intelligent selection and execution platform 102 determines task routing metrics 1308 that indicate costs, timeframes, capabilities, fit, or feedback for each hardware environment of a plurality of hardware environments. For example, the intelligent selection and execution platform 102 determines task routing metrics for a hardware environment 1302 of the intelligent selection and execution platform 102 (e.g., local to the intelligent selection and execution platform 102 or the content management system 108) and for third-party hardware environment(s) 1306 located on third-party server(s) 1304. As indicated, the intelligent selection and execution platform 102 can determine task routing metrics for multiple third-party hardware environments in their respective network environments (e.g., on their own servers and/or with their own network).

In one or more embodiments, the intelligent selection and execution platform 102 determines task routing metrics 1308 for executing the task with different machine-learning models using hardware environment 1302 and/or third-party hardware environment(s) 1306. Specifically, the intelligent selection and execution platform 102 can determine task routing metrics for different combinations of machine-learning models and hardware environment 1302 and/or third-party hardware environment(s) 1306. To illustrate, the intelligent selection and execution platform 102 determines task routing metrics 1308 for executing a task using the same machine-learning model on the hardware environment 1302 and third-party hardware environment(s) 1306 or by using different machine-learning models on the hardware environment 1302 and/or the third-party hardware environment(s) 1306. Indeed, the intelligent selection and execution platform 102 determines task routing metrics 1308 for executing tasks using various machine-learning models on various hardware environments to compare availabilities, capabilities, costs, and fits for the task and to select a designated machine-learning model and/or hardware environment for executing the task.

As shown, in one or more embodiments, the intelligent selection and execution platform 102 determines task routing metrics 1308 by determining financial cost metrics 1310. In particular, the intelligent selection and execution platform 102 can determine financial cost metrics 1310 by determining financial costs for executing the task using each of hardware environment 1302 and the third-party hardware environment(s) 1306. For example, the intelligent selection and execution platform 102 can determine a currency cost for executing a task on each of the hardware environment 1302 and the third-party hardware environment(s) 1306. Moreover, in one or more embodiments, the intelligent selection and execution platform 102 can determine financial cost metrics 1310 based on a use time period. For example, financial cost metrics 1310 may vary based on bandwidth availability at certain points throughout a use time period (e.g., different times of day). To illustrate, executing a task on a third-party hardware environment(s) may be higher at a high-use (or peak) time period than executing the task during a minimum-use time period.

As also shown in FIG. 13, the intelligent selection and execution platform 102 determines task routing metrics 1308 by determining execution time metrics 1312. In particular, the intelligent selection and execution platform 102 determines execution time metrics 1312 by determining an execution time for executing a task on hardware environment 1302 and/or third-party hardware environment(s) 1306. For example, the intelligent selection and execution platform 102 can determine that hardware environment 1302 will execute a task in a first time frame and third-party hardware environment(s) 1306 will execute a task in a second time frame. To illustrate, the intelligent selection and execution platform 102 can determine execution time metrics 1312 that indicate third-party hardware environment(s) 1306 will execute a task in less time than hardware environment 1302.

As further illustrated in FIG. 13, the intelligent selection and execution platform 102 determines task routing metrics 1308 by determining execution cost metrics 1314. In particular, the intelligent selection and execution platform 102 determines execution cost metrics 1314 by determining computational costs for executing the task on the hardware environment 1302 and the third-party hardware environment(s) 1306. For example, the intelligent selection and execution platform 102 determines a compute metric indicating the computational power needed to execute the task on the hardware environment 1302 and/or the third-party hardware environment(s) 1306. For example, the intelligent selection and execution platform 102 can determine an execution cost metric by determining an amount of processing power needed by a CPU or GPU to execute the task.

In addition, as shown in FIG. 13, the intelligent selection and execution platform 102 determines task routing metrics

1308 by determining user feedback metrics 1316. As previously mentioned, the intelligent selection and execution platform 102 can receive user feedback data indicating user satisfaction with how the machine-learning model executed the task, including user feedback data that indicates user satisfaction with how the hardware environment executed the task, such as when a user was dissatisfied with the processing time for executing the task. The intelligent selection and execution platform 102 can determine (or generate) user feedback metrics 1316 based on the user feedback data. For example, the intelligent selection and execution platform 102 determines (or generates) user feedback metrics 1316 based on tasks executed by the hardware environment 1302 and the third-party hardware environment(s) 1306. Additional details regarding the intelligent selection and execution platform 102 receiving user feedback data are provided in relation to FIGS. 10A-10B above.

Moreover, as illustrated in FIG. 13, the intelligent selection and execution platform 102 determines task routing metrics 1308 by determining hardware environment state 1318. Specifically, the intelligent selection and execution platform 102 determines a hardware environment state 1318 for the hardware environment 1302 and each of the third-party hardware environment(s) 1306 that indicates bandwidth availability for each respective hardware environment. For example, the intelligent selection and execution platform 102 determines a hardware environment state 1318 by determining processor availability, such as whether a hardware environment is being used by other processes. As another example, the intelligent selection and execution platform 102 can determine if the memory size available in the hardware environment is capable of executing the task (e.g., the memory amount available exceeds the memory required to execute the task).

In addition, as illustrated in FIG. 13, the intelligent selection and execution platform 102 determines task routing metrics by determining hardware environment capabilities 1320. In particular, the intelligent selection and execution platform 102 determines hardware environment capabilities 1320 by determining that hardware environment 1302 or third-party hardware environment(s) 1306 comprise the necessary hardware components to facilitate executing tasks. For example, hardware environment capabilities 1320 indicate CPU capabilities, GPU capabilities, memory capacities, or storage capacities of the hardware environment 1302 and/or the third-party hardware environment(s) 1306. To illustrate, in some cases, in order to execute a task, a machine-learning model may require a certain CPU capacity, a certain GPU capacity, a certain memory capacity, or a certain storage capacity, and hardware environment capabilities 1320 indicate whether or not a given hardware environment aligns with a machine-learning model.

In addition, as illustrated in FIG. 13, the intelligent selection and execution platform 102 determines task routing metrics 1308 by determining hardware environment specialties 1322. In particular, the intelligent selection and execution platform 102 determines hardware environment specialties 1322 that indicate that hardware environment 1302 or third-party hardware environment(s) 1306 are specialized or optimized for a machine-learning model. For example, hardware environment specialties 1322 indicate that when a machine-learning model utilizes a certain hardware environment to execute the task, the hardware environment will facilitate the machine-learning model to execute the task in less time than another hardware environment.

Figure 14:
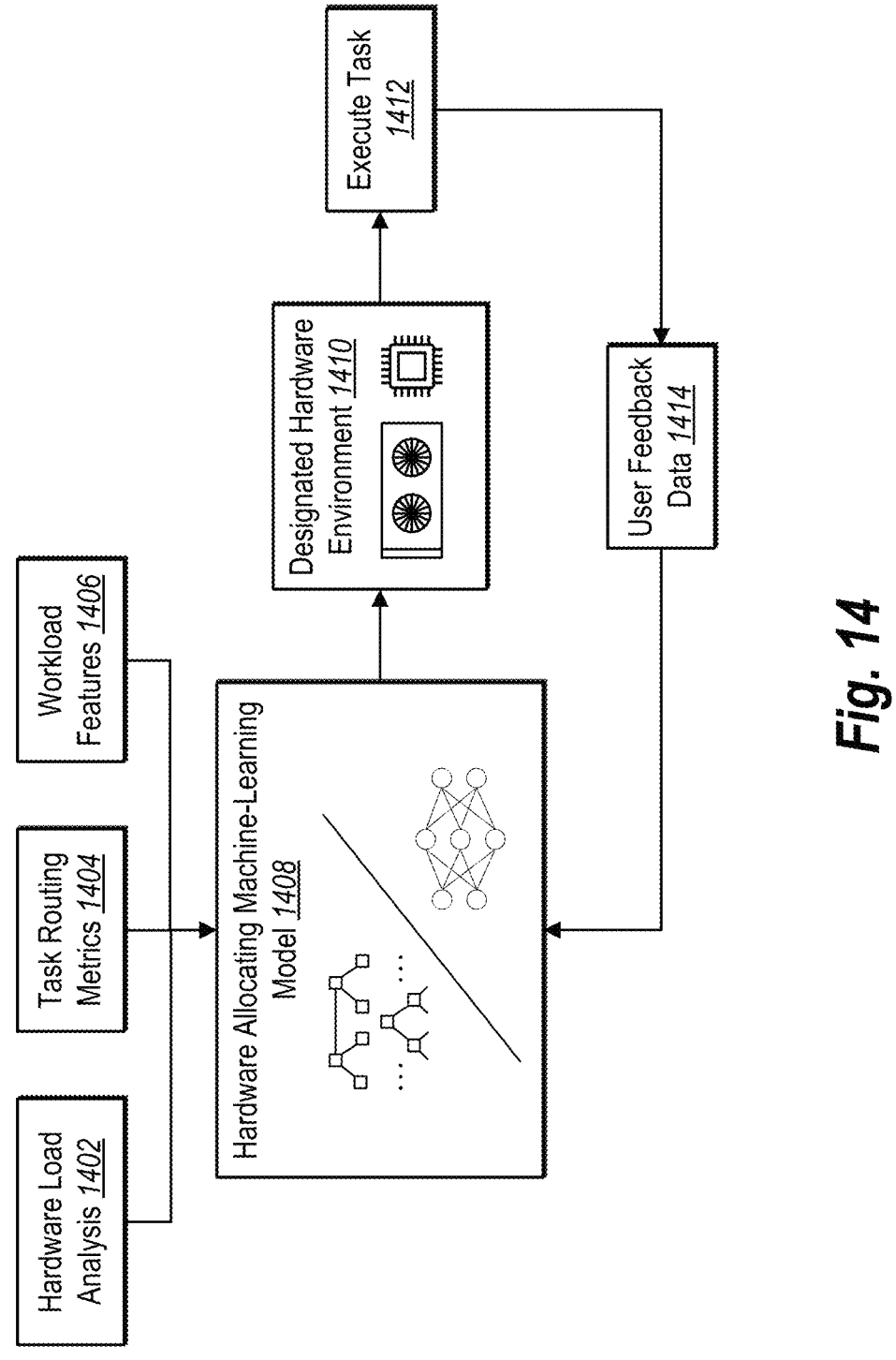
FIG. 14 illustrates a schematic diagram of an intelligent selection and execution platform utilizing a model hardware allocating machine-learning model to select a designated hardware environment in accordance with one or more embodiments.

As previously mentioned, in some embodiments, the intelligent selection and execution platform 102 utilizes a hardware allocating machine-learning model. In particular, the intelligent selection and execution platform 102 utilizes the hardware allocating machine-learning model to select, from a plurality of hardware environments, a designated hardware environment to execute a task. FIG. 14 illustrates a schematic diagram of an intelligent selection and execution platform utilizing a model hardware allocating machine-learning model to select a designated hardware environment in accordance with one or more embodiments.

As also previously mentioned, the intelligent selection and execution platform 102 selects a designated hardware environment based on workload features defining characteristics of a task and task routing metrics for a plurality of hardware environments. As shown in FIG. 14, hardware allocating machine-learning model 1408 utilizes task routing metrics 1404 and workload features 1406 to select designated hardware environment 1410. Additional details regarding the intelligent selection and execution platform 102 extracting workload features defining characteristics of a task are provided in relation to FIG. 6 above. Additional details regarding the intelligent selection and execution platform 102 determining task routing metrics for a plurality of hardware environments are provided in relation to FIG. 13 above.

As also illustrated in FIG. 14, in one or more embodiments, hardware allocating machine-learning model 1408 receives hardware load analysis 1402. In particular, the intelligent selection and execution platform 102 analyzes various hardware environments when receiving workload data in order to estimate (or determine) the current computing capacities of the plurality of hardware environments. In some instances, the intelligent selection and execution platform 102 uses sharding techniques to estimate hardware environment capacities. For example, the intelligent selection and execution platform 102 samples hardware environments to determine models that have the capacity to execute a task. To illustrate, the intelligent selection and execution platform 102 can sample third-party current capacities of two or more third-party hardware environments and compare the third-party current capacities to the current capacities of the hardware environment of the intelligent selection and execution platform 102. The intelligent selection and execution platform 102 can then generate a likelihood that one of the third-party hardware environments or the hardware environment of the intelligent selection and execution platform 102 has sufficient capacity to execute a task. Indeed, by using sharding techniques, the intelligent selection and execution platform 102 utilizes less computing power to determine task routing metrics for each hardware environment of the plurality of hardware environments, which is computationally expensive.

In addition to sharding techniques, in some instances, the intelligent selection and execution platform 102 performs hardware load analysis 1402 by performing probabilistic load balancing. Specifically, the intelligent selection and execution platform 102 performs probabilistic load balancing by using randomization and statistical techniques to determine how tasks are distributed across a plurality of hardware environments with the goal of balancing the tasks efficiently. For example, the intelligent selection and execution platform 102 utilizes probabilistic load balancing to prevent a single hardware environment from becoming a bottleneck. In addition, the intelligent selection and execution platform 102 can determine whether or not sharding techniques and/or probabilistic load balancing are feasible within particular hardware environments as part of hardware load analysis 1402. Moreover, the intelligent selection and execution platform 102 can also perform a combination of sharding techniques and probabilistic load balancing as part of hardware load analysis 1402.

As previously mentioned, the intelligent selection and execution platform 102 selects a designated machine-learning model based on determining an optimal hardware environment for executing a task. In particular, the hardware allocating machine-learning model 1408 is trained, tuned, or optimized to weigh workload features and task routing metrics to determine an optimal hardware environment. In some cases, the hardware allocating machine-learning model 1408 is a multi-armed bandit model that is trained or optimized to select a designated hardware environment from a plurality of hardware environments. For example, the intelligent selection and execution platform 102 trains or optimizes a multi-armed bandit model to select a designated hardware environment for a machine-learning model to utilize to execute a task based on workload data and task routing metrics of the plurality of hardware environments at the time of selection. In addition, as described below, a multi-armed bandit model continues to improve over time as it receives additional feedback (e.g., user feedback data).

As mentioned, the hardware allocating machine-learning model 1408 determines an optimal machine-learning model for executing a task. Specifically, in one or more embodiments, the hardware allocating machine-learning model 1408 generates an optimization metric for each hardware environment of a plurality of hardware environments to determine an optimal hardware environment. For example, the hardware allocating machine-learning model can analyze workload features 1406, task routing metrics 1404, and hardware load analysis 1402 to generate an optimization metric for each machine-learning model, then the intelligent selection and execution platform 102 determines an optimal hardware environment based on the optimization metric.

In some cases, the intelligent selection and execution platform 102 selects an optimal hardware environment based on the optimization metric satisfying an optimal hardware environment threshold. Specifically, based on the optimization metric satisfying the optimal hardware environment threshold, the intelligent selection and execution platform 102 determines that the hardware environments will execute the task at a satisfactory level. For example, when an optimization metric satisfies the optimal hardware environment threshold, a hardware environment is likely to execute the task in a threshold amount of time or satisfy a quality metric. As another example, a optimization metric may satisfy the optimal hardware threshold if the hardware environment comprises a hardware environment capability or hardware environment specialty for a task (e.g., the capability or specialty aligns with the requested task).

As also shown in FIG. 14, the hardware allocating machine-learning model 1408 selects a designated hardware environment for executing task 1412. In particular, the hardware allocating machine-learning model selects designated hardware environment 1410, then provides data or input to a machine-learning model (e.g., a prompt to a large language model), and utilizes designated hardware environment 1410 to provide the computing capacity to execute task 1412.

In addition, in one or more embodiments, the intelligent selection and execution platform 102 selects a designated hardware environment based on a historical quality metric. In particular, the intelligent selection and execution platform 102 utilizes user feedback to determine a historical quality metric that indicates an estimated quality of output from tasks that utilize the hardware environment. The intelligent selection and execution platform 102 then utilizes the historical quality metric to select the designated hardware environment.

Further, as illustrated in FIG. 14, the intelligent selection and execution platform 102 receives user feedback data 1414 based on the execution of task 1412. In particular, the intelligent selection and execution platform 102 receives user feedback data that indicates a quality measure of execution of the task. Further, as indicated in FIG. 14, the intelligent selection and execution platform 102 can update parameters of the hardware allocating machine-learning model 1408 based on user feedback data 1414. Additional details regarding the intelligent selection and execution platform 102 receiving user feedback data and training or updating parameters of the hardware allocating machine-learning model 1408 are provided in relation to FIGS. 10A-10B above.

In addition to FIGS. 1-10B and FIGS. 12-14, the corresponding text, and the examples provide a number of different methods, systems, devices, and non-transitory computer-readable media of the intelligent selection and execution platform 102. In addition to the foregoing, one or more embodiments can also be described in terms of flowcharts comprising acts for accomplishing a particular result, as shown in FIG. 15. FIG. 15 may be performed with more or fewer acts. Further, the acts may be performed in differing orders. Additionally, the acts described herein may be repeated or performed in parallel with one another or parallel with different instances of the same or similar acts.

As mentioned, FIG. 15 illustrates a flowchart of a series of acts 1500 for selecting a designated hardware environment in accordance with one or more embodiments. While FIG. 15 illustrates acts according to one embodiment, alternative embodiments may omit, add to, reorder, and/or modify any of the acts shown in FIG. 15. The acts of FIG. 15 can be performed as part of a method. Alternatively, a non-transitory computer-readable medium can comprise instructions that, when executed by one or more processors, cause a computing device to perform the acts of FIG. 15. In some embodiments, a system can perform the acts of FIG. 15.

As shown in FIG. 15, the series of acts 1500 includes an act 1502 of receiving workload data requesting execution of a task using a hardware environment, an act 1504 of extracting workload features defining characteristics of the task, an act 1506 of determining task routing metrics for a plurality of hardware environments hosted in respective network environments, and an act 1108 of selecting a hardware environment for executing the task based on the workload features and the task routing metrics.

In particular, the act 1502 can include receiving, from a device connected by a network to a content management system, workload data requesting execution of a task using a hardware environment, the act 1504 can include extracting, from the workload data, workload features defining characteristics of the task, the act 1506 can include determining task routing metrics for a plurality of hardware environments hosted in respective network environments, and the act 1508 can include selecting, from the plurality of hardware environments, a designated hardware environment for executing the task based on the workload features and the task routing metrics.

For example, in one or more embodiments, the series of acts 1500 includes wherein determining task routing metrics for the plurality of hardware environments further comprises determining a hardware state for each hardware environment of the plurality of hardware environments and wherein selecting, from the plurality of hardware environments, the designated hardware environment for executing the task is based in part on the hardware state of the designated hardware environment. In addition, in one or more embodiments, the series of acts 1500 includes wherein determining task routing metrics for the plurality of hardware environments further comprises determining, based on the workload features, a financial cost metric, an execution time metric, an execution cost metric, or a model fit metric for executing the task on each hardware environment of the plurality of hardware environments and wherein selecting, from the plurality of hardware environments, the designated hardware environment for executing the task is based on two or more of the financial cost metric, the execution time metric, the execution cost metric, and the model fit metric.

Further, in one or more embodiments, the series of acts 1500 includes wherein selecting the designated hardware environment further comprises analyzing the workload data and the task routing metrics for the plurality of hardware environments to determine an optimal hardware environment for executing the task from the plurality of hardware environments and selecting the designated hardware environment for executing the task based on determining that the designated hardware environment is the optimal hardware environment from the plurality of hardware environments. Also, in one or more embodiments, the series of acts includes wherein determining that the designated hardware environment is the optimal hardware environment further comprises generating, utilizing a hardware allocating machine-learning model, an optimization metric and determining that the designated hardware environment is the optimal hardware environment based on the optimization metric.

In addition, in one or more embodiments, the series of acts 1500 includes wherein extracting workload features defining characteristics of the task further comprises determining an estimated processing requirement and an estimated storage requirement for executing the task using a hardware environment. Further, in one or more embodiments, the series of acts 1500 includes wherein selecting the designated hardware environment further comprises analyzing the workload data and the task routing metrics for the plurality of hardware environments of the plurality of hardware environments, wherein the plurality of hardware environments comprises one or more hardware environments and one or more third-party hardware environments and selecting the designated hardware environment for executing the task based on analyzing the workload data and the task routing metrics.

Moreover, in one or more embodiments, the series of acts 1500 includes wherein selecting the designated hardware environment further comprises performing probabilistic load balancing of each hardware environments of the plurality of hardware environments for executing the task and selecting the designated hardware environment based on the probabilistic load balancing. In addition, in one or more embodiments, the series of acts 1500 includes wherein selecting the designated hardware environment further comprises accessing user feedback metrics about executing tasks using one or more hardware environments of the plurality of hardware environments, determining a historical quality metric that indicates how the one or more hardware environments of the plurality of hardware environments will execute the task based on the user feedback metrics, and selecting the designated hardware environment for the task based on the historical quality metric.

Also, in one or more embodiments, the series of acts 1500 includes wherein selecting the designated hardware environment further comprises identifying a capability or specialty associated with one or more hardware environments of the plurality of hardware environments and selecting the designated hardware environment for executing the task based on alignment of the capability or the specialty of the designated hardware environment with the task.

In addition, in one or more embodiments, the series of acts 1500 includes receiving, from a device connected by a network to a content management system, workload data requesting execution of a task using a hardware environment, extracting, from the workload data, workload features defining characteristics of the task, determining task routing metrics for a plurality of hardware environments hosted in respective network environments, and selecting, from the plurality of hardware environments and based on the workload features and the task routing metrics, a first designated hardware environment for executing a first portion of the task and a second designated hardware environment for executing a second portion of the task. Further, in one or more embodiments, the series of acts include determining a hardware state for each hardware environment of the plurality of hardware environments, selecting the first designated hardware environment for executing the first portion of the task is based on a first hardware state for the first designated hardware environment and selecting the second designated hardware environment for executing the second portion of the task is based on a second hardware state for the second designated hardware environment.

Further, in one or more embodiments, the series of acts 1500 includes analyzing the workload data and the task routing metrics for the plurality of hardware environments, selecting the first designated hardware environment for executing the first portion of the task based on determining that the first designated hardware environment is a first optimal hardware environment from the plurality of hardware environments, and selecting the second designated hardware environment for executing the second portion of the task based on determining that the second designated hardware environment is a second optimal hardware environment for executing the second portion of the task. Moreover, in one or more embodiments, the series of acts 1500 includes performing probabilistic load balancing of each hardware environment of the plurality of hardware environments for executing the task and selecting the first designated hardware environment for executing the first portion of the task and the second designated hardware environment for executing the second portion of the task based on the probabilistic load balancing.

Also, in one or more embodiments, the series of acts 1500 includes receiving, from a device connected by a network to a content management system, workload data requesting execution of a task using a hardware environment, extracting, from the workload data, workload features defining characteristics of the task, determining task routing metrics for a plurality of hardware environments hosted in respective network environments, and selecting, utilizing a hardware allocating machine-learning model, a designated hardware environment from the plurality of hardware environments for executing the task based on the workload features and the task routing metrics.

In addition, in one or more embodiments, the series of acts 1500 includes utilizing the hardware allocating machine-learning model to compare each hardware environment of the plurality of hardware environments based on the workload features and the task routing metrics and selecting the designated hardware environment from the plurality of hardware environments based on an output of the hardware allocating machine-learning model. Also, in one or more embodiments, the series of acts 1500 includes receiving additional task routing metrics for an additional hardware environment and updating parameters of the hardware allocating machine-learning model based on the additional task routing metrics of the additional hardware environment.

Moreover, in one or more embodiments, the series of acts 1500 includes generating, utilizing the hardware allocating machine-learning model, an optimization metric for each hardware environment of the plurality of hardware environments and selecting the designated hardware environment based on the optimization metric. Further, in one or more embodiments, the series of acts 1500 includes receiving user feedback data indicating a user satisfaction with execution of the task and updating parameters of the hardware allocating machine-learning model based on the user feedback data.

Figure 16:
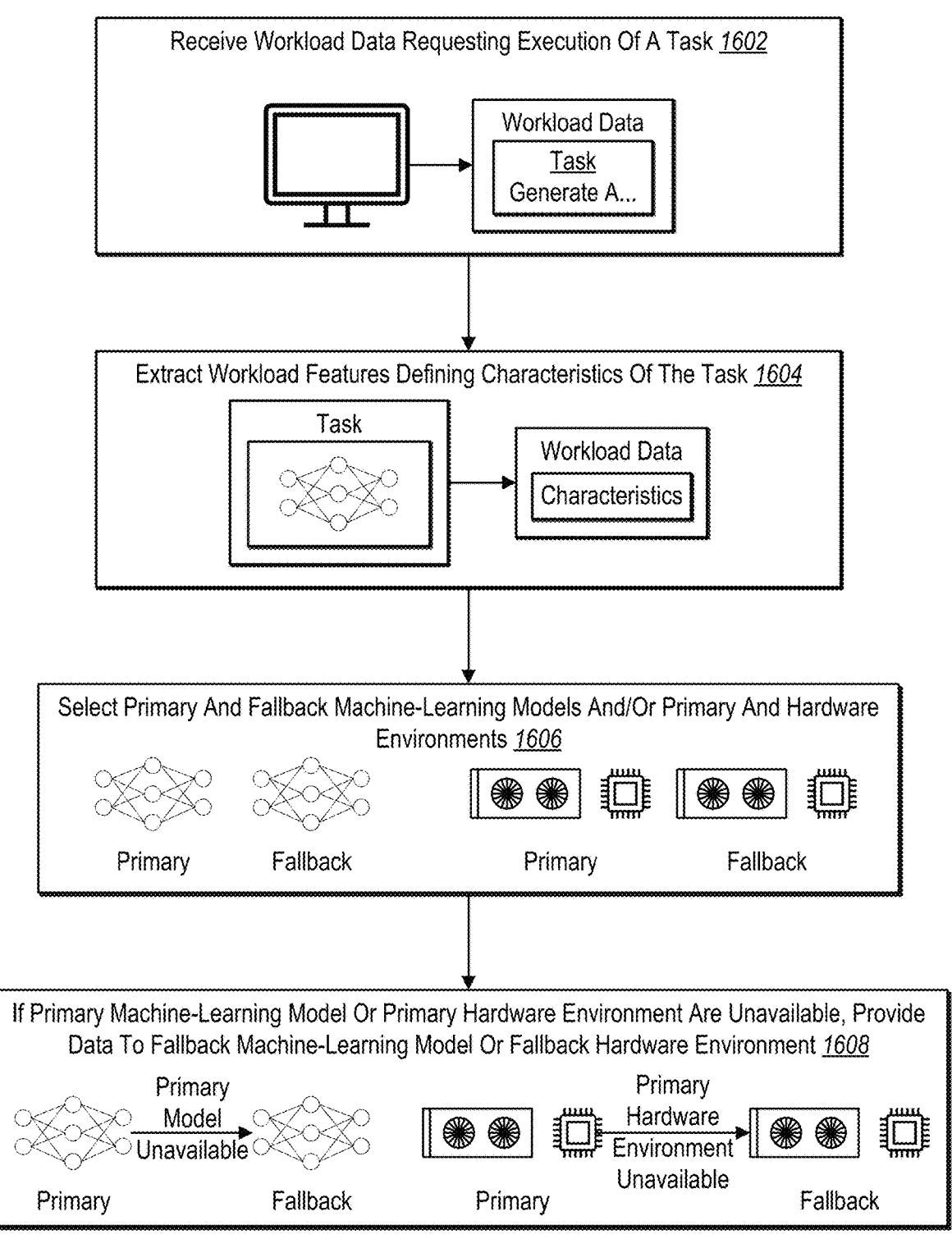
FIG. 16 illustrates a schematic diagram of an intelligent selection and execution platform selecting fallback machine-learning models for executing a task in accordance with one or more embodiments.

As previously mentioned, the intelligent selection and execution platform 102 can select additional machine-learning models (or hardware environments) as fallbacks for the selected machine-learning models (or hardware environments). In particular, the intelligent selection and execution platform 102 selects a primary machine-learning model (or primary hardware environment) and a fallback machine-learning model (or fallback hardware environment) for executing a task. FIG. 16 illustrates a schematic diagram of an intelligent selection and execution platform selecting a primary machine-learning model (or primary hardware environment) and a fallback machine-learning model (or fallback hardware environment) for executing a task in accordance with one or more embodiments.

As illustrated in FIG. 16, the intelligent selection and execution platform 102 performs an act 1602 and receives workload data requesting the execution of a task. In particular, the intelligent selection and execution platform 102 receives workload data from a device connected to the content management system 108 that requests the execution of a task. For example, workload data comprises the necessary data and/or information for executing the task, such as a request to execute the task using a machine-learning model. In one or more embodiments, the intelligent selection and execution platform 102 receives workload data through an API layer, as described in relation to FIG. 4 above.

In one or more embodiments, the intelligent selection and execution platform 102 workload data comprises parameters for executing a task. Specifically, the workload data comprises parameters comprising requests or specifications for executing a task. For example, workload data can comprise a parameter that instructs the intelligent selection and execution platform 102 to utilize a certain machine-learning model for executing a task or to execute the task using a certain hardware environment. As another example, workload data can comprise a parameter that instructs the intelligent selection and execution platform 102 to not utilize a certain machine-learning model or hardware environment to execute a task. Additional detail regarding the intelligent selection and execution platform 102 receiving workload data and parameters for executing a task is provided in relation to FIG. 6 above As also illustrated in FIG. 16, the intelligent selection and execution platform 102 performs an act 1604 and extracts, from the workload data, workload features defining characteristics of the task. In particular, the intelligent selection and execution platform 102 extracts workload features by determining an amount of processing and storage needed for executing the task. In some instances, the intelligent selection and execution platform 102 can compute the computational cost for executing a task on a specific machine-learning model. In other instances, the intelligent selection and execution platform 102 determines processing and storage requirements for executing a task using a specific hardware environment. Additional details regarding the intelligent selection and execution platform 102 extracting workload features from workload data are provided in relation to FIG. 6 above.

As further illustrated in FIG. 16, the intelligent selection and execution platform 102 performs an act 1606 and selects a primary machine-learning model and a fallback machine-learning model. In particular, the intelligent selection and execution platform 102 determines scores based on workload features (e.g., optimization metrics) for machine-learning models and selects a primary machine-learning model and a fallback machine-learning model for executing a task. The intelligent selection and execution platform 102 can then utilize the scores to rank machine-learning models and create a hierarchy (e.g., a daisy chain) of one or more machine-learning models according to the ranking. In some cases, the intelligent selection and execution platform 102 utilizes a model selection machine-learning model to select the primary machine-learning model and fallback machine-learning model. Additional details regarding the intelligent selection and execution platform 102 utilizing a model selection machine-learning model to select a primary machine-learning model and a fallback machine-learning model are provided in relation to FIG. 17 below.

In one or more embodiments, the intelligent selection and execution platform 102 determines task routing metrics for a plurality of machine-learning models and utilizes the task routing metrics to select a primary machine-learning model and a fallback machine-learning model. Specifically, the intelligent selection and execution platform 102 determines task routing metrics that indicate financial costs, execution times, execution costs, model fit, model states, model capabilities, or model specialties for executing the task on machine-learning models of a plurality of machine-learning models. Additional details regarding the intelligent selection and execution platform 102 determining task routing metrics for a plurality of machine-learning models are provided in relation to FIG. 7 above. Further, additional details regarding the intelligent selection and execution platform 102 utilizing task routing metrics to select a primary machine-learning model and a fallback machine-learning model are provided in relation to FIG. 17 below.

As also illustrated in FIG. 16, the intelligent selection and execution platform 102 performs an act 1606 and selects a primary hardware environment and a fallback hardware environment. In particular, the intelligent selection and execution platform 102 determines scores based on workload features (e.g., optimization metrics) for hardware environments and selects a primary hardware environment and a fallback hardware environment for executing a task. The intelligent selection and execution platform 102 can then utilize the scores to rank hardware environments and create a hierarchy (e.g., a daisy chain) of two or more hardware environments according to the ranking. In some cases, the intelligent selection and execution platform 102 utilizes a hardware allocating machine-learning model to select the primary hardware environment and the fallback hardware environment. Additional detail regarding the intelligent selection and execution platform 102 utilizing a hardware allocating machine-learning model to select a primary hardware environment and a fallback hardware environment is provided in relation to FIGS. 19A-19B below.

In one or more embodiments, the intelligent selection and execution platform 102 determines task routing metrics for a plurality of hardware environments and utilizes the task routing metrics to select a primary hardware environment and a fallback hardware environment. Specifically, the intelligent selection and execution platform 102 determines task routing metrics that indicate financial costs, execution times, execution costs, user feedback data, hardware environment states, hardware environment capabilities, or hardware environment specialties of hardware environments of a plurality of hardware environments. Additional details regarding the intelligent selection and execution platform 102 determining task routing metrics for a plurality of hardware environments are provided with relation to FIG. 13 above. Further, additional detail regarding the intelligent selection and execution platform 102 utilizing task routing metrics to select a primary hardware environment and a fallback hardware environment is provided with relation to FIGS. 19A-19B below.

As also illustrated in FIG. 16, the intelligent selection and execution platform 102 can perform an act 1608 and provide data to the fallback machine-learning model to execute a task if the primary machine-learning model is unavailable. In addition, if the fallback machine-learning model is unavailable, the intelligent selection and execution platform 102 continues along the hierarchy and provides data to an additional model to execute the task if the fallback machine-learning model is also unavailable. Additional details regarding the intelligent selection and execution platform 102 providing data to a fallback machine-learning model if a primary machine-learning model is unavailable are provided in relation to FIG. 18 below.

As further illustrated in FIG. 16 as a part of act 1608, the intelligent selection and execution platform 102 utilizes a fallback hardware system if the primary hardware system is unavailable to execute a task. In addition, if the fallback hardware environment is unavailable, the intelligent selection and execution platform 102 can continue along the hierarchy and utilize an additional hardware environment to execute a task if a fallback hardware environment is unavailable. Additional detail regarding the intelligent selection and execution platform 102 utilizing a fallback hardware environment if a primary hardware environment is unavailable is provided in relation to FIGS. 20A-20B below.

Figure 17:
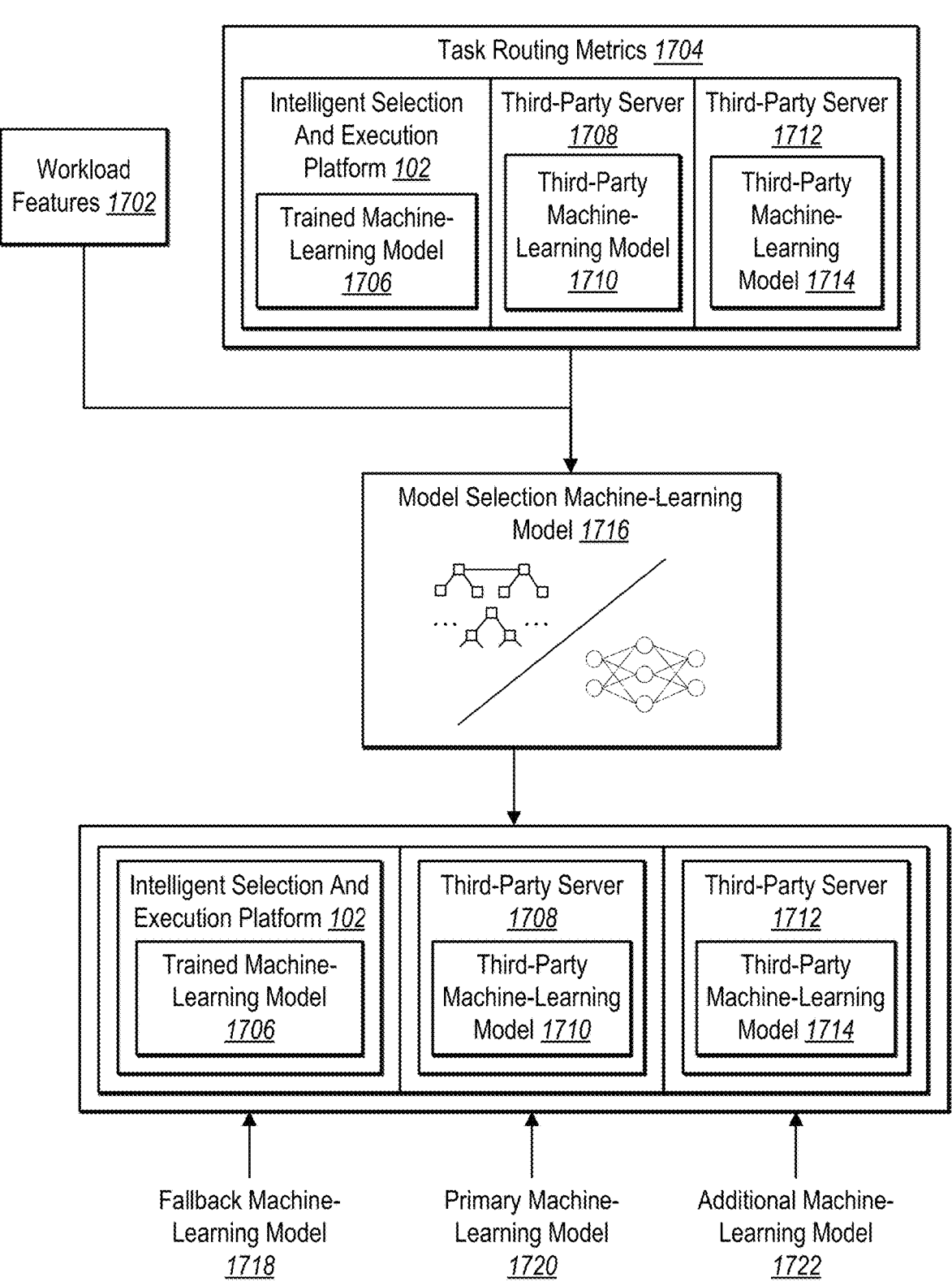
FIG. 17 illustrates an intelligent selection and execution platform utilizing a model selection machine-learning model to select a primary machine-learning model and a fallback machine-learning model in accordance with one or more embodiments.

As previously mentioned, the intelligent selection and execution platform 102 can select a primary machine-learning model and a fallback machine-learning model for executing a task. In particular, the intelligent selection and execution platform 102 utilizes a model selection machine-learning model to select a primary machine-learning model and a fallback machine-learning model based on workload features and task routing metrics. FIG. 17 illustrates the intelligent selection and execution platform 102 utilizing a model selection machine-learning model to select a primary machine-learning model and a fallback machine-learning model in accordance with one or more embodiments.

As illustrated in FIG. 17, model selection machine-learning model 1716 receives workload features 1702 and task routing metrics 1704. In particular, the intelligent selection and execution platform 102 extracts workload features 1702 defining characteristics of a task from workload data (e.g., as described in FIG. 6). Additionally, task routing metrics 1704 comprise task routing metrics for a plurality of machine-learning models that includes a trained machine-learning model 1706 of the intelligent selection and execution platform 102 and third-party machine-learning models in their respective environments (e.g., as described in FIG. 7). For example, as pictured in FIG. 17, the plurality of machine-learning models comprises third-party machine-learning model 1710 hosted on third-party server 1708 and third-party machine-learning model 1714 hosted on third-party server 1712 in addition to trained machine-learning model 1706.

As illustrated, the intelligent selection and execution platform 102 uses model selection machine-learning model 1716 to select a primary machine-learning model 1720, a fallback machine-learning model 1718, and an additional machine-learning model 1722. In particular, model selection machine-learning model 1716 analyzes the workload features 1702 and task routing metrics 1704 to select primary machine-learning model 1720, fallback machine-learning model 1718, and additional machine-learning model 1722. For example, the model selection machine-learning model 1716 compares estimated processing requirements and estimated storage requirements for executing the task to the task routing metrics 1704 for the plurality of machine-learning models. For example, the model selection machine-learning model 1716 determines that the execution cost metric or the model state aligns with the estimated processing requirement or the estimated storage requirement for executing the task. As another example, if a model capability or model specialty of a machine-learning model aligns with a task, the model selection machine-learning model 1716 can select that machine-learning model for executing the task. Moreover, as another example, the model selection machine-learning model 1716 can select primary machine-learning model 1720, fallback machine-learning model 1718, and additional machine-learning model 1722 based on a financial cost metric, such as by ranking machine-learning models of the plurality of machine-learning models based on a financial cost metric.

In one or more embodiments, the model selection machine-learning model 1716 generates an optimization metric based on workload features 1702 and task routing metrics 1704 and uses the optimization metric to select primary machine-learning model 1720, fallback machine-learning model 1718, and additional machine-learning model 1722. Specifically, the model selection machine-learning model 1716 generates an optimization metric for each machine-learning model of the plurality of machine-learning models and ranks the machine-learning models based on the optimization metric to generate a hierarchy of machine-learning models for executing a task. In some cases, the model selection machine-learning model 1716 selects primary machine-learning model 1720, fallback machine-learning model 1718, and additional machine-learning model 1722 based on the hierarchy (e.g., primary machine-learning model 1720 has the highest optimization metric, fallback machine-learning model 1718 has the second highest optimization metric, and additional machine-learning model 1722 has a third highest optimization metric).

Figure 18:
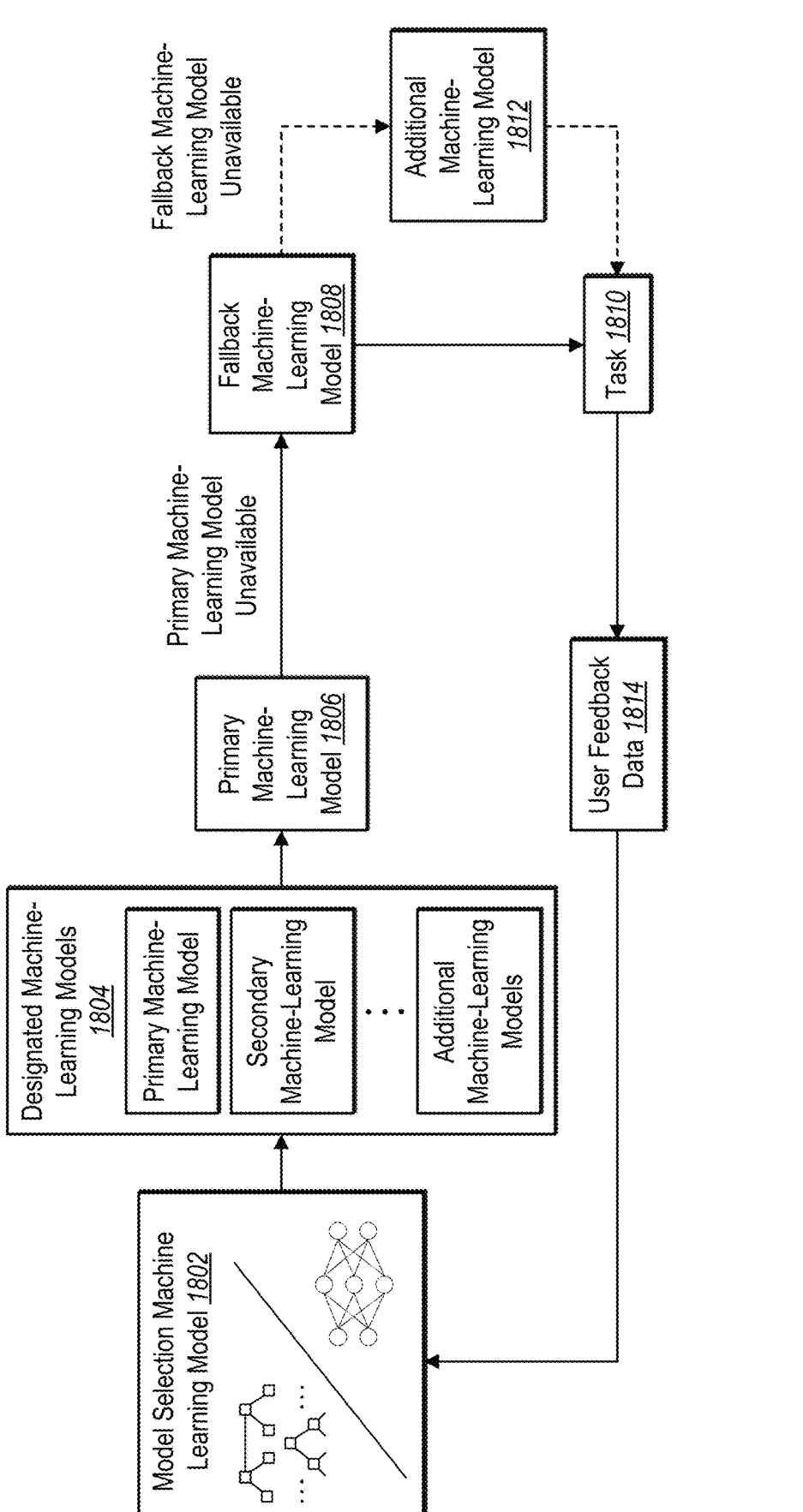
FIG. 18 illustrates an intelligent selection and execution platform utilizing a fallback machine-learning model to execute a task when a primary machine-learning model is unavailable in accordance with one or more embodiments.

As previously mentioned, the intelligent selection and execution platform 102 provides data to a fallback machine-learning model if a primary machine-learning model is unavailable. In particular, the intelligent selection and execution platform 102 provides data to a fallback machine-learning model to execute a task if a primary machine-learning model is unavailable. FIG. 18 illustrates an intelligent selection and execution platform utilizing a fallback machine-learning model to execute a task when a primary machine-learning model is unavailable in accordance with one or more embodiments.

As illustrated in FIG. 18, model selection machine-learning model 1802 provides the output of designated machine-learning models 1804 comprising a primary machine-learning model, a fallback machine-learning model, and an additional model. In particular, as described in FIG. 17 above, model selection machine-learning model 1802 generates a hierarchy of machine-learning models based on workload features defining characteristics of a task and task routing metrics of a plurality of machine-learning models.

As also illustrated in FIG. 18, the intelligent selection and execution platform 102 provides data to primary machine-learning model 1806 to execute a task and determines that the primary hardware environment is unavailable. In some cases, the intelligent selection and execution platform 102 attempts to execute the task using primary machine-learning model 1806 and determines that it is unavailable. In other cases, the intelligent selection and execution platform 102 identifies that primary machine-learning model 1806 is unavailable prior to attempting to execute the task.

Primary machine-learning model 1806, or any of the designated machine-learning models 1804, may be unavailable for a number of reasons. For example, primary machine-learning model 1806 may be unavailable due to an outage associated with the primary machine-learning model. As another example, hardware, systems, or network environments associated with primary machine-learning model 1806 may experience issues, such as power outages or other technical issues, rendering primary machine-learning model 1806 unavailable. In addition, as another example, primary machine-learning model 1806 is unavailable due to high demand, such as a high volume of requests to execute tasks. Further, as another example, primary machine-learning model 1806 may be unavailable due to software changes or updates. Moreover, as another example, primary machine-learning model 1806 may be unavailable due to natural disasters that damage hardware supporting primary machine-learning model 1806 or restrict communication with primary machine-learning model 1806.

As illustrated in FIG. 18, upon detecting that primary machine-learning model 1806 is unavailable, the intelligent selection and execution platform 102 provides data to fallback machine-learning model 1808 to execute task 1810. Moreover, as illustrated in FIG. 16, if the intelligent selection and execution platform 102 detects that fallback machine-learning model 1808 is unavailable, the intelligent selection and execution platform 102 can provide data to additional machine-learning model 1812 to execute task 1810. Indeed, the intelligent selection and execution platform 102 can continue to move along a hierarchy of machine-learning models until a machine-learning model is available to execute task 1810.

As also illustrated in FIG. 18, the intelligent selection and execution platform 102 receives user feedback data 1814. In particular, as previously mentioned, the intelligent selection and execution platform 102 receives user feedback data 1814 that indicates a user satisfaction with a task and utilizes the user feedback data 1814 to update parameters of model selection machine-learning model 1802. In some cases, the intelligent selection and execution platform 102 accounts for model unavailability when utilizing user feedback data 1814 to update parameters of model selection machine-learning model 1802. For example, if a client device indicated dissatisfaction with a task, the intelligent selection and execution platform 102 might indicate that a preferred machine-learning model was unavailable to execute the task. The intelligent selection and execution platform 102 may also account for model availability when updating parameters of model selection machine-learning model 1802 with user feedback data 1814.

Figure 19A:
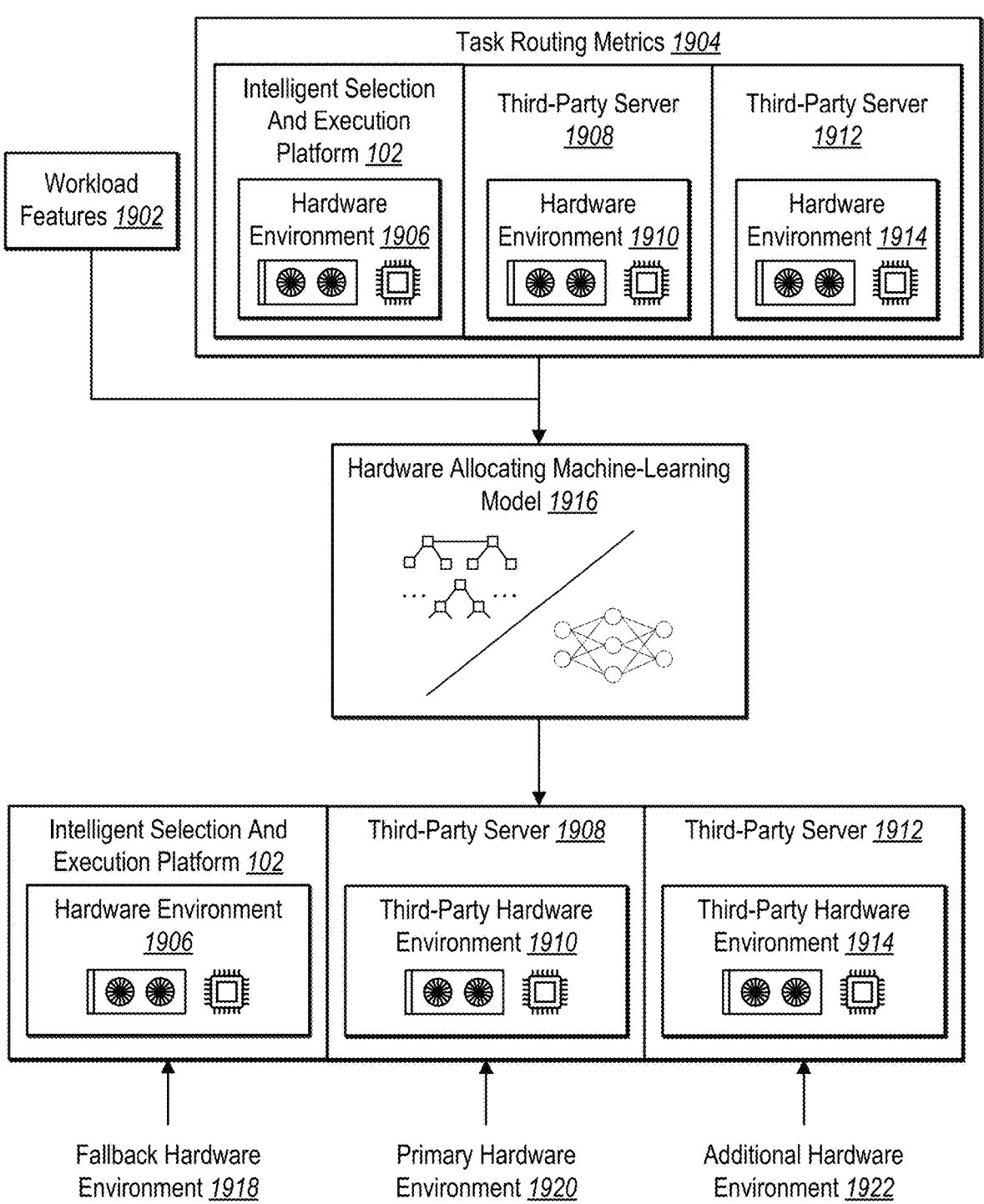
FIGS. 19A-19B illustrate an intelligent selection and execution platform utilizing a hardware allocating machine-learning model to select a primary hardware environment and a fallback hardware environment in accordance with one or more embodiments.
Figure 19B:
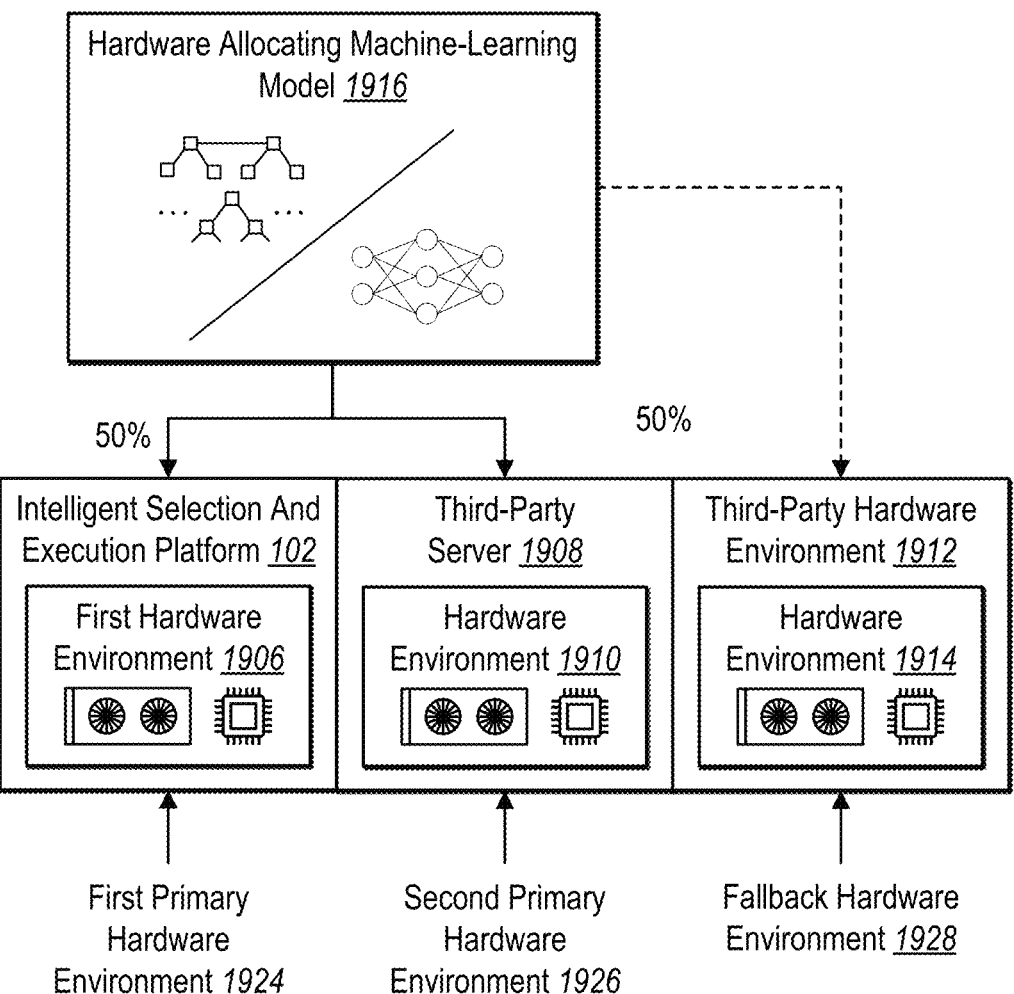

As previously mentioned, intelligent selection and execution platform 102 selects a primary hardware environment and a fallback hardware environment for executing a task. In particular, the intelligent selection and execution platform 102 utilizes a hardware allocating machine-learning model to select a primary hardware environment and a fallback hardware environment for executing a task. FIGS. 19A-19B illustrate an intelligent selection and execution platform utilizing a hardware allocating machine-learning model to select a primary hardware environment and a fallback hardware environment in accordance with one or more embodiments. FIG. 19A illustrates a hardware allocating machine-learning model selecting a primary hardware environment and a fallback hardware environment for executing a task. FIG. 19B illustrates the hardware allocating machine-learning model allocating tasks between multiple primary hardware environments and selects a fallback hardware environment if one of the primary hardware environments is unavailable.

As illustrated in FIG. 19A, hardware allocating machine-learning model 1916 receives workload features 1902 and task routing metrics 1904. In particular, the intelligent selection and execution platform 102 extracts workload features 1902 defining characteristic of a task from workload data (e.g., as described in FIG. 6). Additionally, task routing metrics 1904 comprise task routing metrics for a plurality of hardware environments that includes a hardware environment 1906 of intelligent selection and execution platform 102 and third-party hardware environments in their respective network environments (e.g., as described in FIG. 13). For example, as illustrated in FIG. 19A, the plurality of hardware environment comprises third-party hardware environment 1910 hosted on third-party server 1908 and third-party hardware environment 1914 hosted on third-party server 1912 in addition to hardware environment 1906.

As also illustrated in FIG. 19A, the intelligent selection and execution platform 102 uses hardware allocating machine-learning model 1916 to select a primary hardware environment 1920, a fallback hardware environment 1918, and an additional hardware environment 1922. In particular, hardware allocating machine-learning model 1916 analyzes workload features 1902 and task routing metrics 1904 to select primary hardware environment 1920, fallback hardware environment 1918, and additional hardware environment 1922. For example, hardware allocating machine-learning model 1916 compares estimated processing requirements and storage requirements for executing the task to the task routing metrics for each hardware environment of the plurality of hardware environments. For example, the hardware allocating machine-learning model 1916 determines that execution cost metrics or model state metrics align with the estimated processing requirement or the estimated storage requirement for executing the task. As another example, if a hardware environment capability or hardware environment specialty of a hardware environment aligns with a task, hardware allocating machine-learning model 1916 can select that hardware environment for executing the task. Moreover, as another example, the hardware allocating machine-learning model 1916 can select primary hardware environment 1920, fallback hardware environment 1918, and additional hardware environment 1922 based on a financial cost metric, such as by ranking machine-learning models of the plurality of machine-learning models based on a financial cost metric.

In one or more embodiments, hardware allocating machine-learning model 1916 generates an optimization metric based on workload features 1902 and task routing metrics 1904 and utilizes the optimization metric to select primary hardware environment 1920, fallback hardware environment 1918, and additional hardware environment 1922. Specifically, hardware allocating machine-learning model 1916 generates an optimization metric for each hardware environment of the plurality of hardware environments and ranks the hardware environments based on the optimization metric to generate a hierarchy of hardware environments for executing a task. In some cases, the hardware allocating machine-learning model 1916 selects select primary hardware environment 1920, fallback hardware environment 1918, and additional hardware environment 1922 based on the hierarchy (e.g., primary hardware environment 1920 has the highest optimization metric, fallback hardware environment 1918 has the second highest optimization metric, and additional hardware environment 1922 has a third highest optimization metric).

In one or more embodiments, the intelligent selection and execution platform 102 selects a primary hardware environment by allocating resources from multiple hardware environments to execute a task. As shown in FIG. 19B, hardware allocating machine-learning model 1916 can select hardware environment 1906 as a first primary hardware environment 1924 and third-party hardware environment 1910 as a second primary hardware environment 1926 and allocate from both the first primary hardware environment 1924 and the second primary hardware environment 1926 to execute the task. For example, as illustrated, the hardware allocating machine-learning model allocates a first portion of a task (e.g., 50%) to the first primary hardware environment 1924 and a second portion of a task (e.g., 50%) to the second primary hardware environment 1926.

As also illustrated in FIG. 19B, in cases where the intelligent selection and execution platform 102 allocates resources to multiple hardware environments, the intelligent selection and execution platform 102 can also select an additional hardware environment as a fallback hardware environment to execute a task if the first primary hardware environment or the second primary hardware environment, or both, are unavailable. For example, as illustrated, the hardware allocating machine-learning model 1916 can select third-party hardware environment 1914 as fallback hardware environment 1928.

Figure 20A:
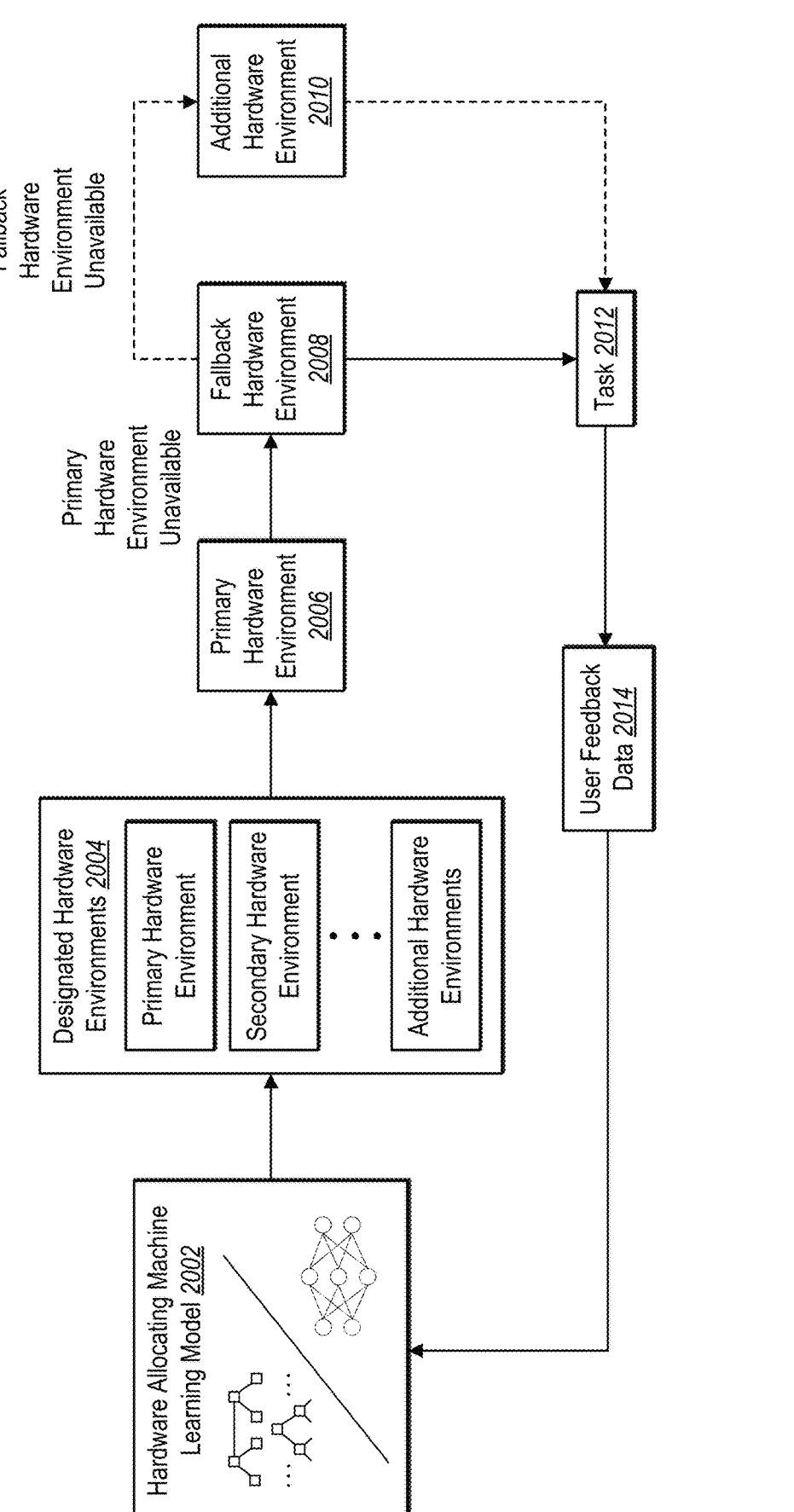
FIGS. 20A-20B illustrate an intelligent selection and execution platform detecting a primary hardware environment is unavailable and utilizing a fallback hardware environment to execute a task in accordance with one or more embodiments.
Figure 20B:
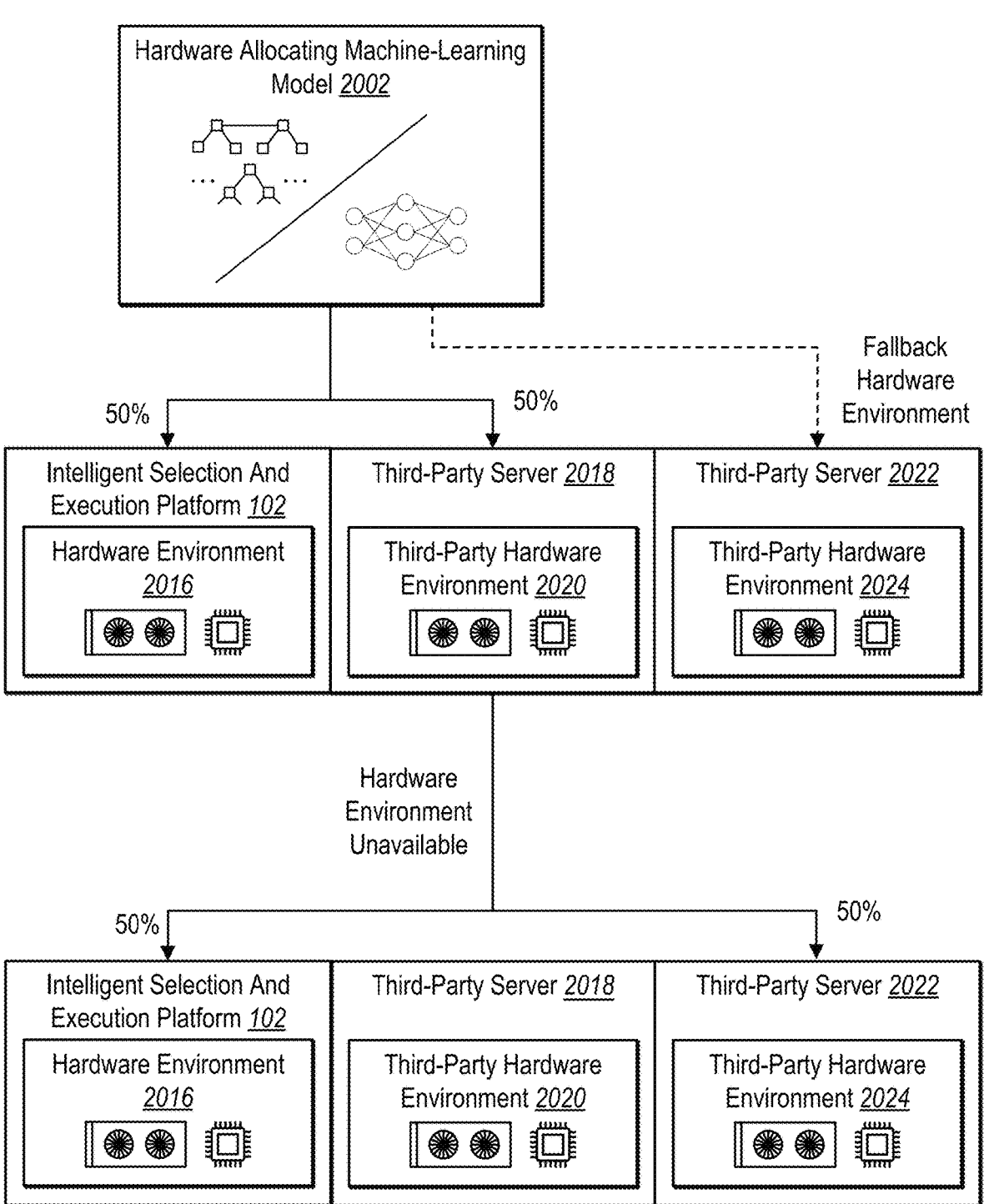

As previously mentioned, the intelligent selection and execution platform 102 can allocate resources from a fallback hardware environment if a primary hardware environment is unavailable. In particular, the intelligent selection and execution platform 102 allocates resources to a fallback hardware environment to execute a task if a primary hardware environment is unavailable. FIGS. 20A-20B illustrate an intelligent selection and execution platform detecting a primary hardware environment is unavailable and utilizing a fallback hardware environment to execute a task in accordance with one or more embodiments. FIG. 20A illustrates the intelligent selection and execution platform 102 allocating resources if a primary hardware environment is unavailable. FIG. 20B illustrates the intelligent selection and execution platform 102 adjusting the distribution of resources if a hardware environment is unavailable.

As illustrated in FIG. 20A, hardware allocating machine-learning model 2002 provides an output of designated hardware environments 2004 comprising a primary hardware environment, a fallback hardware environment, and additional hardware environments. In particular, as described in FIG. 19A above, hardware allocating machine-learning model 2002 generates a hierarchy of hardware environments based on workload features defining characteristics of a task and task routing metrics of a plurality of hardware environments. In some instances, as described in FIG. 19B above, the hardware allocating machine-learning model can allocate execution of tasks between multiple hardware environments.

As also illustrated in FIG. 20A, the intelligent selection and execution platform 102 utilizes primary hardware environment 2006 to execute a task and determines that primary hardware environment 2006 is unavailable. In some cases, the intelligent selection and execution platform 102 attempts to utilize primary hardware environment 2006 and determines that it is unavailable. In other cases, the intelligent selection and execution platform 102 identifies that primary hardware environment 2006 is unavailable prior to attempting to execute the task.

Primary hardware environment 2006, or another designated hardware environment of designated hardware environments 2004, may be unavailable for a number of reasons. For example, primary hardware environment 2006 may be unavailable due to hardware failure, such as when a GPU, CPU, memory, or storage drives fail. As another example, primary hardware environment 2006 may be unavailable due to resource constraints, such as when computational resources are overcommitted to other tasks. As an additional example, the primary hardware environment 2006 may be unavailable due to scheduled maintenance or upgrades that temporarily make the hardware environment unavailable. Moreover, for example, primary hardware environment 2006 may be unavailable due to power outages, power disruptions or other natural factors. In addition, for example, primary hardware environment 2006 may be unavailable due to cooling issues, such as when there are issues with cooling systems, and primary hardware environment 2006 may be shut down to prevent overheating. As another example, primary hardware environment 2006 may be unavailable due to network connectivity problems that prevent primary hardware environment 2006 from communicating with machine-learning models or other systems. Further, for example, primary hardware environment 2006 may be unavailable due to unexpected demand spikes, such as a sudden increase in demand for computational resources due to unexpected user activity or other factors. Moreover, primary hardware environment 2006 may be unavailable due to errors, such as software or configuration errors that prevent communication or misallocate resources, leading to misallocation of resources.

As illustrated in FIG. 20A, upon detecting that primary hardware environment 2006 is unavailable, the intelligent selection and execution platform 102 utilizes fallback hardware environment 2008 to execute task 2012. Moreover, as illustrated in FIG. 20A, if the intelligent selection and execution platform 102 detects that fallback hardware environment 2008 is unavailable, the intelligent selection and execution platform 102 can utilize additional hardware environment 2010 to execute task 2012. Indeed, the intelligent selection and execution platform 102 can continue to move along a hierarchy of hardware environments until a hardware environment is available to provide computational resources for executing task 2012.

As also illustrated in FIG. 20A, the intelligent selection and execution platform 102 receives user feedback data 2014. In particular, as previously mentioned, the intelligent selection and execution platform 102 receives user feedback data 2014 that indicates a user satisfaction with a task and utilizes user feedback data 2014 to update parameters of hardware allocating machine-learning model 2002. In some cases, the intelligent selection and execution platform 102 accounts for hardware environment availability when utilizing user feedback data 2014 to update parameters of hardware allocating machine-learning model 2002. For example, if a client device indicated dissatisfaction with a task, the intelligent selection and execution platform 102 might indicate that a preferred machine-learning model was unavailable to execute the task. The intelligent selection and execution platform 102 may also account for model availability when updating parameters of hardware allocating machine-learning model 2002. Additional detail regarding the intelligent selection and execution platform 102 utilizing user feedback data to update parameters of a hardware allocating machine-learning model is provided in relation to FIGS. 10A-10B above.

As previously mentioned, the intelligent selection and execution platform 102 can allocate computational resources from multiple hardware environments for executing a task. As illustrated in FIG. 20B, the intelligent selection and execution platform 102 may redistribute or reallocate computational resources if a primary hardware environment is unavailable. As shown, hardware allocating machine-learning model 2002 can select hardware environment 2016 of the intelligent selection and execution platform 102 as a first primary hardware environment, third-party hardware environment 2020 hosted on third-party server 2018 as a second primary hardware environment, and third-party hardware environment 2024 hosted on third-party server 2022 as a fallback hardware environment. If the intelligent selection and execution platform 102 determines that hardware environment 2016 or third-party hardware environment 2020 are unavailable, the intelligent selection and execution platform 102 can allocate resources from third-party hardware environment 2024 (e.g., the fallback hardware environment). As shown, the intelligent selection and execution platform 102 allocates resources from hardware environment 2016 to execute a first portion of a task (50%) and allocates resources from third-party hardware environment 2020 to execute a second portion of a task (50%). Upon detecting that third-party hardware environment 2020 is unavailable, the intelligent selection and execution platform 102 allocates resources to the third-party hardware environment 2024 to execute the second portion of the task.

In addition to FIGS. 1-10B, FIGS. 12-14, and FIGS. 16-20B, the corresponding text, and the examples provide a number of different methods, systems, devices, and non-transitory computer-readable media of the intelligent selection and execution platform 102. In addition to the foregoing, one or more embodiments can also be described in terms of flowcharts comprising acts for accomplishing a particular result, as shown in FIG. 21. FIG. 21 may be performed with more or fewer acts. Further, the acts may be performed in differing orders. Additionally, the acts described herein may be repeated or performed in parallel with one another or parallel with different instances of the same or similar acts.

As mentioned, FIG. 21 illustrates a flowchart of a series of acts 2100 for selecting a machine-learning model and a fallback machine-learning model in accordance with one or more embodiments. While FIG. 21 illustrates acts according to one embodiment, alternative embodiments may omit, add to, reorder, and/or modify any of the acts shown in FIG. 21.

The acts of FIG. 21 can be performed as part of a method. Alternatively, a non-transitory computer-readable medium can comprise instructions that, when executed by one or more processors, cause a computing device to perform the acts of FIG. 21. In some embodiments, a system can perform the acts of FIG. 21.

As shown in FIG. 21, the series of acts 2100 includes an act 2102 of receiving workload data requesting execution of a task using a machine-learning model, an act 2104 of extracting workload features defining characteristics of the task, an act 2106 of selecting a primary machine-learning model and a fallback machine-learning model for executing the task based on the workload features, and an act 2108 of based on detecting that the primary machine-learning model is unavailable, providing the workload data to a computing environment of the fallback machine-learning model for executing the task.

In particular, the act 2102 can include receiving, from a device connected by a network to a content management system, workload data requesting execution of a task using a machine-learning model, the act 2104 can include extracting, from the workload data, workload features defining characteristics of the task, the act 2106 can include selecting a primary machine-learning model and a fallback machine-learning model for executing the task based on the workload features and the act 2108 can include based on detecting that the primary machine-learning model is unavailable, providing the workload data to a computing environment of the fallback machine-learning model for executing the task.

For example, in one or more embodiments, the series of acts 2100 includes wherein extracting workload features defining characteristics of the task further comprises determining an estimated processing requirement and an estimated storage requirement for executing the task. In addition, in one or more embodiments, the series of acts 2100 includes wherein selecting the primary machine-learning model and the fallback machine-learning model further comprises generating optimization metrics for each machine-learning model of a plurality of machine-learning model and selecting the primary machine-learning model and the fallback machine-learning model based on the optimization metrics.

Further, in one or more embodiments, the series of acts 2100 includes wherein selecting the primary machine-learning model and the fallback machine-learning model further comprises determining a model state for a plurality of machine-learning models, selecting the primary machine-learning model based in part on a first model state of the primary machine-learning model, and selecting the fallback machine-learning model based in part on a second model state of the fallback machine-learning model. Also, in one or more embodiments, the series of acts 2100 includes wherein selecting the primary machine-learning model and the fallback machine-learning model further comprises determining, based on the workload features, a financial cost metric, an execution time metric, an execution cost metric, or a model fit metric for executing the task on each machine-learning models in a plurality of machine-learning models and selecting the primary machine-learning model and the fallback machine-learning model is based on two or more of the financial cost metric, the execution time metric, the execution cost metric, or the model fit metric In addition, in one or more embodiments, the series of acts 2100 includes selecting an additional machine-learning model for executing the task based on the workload feature and, based on detecting that the fallback machine-learning model is unavailable, providing the workload data to a computing environment of the additional machine-learning model for executing the task. Moreover, the series of acts 2100 includes selecting a trained machine-learning model as the primary machine-learning model and a third-party trained machine-learning model as the fallback machine-learning model.

Also, in one or more embodiments, the series of acts 2100 includes detecting that the primary machine-learning model is unavailable based on identifying that a first hardware environment associated with the primary machine-learning model is unavailable to execute the task and providing the workload data to a second hardware environment associated with the fallback machine-learning model based on identifying that the second hardware environment is available to execute the task. In addition, in one or more embodiments, the series of acts 2100 includes wherein selecting the primary machine-learning model and the fallback machine-learning model further comprises performing a software domain analysis of each machine-learning model of a plurality of machine-learning models for executing the task and selecting the primary machine-learning model and the fallback machine-learning model based on the software domain analysis.

Moreover, in one or more embodiments, the series of acts 2100 includes receiving, from a device connected by a network to a content management system, workload data requesting execution of a task using a machine-learning model, extracting, from the workload data, workload features defining characteristics of the task, determining task routing metrics for a plurality of machine-learning models hosted in respective network environments, selecting a primary machine-learning model and a fallback machine-learning model from the plurality of machine-learning models for executing the task based on the workload features and the task routing metrics, and, based on detecting that the primary machine-learning model is unavailable, provide the workload data to a computing environment of the fallback machine-learning model for executing the task.

In addition, in one or more embodiments, the series of acts 2100 includes selecting the primary machine-learning model and the fallback machine-learning model by determining task routing metrics for the plurality of machine-learning models by determining a financial cost metric, an execution time metric, an execution cost metric, or a model fit metric for executing the task on each machine-learning models of the plurality of machine-learning models and selecting, from the plurality of machine-learning models, the primary machine-learning model and the fallback machine-learning model based on two or more of the financial cost metric, the execution time metric, the execution cost metric, or the model fit metric for executing the task. Also, in one or more embodiments, the series of acts 2100 includes selecting the primary machine-learning model and the fallback machine-learning model by generating, based on the workload data and the task routing metrics, an optimization metric for each machine-learning model of the plurality of machine-learning models and selecting the primary machine-learning model and the fallback machine-learning model from the plurality of machine-learning models based on a first optimization metric for the primary machine-learning model and a second optimization metric for the fallback machine-learning model.

Further, in one or more embodiments, the series of acts 2100 includes selecting the primary machine-learning model and the fallback machine-learning model by accessing historical user feedback data about executing tasks using one or more machine-learning models of the plurality of machine-learning models, determining a historical quality metric for each machine-learning model of the plurality of machine-learning models based on the historical user feedback data, and selecting the primary machine-learning model and the fallback machine-learning model from the plurality of machine-learning models based in part on a first historical quality metric for the primary machine-learning model and a second historical quality metric for the fallback machine-learning model. In addition, in one or more embodiments, the series of acts 2100 includes select the primary machine-learning model and the fallback machine-learning model by identifying a capability or a specialty associated with one or more machine-learning models of the plurality of machine-learning models and selecting the primary machine-learning model for executing the task based on alignment of the capability or the specialty of the primary machine-learning model with the task. Moreover, in one or more embodiments, the series of acts 2100 includes selecting a trained machine-learning model as the primary machine-learning model and a third-party trained machine-learning model as the fallback machine-learning model.

Moreover, in one or more embodiments, the series of acts 2100 includes receiving, from a device connected by a network to a content management system, workload data requesting execution of a task using a machine-learning model, extracting, from the workload data, workload features defining characteristics of the task, selecting, utilizing a model selection machine-learning model, a primary machine-learning model and a fallback machine-learning model for executing the task based on the workload features, and, based on detecting that the primary machine-learning model is unavailable, provide the workload data to a computing environment of the fallback machine-learning model for executing the task.

Also, in one or more embodiments, the series of acts 2100 includes utilizing the model selection machine-learning model to compare each machine-learning model in a plurality of machine-learning models based on the workload features, where the plurality of machine-learning models comprises one or more trained models and one or more third-party trained models and selecting the primary machine-learning model and the fallback machine-learning model from the plurality of machine-learning models based on an output of the model selection machine-learning model. In addition, in one or more embodiments, the series of acts 2100 acts includes training the model selection machine-learning model based on task routing metrics of a plurality of machine-learning models, where the plurality of machine-learning models comprises the primary machine-learning model and the fallback machine-learning model, receiving additional task routing metrics for an additional machine-learning model, and updating parameters of the model selection machine-learning model based on the additional task routing metrics of the additional machine-learning model.

Further, in one or more embodiments, the series of acts 2100 includes receiving user feedback data indicating a user satisfaction with performance of the primary machine-learning model and updating parameters of the model selection machine-learning model based on the user feedback data. Moreover, in one or more embodiments, the series of acts 2100 includes generating, utilizing the model selection machine-learning model, an optimization metric for each machine-learning model of a plurality of machine-learning models and selecting the primary machine-learning model and the fallback machine-learning model from the plurality of machine-learning models based on a first optimization metric for the primary machine-learning model and a second optimization metric for the fallback machine-learning model.

Figure 22:
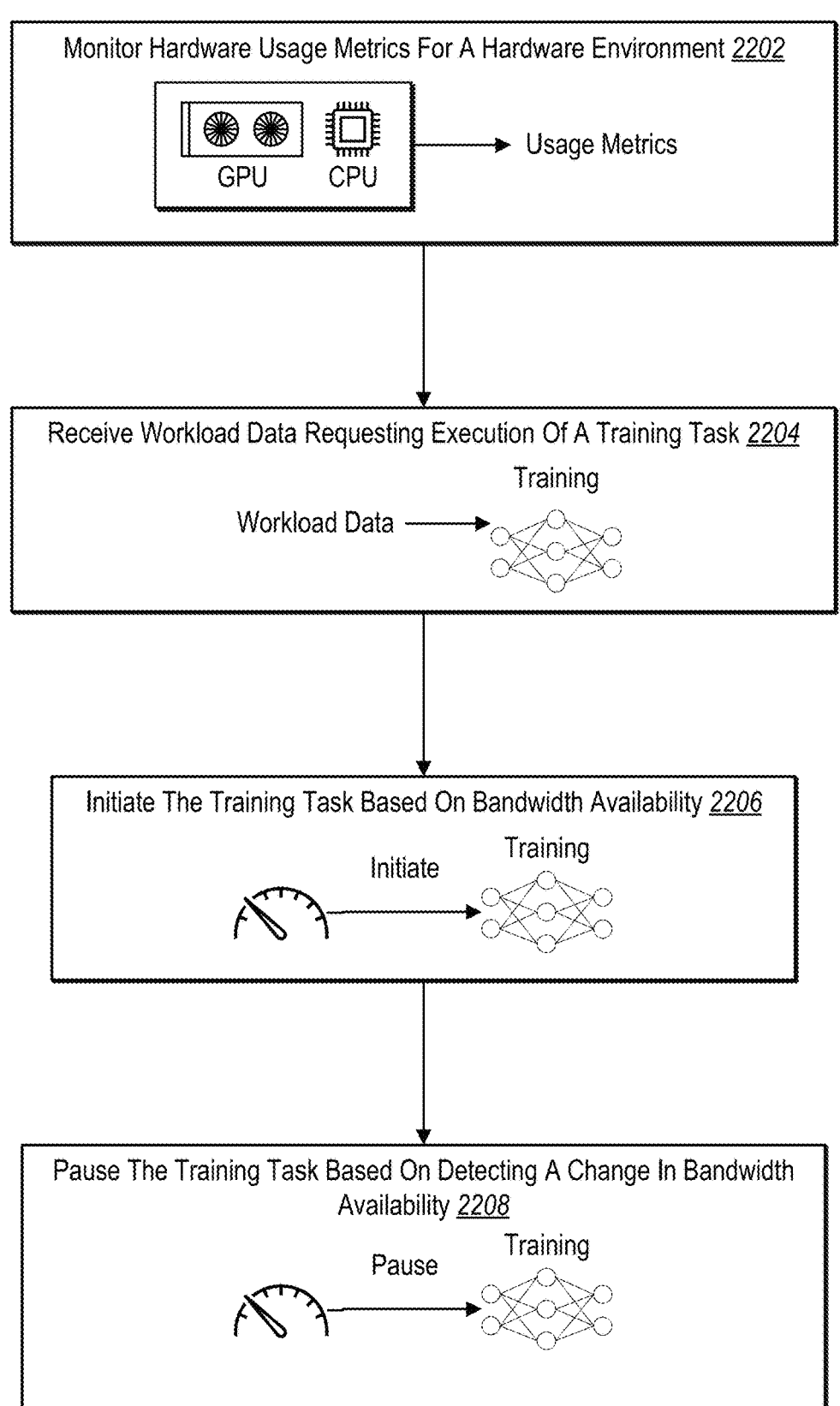
FIG. 22 illustrates a schematic diagram of an intelligent selection and execution platform intelligently initiating and pausing training tasks based in accordance with one or more embodiments.

As previously mentioned, the intelligent selection and execution platform 102 can execute training tasks. In particular, the intelligent selection and execution platform 102 trains machine-learning models for their respective tasks using particular hardware environments and based on bandwidth availability. FIG. 22 illustrates a schematic diagram of an intelligent selection and execution platform 102 intelligently initiating and pausing training tasks based in accordance with one or more embodiments.

As illustrated, the intelligent selection and execution platform 102 performs an act 2202 and monitors hardware usage metrics for a hardware environment. For example, the intelligent selection and execution platform 102 can monitor hardware usage metrics by measuring, determining, or receiving metrics indicating the usage of GPU, CPU, memory, or storage components of the hardware environment. In addition, the intelligent selection and execution platform 102 measures, determines or receives bandwidth metrics of the hardware environment, such as throughput, latency, jitter, or packet loss. Moreover, in addition to measuring hardware usage metrics of the hardware environment, the intelligent selection and execution platform 102 can utilize the task routing metrics as described above in relation to FIG. 6. For instance, the intelligent selection and execution platform 102 can utilize a hardware environment state that indicates bandwidth availability for the hardware environment.

As further illustrated in FIG. 22, the intelligent selection and execution platform 102 performs an act 2204 and receives workload data requesting the execution of a training task. Specifically, the workload data comprises information necessary to execute the training task. For example, the workload data indicates whether the training task is a hot path task that requires continuous (unbroken) execution by a model/hardware (e.g., pausing or delaying the task could result in performance degradation or service disruption. As another example, the intelligent selection and execution platform 102 receives workload data indicating an anticipated amount of time and processing capability required for the training task. Additional details regarding the intelligent selection and execution platform 102 receiving workload data are provided in relation to FIG. 6 above.

In one or more embodiments, the intelligent selection and execution platform 102 can also receive workload data requesting execution of a batch task. In particular, the intelligent selection and execution platform 102 receives workload data requesting the execution of a batch task comprising a set or grouping of tasks that are queued for execution together. For example, the intelligent selection and execution platform 102 can execute portions of the batch task a As further illustrated in FIG. 22, the intelligent selection and execution platform 102 performs an act 2206 and initiates the training task based on bandwidth availability. In particular, the intelligent selection and execution platform 102 determines points when the hardware usage metrics indicate a minimum-use time period (e.g., a "trough") where the hardware environment has computing resources for a training task (or batch task) and initiates the training task or batch task. For example, the intelligent selection and execution platform 102 can determine, based on the hardware usage metrics, that there is availability (e.g., idle GPUs or CPUs) in a hardware environment within the intelligent selection and execution platform 102 or in a third-party hardware environment and initiate the training task (or batch task).

Moreover, in addition to initiating a training task, the intelligent selection and execution platform 102 may also schedule training tasks based on bandwidth availability. In particular, the intelligent selection and execution platform 102 can monitor bandwidth availability throughout a use time period to identify minimum-use time periods and high-use time periods and schedule training tasks (or batch tasks) during minimum-use time periods. For example, the intelligent selection and execution platform 102 may forecast a minimum-use time period, where an average bandwidth availability satisfies a training task bandwidth usage threshold and schedule the training task (or batch task) during the minimum-use time period. As another example, the intelligent selection and execution platform 102 can forecast a high-use time period, where an average bandwidth availability satisfies a training task bandwidth usage threshold (or a batch task bandwidth usage threshold) and determines not to schedule a training task (or batch task) during the high-use time period. Additional detail regarding the intelligent selection and execution platform 102 initiating or scheduling training (or batch) tasks based on bandwidth availability is provided in relation to FIG. 23 below.

As illustrated in FIG. 22, the intelligent selection and execution platform 102 can perform an act 2208 and pause the training task based on detecting a change in bandwidth availability. In particular, the intelligent selection and execution platform 102 can pause the training task (or batch task) based on detecting that bandwidth availability decreased (e.g., other tasks are now using previously free bandwidth). For example, the intelligent selection and execution platform 102 can determine to pause a training task (or batch task) based on a training task bandwidth usage threshold (or batch task bandwidth usage threshold). In some instances, the intelligent selection and execution platform 102 will pause the training task based on detecting that bandwidth no longer satisfies a training task bandwidth usage threshold (or batch task bandwidth usage threshold). In addition, the intelligent selection and execution platform 102 can pause a training task (or batch task) based on detecting a hot path task that needs execution (e.g., hot path tasks take priority). Additional details regarding the intelligent selection and execution platform 102 pausing training tasks are provided in relation to FIG. 23 below.

Figure 23:
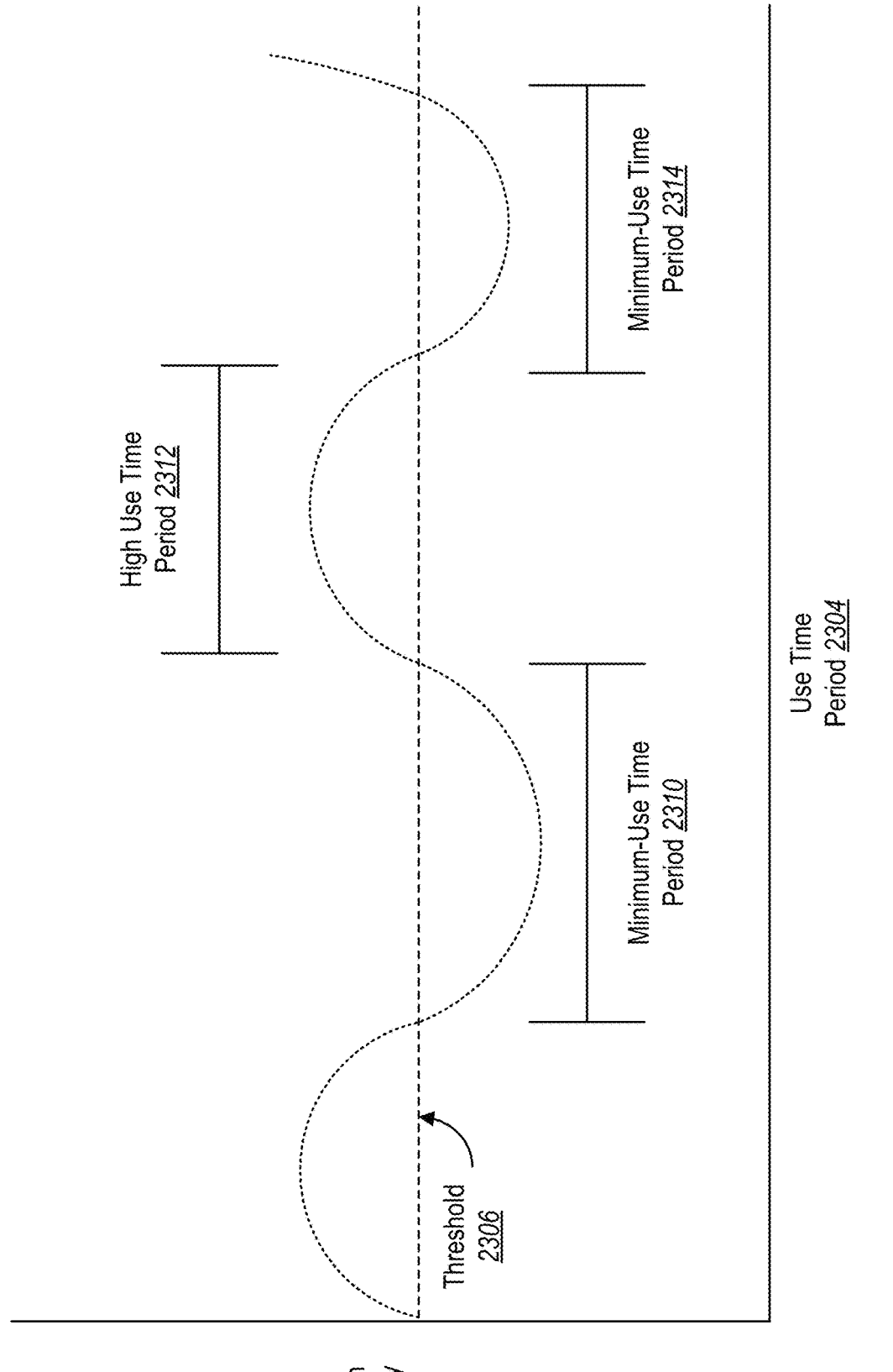
FIG. 23 illustrates an example graph depicting bandwidth availability based on usage throughout time in accordance with one or more embodiments.

As mentioned, the intelligent selection and execution platform 102 initiates and pauses training tasks. In particular, the intelligent selection and execution platform 102 initiates training tasks based on bandwidth availability and pauses training tasks based on bandwidth availability. FIG. 23 illustrates an example graph depicting bandwidth availability based on usage throughout time in accordance with one or more embodiments.

As illustrated in FIG. 23, the intelligent selection and execution platform 102 can determine bandwidth availability 2302 over a use time period 2304. In particular, the intelligent selection and execution platform 102 determines bandwidth availability 2302 during a use time period 2304 to determine minimum-use time periods and high-use time periods. For example, as illustrated, the intelligent selection and execution platform 102 can identify a minimum-use time period 2310 or a minimum-use time period 2314 where bandwidth availability 2302 indicates a lower bandwidth usage and a high-use time period 2312 where bandwidth availability 2302 indicates a higher bandwidth usage.

In one or more embodiments, the intelligent selection and execution platform 102 utilizes a threshold 2306 to identify a minimum-use time period 2310 or a high-use time period 2312. In particular, when bandwidth availability 2302 satisfies threshold 2306, the intelligent selection and execution platform 102 may determine there is a minimum-use time period 2310 or a minimum-use time period 2314. Similarly, when bandwidth availability 2302 no longer satisfies threshold 2306, the intelligent selection and execution platform 102 may determine there is a high-use time period.

As previously mentioned, the intelligent selection and execution platform 102 initiates and pauses training tasks based on bandwidth availability. In particular, the intelligent selection and execution platform 102 initiates and pauses tasks based on threshold 2306 for the respective task. For example, the intelligent selection and execution platform 102 can initiate a training task based on bandwidth availability 2302, satisfying a training task bandwidth usage threshold, and pause the training task based on bandwidth availability no longer satisfying the training task bandwidth usage threshold. As another example, the intelligent selection and execution platform 102 can initiate a batch task based on detecting that bandwidth availability 2302 satisfies a batch task bandwidth usage threshold and pausing the batch task based on detecting that bandwidth availability 2302 no longer satisfies the batch task bandwidth usage threshold.

In one or more embodiments, threshold 2306 varies based on the type of task. In particular, the intelligent selection and execution platform 102 utilizes thresholds of different values for different types of tasks. For example, the intelligent selection and execution platform 102 may have different values for a training task bandwidth usage threshold and a batch task bandwidth usage threshold. As another example, the intelligent selection and execution platform 102 can identify that a training task requires continuous execution or that the estimated training task length is longer than an average minimum-use time period and adjust threshold 2306 (e.g., so it will not pause as easily based on bandwidth availability).

As previously mentioned, the intelligent selection and execution platform 102 can also schedule training tasks and batch tasks. In particular, the intelligent selection and execution platform 102 can schedule a training task for an average minimum-use time period 2310 where the average bandwidth availability 2302 satisfies threshold 2306. For example, the intelligent selection and execution platform 102 can schedule a training task for minimum-use time period 2310 where bandwidth availability 2302 generally satisfies a training task bandwidth usage threshold. As another example, the intelligent selection and execution platform 102 can schedule a batch task for a minimum-use time period 2314, where bandwidth availability 2302 generally satisfies a batch task bandwidth usage threshold.

In one or more embodiments, the intelligent selection and execution platform 102 can pause scheduled tasks based on detecting a change in bandwidth availability 2302. Specifically, the intelligent selection and execution platform 102 pauses scheduled tasks based on determining that bandwidth availability 2302 no longer satisfies threshold 2306. For example, the intelligent selection and execution platform 102 can pause a scheduled training task based on detecting that bandwidth availability 2302 no longer satisfies a training task bandwidth usage threshold. As another example, the intelligent selection and execution platform 102 can pause a scheduled batch task based on detecting that bandwidth availability 2302 no longer satisfies a batch job bandwidth usage threshold. Moreover, if the intelligent selection and execution platform 102 detects an additional change in bandwidth availability, the intelligent selection and execution platform 102 can initiate the task once bandwidth availability 2302 satisfies threshold 2306 again.

In addition to FIGS. 1-10B, FIGS. 12-14, FIGS. 16-20B, and FIGS. 22-23, the corresponding text, and the examples provide a number of different methods, systems, devices, and non-transitory computer-readable media of the intelligent selection and execution platform 102. In addition to the foregoing, one or more embodiments can also be described in terms of flowcharts comprising acts for accomplishing a particular result, as shown in FIG. 24. FIG. 24 may be performed with more or fewer acts. Further, the acts may be performed in differing orders. Additionally, the acts described herein may be repeated or performed in parallel with one another or parallel with different instances of the same or similar acts.

As mentioned, FIG. 24 illustrates a flowchart of a series of acts 2400 for initiating and pausing training tasks in accordance with one or more embodiments. While FIG. 24 illustrates acts according to one embodiment, alternative embodiments may omit, add to, reorder, and/or modify any of the acts shown in FIG. 24. The acts of FIG. 24 can be performed as part of a method. Alternatively, a non-transitory computer-readable medium can comprise instructions that, when executed by one or more processors, cause a computing device to perform the acts of FIG. 24. In some embodiments, a system can perform the acts of FIG. 24.

As shown in FIG. 24, the series of acts 2400 includes an act 2402 of monitoring hardware usage metrics for a hardware environment hosing a machine-learning model, an act 2404 of extracting workload data requesting execution of a training task using the machine-learning model, an act 2406 of initiating the training task at the hardware environment based on detecting a bandwidth availability indicated by the hardware usage metrics, and an act 2408 of pausing the training task based on detecting a change in the bandwidth availability indicated by the hardware usage metrics.

In particular, the act 2402 can include monitoring hardware usage metrics for a hardware environment hosting a machine-learning model, the act 2404 can include extracting, at a content management system, workload data requesting execution of a training task using the machine-learning model, the act 2406 can include based on the workload data, initiating the training task at the hardware environment based on detecting a bandwidth availability indicated by the hardware usage metrics, and the act 2408 can include pausing the training task based on detecting a change in the bandwidth availability indicated by the hardware usage metrics.

For example, in one or more embodiments, the series of acts 2400 includes wherein initiating the training task at the hardware environment further comprises identifying that the hardware usage metrics indicate that the bandwidth availability satisfies a training task bandwidth usage threshold and initiating the training task based on identifying that the bandwidth availability satisfies the training task bandwidth usage threshold. In addition, in one or more embodiments, the series of acts 2400 includes forecasting a minimum-use time period where an average bandwidth availability satisfies a training task bandwidth usage threshold and scheduling the training task for the minimum-use time period.

Also, in one or more embodiments, the series of acts 2400 includes initiating the training task at the hardware environment during the minimum-use time period based on detecting that an actual bandwidth usage at the minimum-use time period satisfies a training task bandwidth usage threshold. Further, in one or more embodiments, the series of acts 2400 includes wherein initiating the training task at the hardware environment further comprises monitoring hardware usage metrics by monitoring a user count metric, a memory usage metric, a central processing unit metric, or a graphics processing unit metric and initiating the training task at the hardware environment based on two or more of the user count metric, the memory usage metric, the central processing unit metric, and the graphics processing unit metric.

In addition, in one or more embodiments, the series of acts 2400 includes wherein pausing the training task further comprises monitoring the hardware usage metrics for the hardware environment throughout a use time period to identify a high-use time period and pausing the training task based on forecasting the change in the bandwidth availability at the high-use time period. Also, in one or more embodiments, the series of acts 2400 includes wherein extracting workload data requesting execution of the training task further comprises determining an estimated processing requirement and an estimated storage requirement for executing the training task and determining an estimated execution length for the training task.

Further, in one or more embodiments, the series of acts 2400 includes receiving the workload data by receiving an indication that the training task does not require continuous execution and initiating the training task based on the indication that that the training task does not require continuous executions. In addition, in one or more embodiments, the series of acts 2400 includes initiating the training task based on identifying that the hardware usage metrics indicate that the bandwidth availability satisfies a training task bandwidth usage threshold and pausing the training task based on identifying that the hardware usage metrics indicate that the bandwidth availability no longer satisfies the training task bandwidth usage threshold.

Moreover, in one or more embodiments, the series of acts 2400 includes monitoring hardware usage metrics for a hardware environment hosting a machine-learning model, extracting, at a content management system, workload data requesting execution of a batch task using the machine-learning model, based on the workload data, initiating the batch task at the hardware environment based on detecting a bandwidth availability indicated by the hardware usage metrics, and pausing the batch task based on detecting a change in the bandwidth availability indicated by the hardware usage metrics.

In addition, in one or more embodiments, the series of acts 2400 includes forecasting a minimum-use time period where an average bandwidth availability satisfies a batch task bandwidth usage threshold and scheduling the batch task for the minimum-use time period. Also, in one or more embodiments, the series of acts 2400 includes resuming the batch task based on detecting an additional change in the bandwidth availability. Further, in one or more embodiments, the series of acts 2400 includes extracting workload data by determining an estimated processing requirement and an estimated storage requirement for executing the batch task and determining an estimated execution length for the batch task.

Also, in one or more embodiments, the series of acts 2400 includes initiating the batch task at the hardware environment by identifying that the hardware usage metrics indicate that the bandwidth availability satisfies a batch task bandwidth usage threshold and initiating the batch task based on identifying that the bandwidth availability satisfies the batch task bandwidth usage threshold. Further, in one or more embodiments, the series of acts 2400 includes determining that the bandwidth availability indicated by the hardware usage metrics no longer satisfies the batch task bandwidth usage threshold and pausing the batch task based on determining that the bandwidth availability no longer satisfies the batch task bandwidth usage threshold.

Moreover, in one or more embodiments, the series of acts includes monitoring hardware usage metrics for a hardware environment hosting a machine-learning model, extracting, at a content management system, workload data requesting execution of a training task using the machine-learning model, determining, at the content management system, that a training dataset for the training task is compatible with the hardware environment, and, based on determining that the training dataset is compatible with the hardware environment and the workload data, initiate the training task at the hardware environment based on a bandwidth availability indicated by the hardware usage metrics. Also, in one or more embodiments, the series of acts 2400 includes determining that the training dataset is compatible with the hardware environment by identifying that the training dataset is local to the hardware environment.

Further, in one or more embodiments, the series of acts 2400 includes initiating the training task by determining that the training dataset is compatible with the hardware environment based on determining a data affinity for the hardware environment and the training dataset and initiating the training task based on determining the data affinity for the hardware environment and the training dataset. Moreover, in one or more embodiments, the series of acts 2400 includes forecasting a minimum-use time period where the hardware usage metrics indicate that an average bandwidth availability satisfies a training task bandwidth usage threshold, scheduling the training task for the minimum-use time period, and initiating the training task based on detecting that an actual bandwidth at the minimum-use time period satisfies the training task bandwidth usage threshold.

In addition, in one or more embodiments, the series of acts 2400 includes pausing the training task based on detecting a change in the bandwidth availability indicated by the hardware usage metrics and resuming the training task based on detecting an additional change in the bandwidth availability indicated by the hardware usage metrics.

Figure 25:
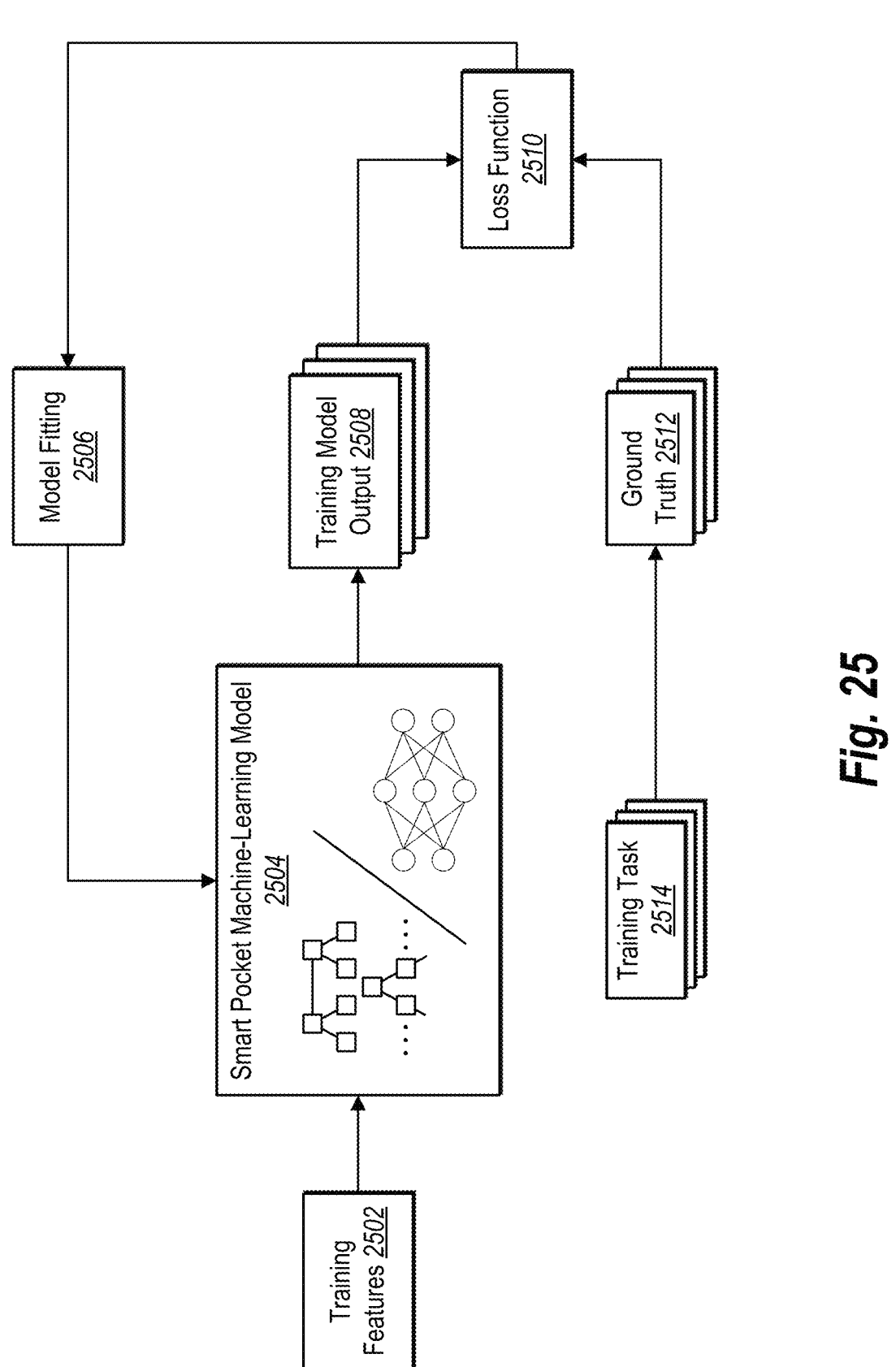
FIG. 25 illustrates an example diagram of an intelligent selection and execution platform training a smart pocket machine-learning model in accordance with one or more embodiments.

As mentioned above, in certain embodiments, the intelligent selection and execution platform 102 trains or tunes a smart pocket machine-learning model (and/or a model selection machine-learning model or hardware allocation machine-learning model). In particular, in embodiments where the smart pocket machine-learning model is a series of gradient-boosted trees or a neural network, the intelligent selection and execution platform 102 utilizes an iterative training process to fit a smart machine-learning model by adjusting or adding decision trees or learning parameters that result in accurate model outputs. FIG. 25 illustrates training a smart pocket machine-learning model in accordance with one or more embodiments. Though only the smart pocket machine-learning model is depicted in FIG. 25, it is understood that the iterative training process may also be performed for any of the models described above (e.g., the model selection machine-learning model and/or the hardware allocation machine-learning model).

As illustrated in FIG. 25, the intelligent selection and execution platform 102 accesses training task 2514. Training task 2514 constitutes a task and/or workload data requesting the execution of a task and is used to train the smart pocket machine-learning model 2504. The training task 2514 has a corresponding ground truth 2512 associated with it, where the ground truth 2512 indicates whether the training task 2514 was previously determined to be either a correct model selection (or hardware allocation and/or model training scheduling). For example, training task 2514 could be a selection of a machine-learning model (and, in some cases, a fallback machine-learning model) that a team of researchers determined or confirmed as either correct or incorrect. As another example, training task 2514 could be a hardware allocation that a team of researchers determined or confirmed as either correct or incorrect. Accordingly, in some cases, the intelligent selection and execution platform 102 treats the ground truth 2512 as a ground truth for training the smart pocket machine-learning model 2504.

As further illustrated in FIG. 25, the intelligent selection and execution platform 102 provides training features 2502 associated with the training task 2514 to the smart pocket machine-learning model 2504 and utilizes the smart pocket machine-learning model 2504 to generate a training model output 2508 based on the training features 2502. As the name indicates, the training features 2502 represent features associated with the training task 2514 that are used for training the smart pocket machine-learning model 2504. Accordingly, the training features 2502 can constitute a feature used as input for the smart pocket machine-learning model 2504. In some embodiments, the smart pocket machine-learning model 2504 generates training model output 2508, including a model selection, hardware allocation, and/or model training scheduling for the training task 2514. The training model output 2508 can accordingly take the form of any of the model outputs described above.

As further illustrated in FIG. 25, the intelligent selection and execution platform 102 utilizes a loss function to compare the training model output 2508 and the ground truth 2512 (e.g., to determine an error or a measure of loss between them). For instance, in cases where the smart pocket machine-learning model 2504 is an ensemble of gradient-boosted trees, the intelligent selection and execution platform 102 utilizes a mean squared error loss function (e.g., for regression) and/or a logarithmic loss function (e.g., for classification) as the loss function 2510. By contrast, in embodiments where the smart pocket machine-learning model 2504 is a neural network, the intelligent selection and execution platform can utilize a cross-entropy loss function, an L1 loss function, or a mean squared error loss function as the loss function 2510. For example, the intelligent selection and execution platform 102 utilizes the loss function 2510 to determine a difference between the training model output 2508 and the ground truth 2512.

As further illustrated in FIG. 25, the intelligent selection and execution platform performs model fitting 2506. In particular, the intelligent selection and execution platform 102 fits the smart pocket machine-learning model 2504 based on loss from the loss function 2510. For instance, the intelligent selection and execution platform 102 performs modifications or adjustments to the smart pocket machine-learning model 2504 to reduce the measure of loss from the loss function 2510 for a subsequent training iteration.

For gradient-boosted trees, for example, the intelligent selection and execution platform 102 trains the smart pocket machine-learning model 2504 on the gradients of errors determined by the loss function 2510. For instance, the intelligent selection and execution platform solves a convex optimization problem (e.g., of infinite dimensions) while regularizing the objective to avoid overfitting. In certain implementations, the intelligent selection and execution platform 102 scales the gradients to emphasize corrections to under-represented classes (e.g., fraud classifications or non-fraud classifications).

In some embodiments, the intelligent selection and execution platform 102 adds a new weak learner (e.g., a new boosted tree) to the smart pocket machine-learning model 2504 for each successive training iteration as part of solving the optimization problem. For example, the intelligent selection and execution platform 102 finds a feature that minimizes a loss from the loss function 2510 and either adds the feature to the current iteration's tree or starts to build a new tree with the feature In addition to, or in the alternative, gradient-boosted decision trees, the intelligent selection and execution platform 102 trains a logistic regression to learn parameters for generating one or more fraud predictions, such as a fraud score indicating a probability of fraud. To avoid overfitting, the intelligent selection and execution platform 102 further regularizes based on hyperparameters such as the learning rate, stochastic gradient boosting, the number of trees, the tree depth (s), complexity penalization, and L1/L2 regularization.

In embodiments where the smart pocket machine-learning model 2504 is a neural network, the intelligent selection and execution platform 102 performs the model fitting 2506 by modifying internal parameters (e.g., weights) of the smart pocket machine-learning model 2504 to reduce the measure of loss for the loss function 2510. Indeed, the intelligent selection and execution platform 102 modifies how the smart pocket machine-learning model 2504 analyzes and passes data between layers and neurons by modifying the internal network parameters. Thus, over multiple iterations, the intelligent selection and execution platform 102 improves the accuracy of the smart pocket machine-learning model 2504.

Indeed, in some cases, the intelligent selection and execution platform 102 repeats the training process illustrated in FIG. 25 for multiple iterations. For example, the intelligent selection and execution platform 102 repeats the iterative training by selecting a new set of training features for each training digital claim along with a corresponding fraud action label. The intelligent selection and execution platform 102 further generates a new set of training fraud predictions for each iteration. As described above, the intelligent selection and execution platform 102 also compares a training fraud prediction at each iteration with the corresponding training action label and further performs model fitting 2506. The intelligent selection and execution platform 102 repeats this process until the smart pocket machine-learning model 2504 generates training fraud predictions that result in fraud predictions that satisfy a threshold measure of loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 26:
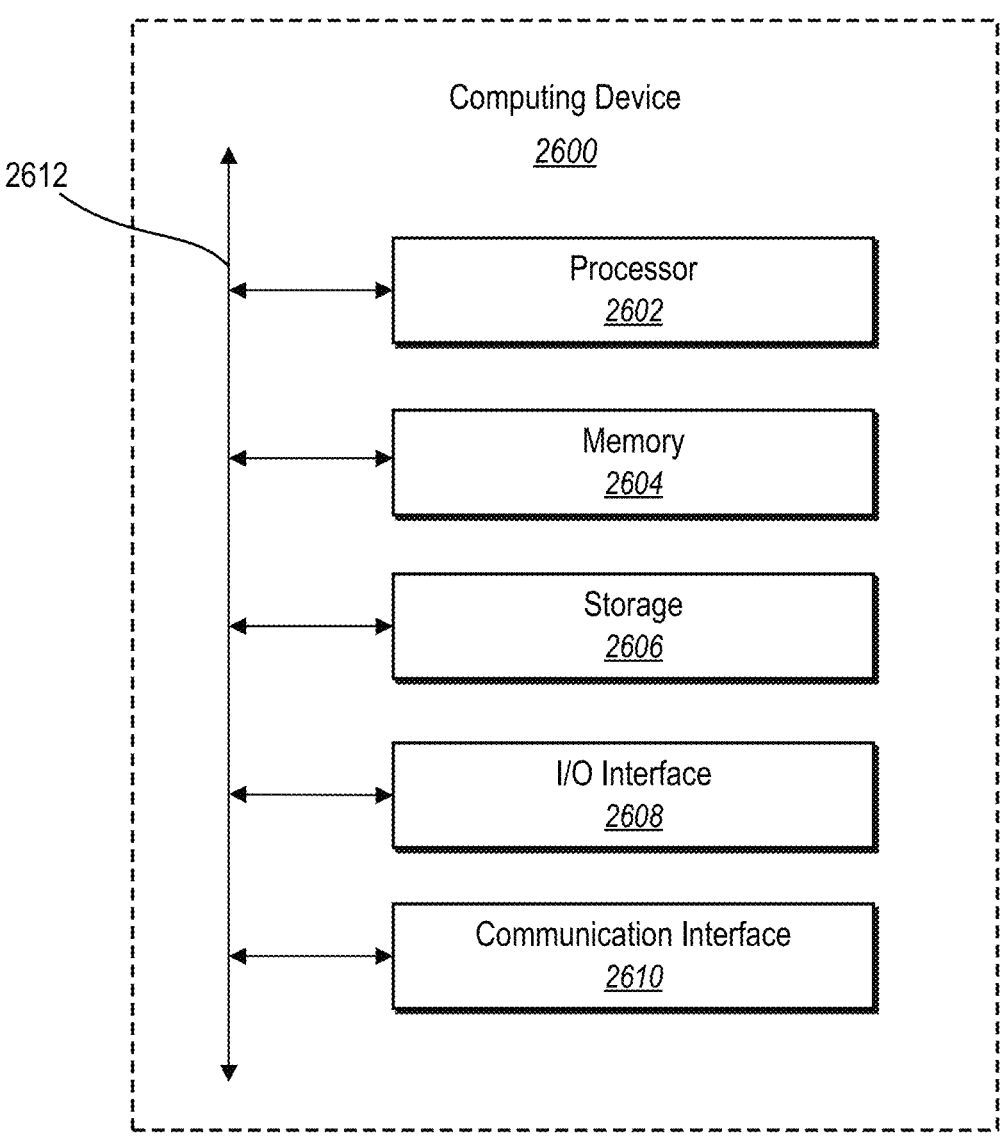
FIG. 26 illustrates a block diagram of an example computing device for implementing one or more embodiments.

FIG. 26 illustrates a block diagram of an example computing device 2600 that may be configured to perform one or more of the processes described above. One will appreciate that one or more computing devices, such as the computing device 2600 may represent the computing devices described above (e.g., client device(s) 112, server(s) 110, third-party server(s) 118, and third-party server(s) 124). In one or more embodiments, the computing device 2600 may be a mobile device (e.g., a mobile telephone, a smartphone, a PDA, a tablet, a laptop, a camera, a tracker, a watch, a wearable device, etc.). In some embodiments, the computing device 2600 may be a non-mobile device (e.g., a desktop computer or another type of client device). Further, the computing device 2600 may be a server device that includes cloud-based processing and storage capabilities.

As shown in FIG. 26, the computing device 2600 can include one or more processor(s) 2602, memory 2604, a storage device 2606, input/output interfaces 2608 (or "I/O interfaces 2608"), and a communication interface 2610, which may be communicatively coupled by way of a communication infrastructure (e.g., bus 2612). While the computing device 2600 is shown in FIG. 26, the components illustrated in FIG. 26 are not intended to be limiting. Additional or alternative components may be used in other embodiments. Furthermore, in certain embodiments, the computing device 2600 includes fewer components than those shown in FIG. 26. Components of the computing device 2600 shown in FIG. 26 will now be described in additional detail.

In particular embodiments, the processor(s) 2602 includes hardware for executing instructions, such as those making up a computer program. As an example, and not by way of limitation, to execute instructions, the processor(s) 2602 may retrieve (or fetch) the instructions from an internal register, an internal cache, memory 2604, or a storage device 2606 and decode and execute them.

The computing device 2600 includes memory 2604, which is coupled to the processor(s) 2602. The memory 2604 may be used for storing data, metadata, and programs for execution by the processor(s). The memory 2604 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 2604 may be internal or distributed memory.

The computing device 2600 includes a storage device 2606 includes storage for storing data or instructions. As an example, and not by way of limitation, the storage device 2606 can include a non-transitory storage medium described above. The storage device 2606 may include a hard disk drive (HDD), flash memory, a Universal Serial Bus (USB) drive or a combination these or other storage devices.

As shown, the computing device 2600 includes one or more I/O interfaces 2608, which are provided to allow a user to provide input to (such as user strokes), receive output from, and otherwise transfer data to and from the computing device 2600. These I/O interfaces 2608 may include a mouse, keypad or a keyboard, a touch screen, camera, optical scanner, network interface, modem, other known I/O devices or a combination of such I/O interfaces 2608. The touch screen may be activated with a stylus or a finger.

The I/O interfaces 2608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 2608 are configured to provide graphical data to a display for presentation to a user. The graphical data may be representative of one or more graphical user interfaces and/or any other graphical content as may serve a particular implementation.

The computing device 2600 can further include a communication interface 2610. The communication interface 2610 can include hardware, software, or both. The communication interface 2610 provides one or more interfaces for communication (such as, for example, packet-based communication) between the computing device and one or more other computing devices or one or more networks. As an example, and not by way of limitation, communication interface 2610 may include a network interface controller (NIC) or network adapter for communicating with an Ethernet or other wire-based network or a wireless NIC (WNIC) or wireless adapter for communicating with a wireless network, such as a WI-FI. The computing device 2600 can further include a bus 2612. The bus 2612 can include hardware, software, or both that connects components of computing device 2600 to each other.

Figure 27:
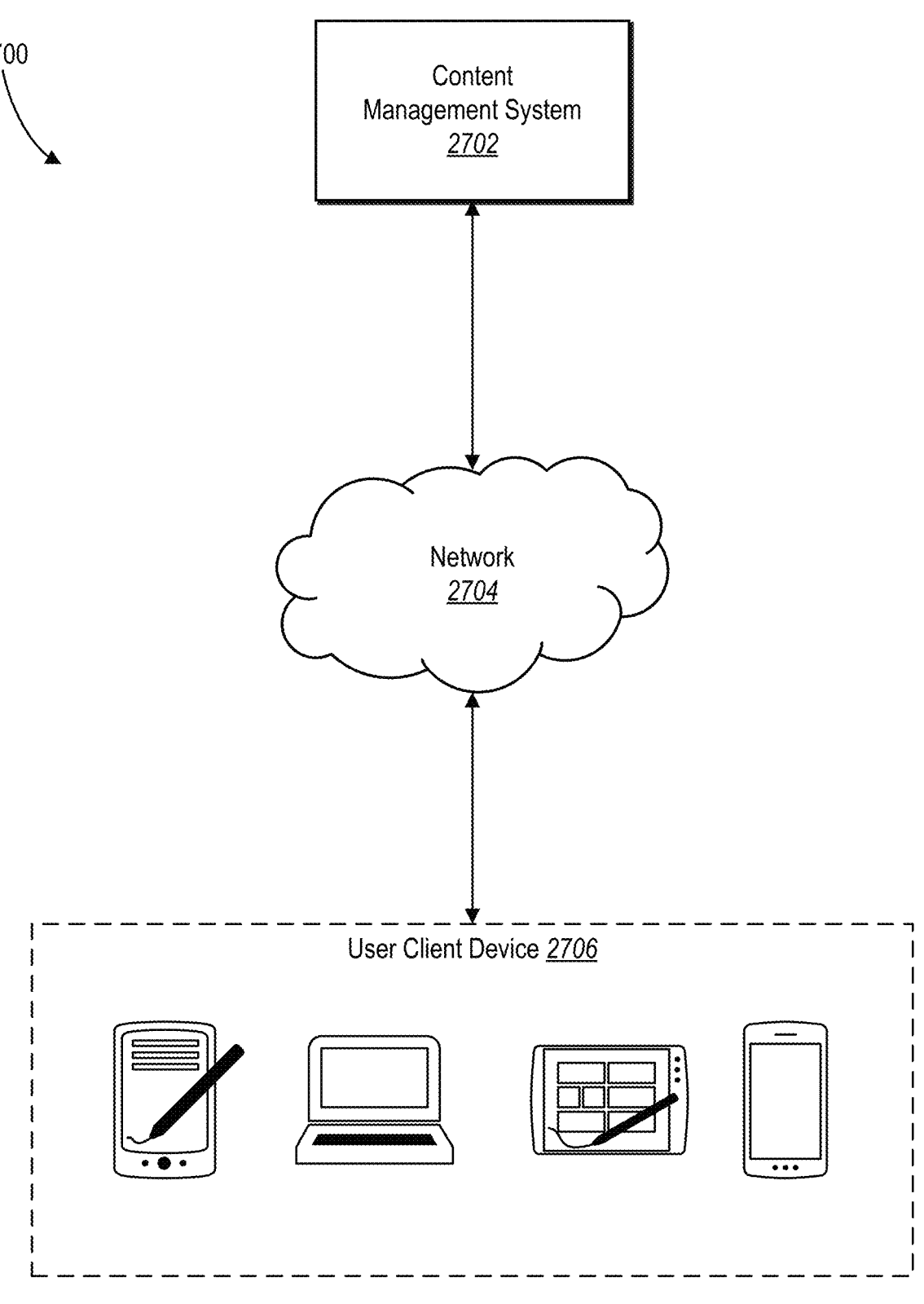
FIG. 27 illustrates a network environment of a content management system in accordance with one or more embodiments.

FIG. 27 is a schematic diagram illustrating environment 2700 within which one or more implementations of the intelligent selection and execution platform 102 can be implemented. For example, the intelligent selection and execution platform 102 may be part of a content management system 2702 (e.g., the content management system 108). Content management system 2702 may generate, store, manage, receive, and send digital content (such as digital content items). For example, content management system 2702 may send and receive digital content to and from client devices 2706 by way of network 2704. In particular, content management system 2702 can store and manage a collection of digital content. Content management system 2702 can manage the sharing of digital content between computing devices associated with a plurality of users. For instance, content management system 2702 can facilitate a user sharing a digital content with another user of content management system 2702.

In particular, content management system 2702 can manage synchronizing digital content across multiple client devices 2706 associated with one or more users. For example, a user may edit digital content using client device 2706. The content management system 2702 can cause client device 2706 to send the edited digital content to content management system 2702. Content management system 2702 then synchronizes the edited digital content on one or more additional computing devices.

In addition to synchronizing digital content across multiple devices, one or more implementations of content management system 2702 can provide an efficient storage option for users that have large collections of digital content. For example, content management system 2702 can store a collection of digital content on content management system 2702, while the client device 2706 only stores reduced-sized versions of the digital content. A user can navigate and browse the reduced-sized versions (e.g., a thumbnail of a digital image) of the digital content on client device 2706. In particular, one way in which a user can experience digital content is to browse the reduced-sized versions of the digital content on client device 2706.

Another way in which a user can experience digital content is to select a reduced-size version of digital content to request the full- or high-resolution version of digital content from content management system 2702. In particular, upon a user selecting a reduced-sized version of digital content, client device 2706 sends a request to content management system 2702 requesting the digital content associated with the reduced-sized version of the digital content. Content management system 2702 can respond to the request by sending the digital content to client device 2706. Client device 2706, upon receiving the digital content, can then present the digital content to the user. In this way, a user can have access to large collections of digital content while minimizing the amount of resources used on client device 2706.

Client device 2706 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 2706 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 2704.

Network 2704 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 2706 may access content management system 2702.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description.

What is claimed is:

1. A computer-implemented method comprising:
   receiving, from a device connected by a network to a content management system, workload data requesting execution of a task using a machine-learning model;
   extracting, from the workload data, workload features defining estimated computational requirements for executing the task;
   determining a historical quality metric for each machine-learning model of a plurality of machine-learning models based on historical user feedback data about executing tasks using one or more machine-learning models of the plurality of machine-learning models;
   selecting a primary machine-learning model for executing the task and a fallback machine-learning model for executing the task if the primary machine-learning model is unavailable based on the workload features defining the estimated computational requirements for executing the task and a first historical quality metric for the primary machine-learning model and a second historical quality metric for the fallback machine-learning model; and
   based on detecting that the primary machine-learning model is unavailable prior to executing the task, providing the workload data to a computing environment of the fallback machine-learning model for executing the task.

2. The computer-implemented method of claim 1, wherein extracting the workload features defining estimated computational requirements for executing the task further comprises determining an estimated processing requirement and an estimated storage requirement for executing the task.

3. The computer-implemented method of claim 1, wherein selecting the primary machine-learning model and the fallback machine-learning model further comprises:
   generating optimization metrics for each machine-learning model of a plurality of machine-learning models; and
   selecting the primary machine-learning model and the fallback machine-learning model based on the optimization metrics.

4. The computer-implemented method of claim 1, wherein selecting the primary machine-learning model and the fallback machine-learning model further comprises:

determining a model state for a plurality of machine-learning models;

selecting the primary machine-learning model based in part on a first model state of the primary machine-learning model; and selecting the fallback machine-learning model based in part on a second model state of the fallback machine-learning model.

5. The computer-implemented method of claim 1, wherein selecting the primary machine-learning model and the fallback machine-learning model further comprises:

determining, based on the workload features, a financial cost metric, an execution time metric, an execution cost metric, or a model fit metric for executing the task on each machine-learning models in a plurality of machine-learning models; and selecting the primary machine-learning model and the fallback machine-learning model is based on two or more of the financial cost metric, the execution time metric, the execution cost metric, or the model fit metric.

6. The computer-implemented method of claim 1, further comprising:

selecting an additional machine-learning model for executing the task based on the workload features; and based on detecting that the fallback machine-learning model is unavailable, providing the workload data to a computing environment of the additional machine-learning model for executing the task.

7. The computer-implemented method of claim 1, further comprising selecting a trained machine-learning model as the primary machine-learning model and a third-party trained machine-learning model as the fallback machine-learning model.

8. The computer-implemented method of claim 1, further comprising:

detecting that the primary machine-learning model is unavailable based on identifying that a first hardware environment associated with the primary machine-learning model is unavailable to execute the task; and providing the workload data to a second hardware environment associated with the fallback machine-learning model based on identifying that the second hardware environment is available to execute the task.

9. The computer-implemented method of claim 1, wherein selecting the primary machine-learning model and the fallback machine-learning model further comprises:

performing a software domain analysis of each machine-learning model of a plurality of machine-learning models for executing the task; and selecting the primary machine-learning model and the fallback machine-learning model based on the software domain analysis.

10. A non-transitory computer-readable medium storing instructions that, when executed by at least one processor, cause a computer system to:

receive, from a device connected by a network to a content management system, workload data requesting execution of a task using a machine-learning model;

extract, from the workload data, workload features defining estimated computational requirements for executing the task;

determine task routing metrics for a plurality of machine-learning models hosted in respective network environments;

determine a historical quality metric for each machine-learning model of a plurality of machine-learning models based on historical user feedback data about executing tasks using one or more machine-learning models of the plurality of machine-learning models;

select a primary machine-learning model for executing the task and a fallback machine-learning model from the plurality of machine-learning models for executing the task if the primary machine-learning model is unavailable based on the workload features defining the estimated computational requirements for executing the task and a first historical quality metric for the primary machine-learning model and a second historical quality metric for the fallback machine-learning model; and based on detecting that the primary machine-learning model is unavailable prior to executing the task, provide the workload data to a computing environment of the fallback machine-learning model for executing the task.

11. The non-transitory computer-readable medium of claim 10, further comprising instructions that, when executed by the at least one processor, cause the computer system to select the primary machine-learning model and the fallback machine-learning model by:

determining task routing metrics for the plurality of machine-learning models by determining a financial cost metric, an execution time metric, an execution cost metric, or a model fit metric for executing the task on each machine-learning models of the plurality of machine-learning models; and selecting, from the plurality of machine-learning models, the primary machine-learning model and the fallback machine-learning model based on two or more of the financial cost metric, the execution time metric, the execution cost metric, or the model fit metric for executing the task.

12. The non-transitory computer-readable medium of claim 10, further comprising instructions that, when executed by the at least one processor, cause the computer system to select the primary machine-learning model and the fallback machine-learning model by:

generating, based on the workload data and the task routing metrics, an optimization metric for each machine-learning model of the plurality of machine-learning models; and selecting the primary machine-learning model and the fallback machine-learning model from the plurality of machine-learning models based on a first optimization metric for the primary machine-learning model and a second optimization metric for the fallback machine-learning model.

13. The non-transitory computer-readable medium of claim 10, further comprising instructions that, when executed by the at least one processor, cause the computer system to:

select the primary machine-learning model and the fallback machine-learning model by utilizing a model selection machine-learning model to select the primary machine-learning model and the fallback machine-learning model;

receive user feedback data indicating a user satisfaction with the fallback machine-learning model executing the task; and update parameters of the model selection machine-learning model based on the user feedback data.

14. The non-transitory computer-readable medium of claim 10, further comprising instructions that, when executed by the at least one processor, cause the computer system to select the primary machine-learning model and the fallback machine-learning model by:

identifying a capability or a specialty associated with one or more machine-learning models of the plurality of machine-learning models; and selecting the primary machine-learning model for executing the task based on alignment of the capability or the specialty of the primary machine-learning model with the task.

15. The non-transitory computer-readable medium of claim 10, further comprising instructions that, when executed by the at least one processor, cause the computer system to select a trained machine-learning model as the primary machine-learning model and a third-party trained machine-learning model as the fallback machine-learning model.

16. A system comprising:

at least one processor; and at least one non-transitory computer-readable storage medium storing instructions that, when executed by the at least one processor, cause the system to:

receive, from a device connected by a network to a content management system, workload data requesting execution of a task using a machine-learning model;

extract, from the workload data, workload features defining estimated computational requirements for executing the task;

determine a historical quality metric for each machine-learning model of a plurality of machine-learning models based on historical user feedback data about executing tasks using one or more machine-learning models of the plurality of machine-learning models;

select, utilizing a model selection machine-learning model, a primary machine-learning model for executing the task and a fallback machine-learning model for executing the task if the primary machine-learning model is unavailable based on the workload features defining the estimated computational requirements for executing the task and a first historical quality metric for the primary machine-learning model and a second historical quality metric for the fallback machine-learning model; and based on detecting that the primary machine-learning model is unavailable prior to executing the task, provide the workload data to a computing environment of the fallback machine-learning model for executing the task.

17. The system of claim 16, further comprising instructions that, when executed by the at least one processor, cause the system to:

utilize the model selection machine-learning model to compare each machine-learning model in a plurality of machine-learning models based on the workload features, where the plurality of machine-learning models comprises one or more trained models and one or more third-party trained models; and select the primary machine-learning model and the fallback machine-learning model from the plurality of machine-learning models based on an output of the model selection machine-learning model.

18. The system of claim 16, further comprising instructions that, when executed by the at least one processor, cause the system to:

train the model selection machine-learning model based on task routing metrics of a plurality of machine-learning models, where the plurality of machine-learning models comprises the primary machine-learning model and the fallback machine-learning model;

receive additional task routing metrics for an additional machine-learning model; and update parameters of the model selection machine-learning model based on the additional task routing metrics of the additional machine-learning model.

19. The system of claim 16, further comprising instructions that, when executed by the at least one processor, cause the system to:

receive user feedback data indicating a user satisfaction with performance of the primary machine-learning model; and update parameters of the model selection machine-learning model based on the user feedback data.

20. The system of claim 16, further comprising instructions that, when executed by the at least one processor, cause the system to:

generate, utilizing the model selection machine-learning model, an optimization metric for each machine-learning model of a plurality of machine-learning models; and select the primary machine-learning model and the fallback machine-learning model from the plurality of machine-learning models based on a first optimization metric for the primary machine-learning model and a second optimization metric for the fallback machine-learning model.

* * * * *